United States Patent [19]

Ohtani et al.

[11] Patent Number: 5,159,324
[45] Date of Patent: Oct. 27, 1992

[54] ICON AIDED RUN FUNCTION DISPLAY SYSTEM

[75] Inventors: Satoshi Ohtani; Kaoru Kaminaga; Mamoru Kobayashi, all of Kanagawa, Japan

[73] Assignee: Fuji Xerox Corporation, Ltd., Tokyo, Japan

[21] Appl. No.: 744,659

[22] Filed: Aug. 9, 1991

Related U.S. Application Data

[63] Continuation of Ser. No. 07/266,536, Nov. 2, 1988, abandoned.

[30] Foreign Application Priority Data

Nov. 2, 1987 [JP] Japan .................. 62-278653
Nov. 2, 1987 [JP] Japan .................. 62-278654
Nov. 2, 1987 [JP] Japan .................. 62-278655

[51] Int. Cl.$^5$ ............................. G09G 5/00
[52] U.S. Cl. .................... 340/712; 359/209; 340/715
[58] Field of Search ........... 340/706, 712, 715, 716, 340/745; 355/200, 206, 209

[56] References Cited

U.S. PATENT DOCUMENTS

| | | | |
|---|---|---|---|
| 3,967,268 | 6/1976 | Roberts | 340/745 |
| 4,390,872 | 6/1983 | Murakami et al. | 340/715 |
| 4,450,442 | 5/1984 | Tanaka | 340/745 |
| 4,475,806 | 10/1984 | Daughton et al. | 340/715 |
| 4,699,501 | 10/1987 | Watanabe et al. | 355/200 |
| 4,799,083 | 1/1989 | Knodt | 355/200 |
| 4,811,240 | 3/1989 | Ballou et al. | 340/747 |
| 4,899,136 | 2/1990 | Beard et al. | 340/706 |
| 5,045,880 | 9/1991 | Evanitsky et al. | 355/200 |

FOREIGN PATENT DOCUMENTS

| | | |
|---|---|---|
| 62644 | 5/1975 | Japan . |
| 77140 | 5/1982 | Japan . |
| 78371 | 5/1984 | Japan . |
| 179792 | 11/1987 | Japan . |
| 191173 | 8/1988 | Japan . |

OTHER PUBLICATIONS

"A Programmable Digital Control System for Copying Machines", by Sikandar Sheikh, IEEE Transactions on Industrial Electronics and Control Systems, Feb. 1974.

Primary Examiner—Jeffery A. Brier
Attorney, Agent, or Firm—Finnegan, Henderson, Farabow, Garrett and Dunner

[57] ABSTRACT

The present invention concerns an icon aided run function display system wherein a function may be selected from a plurality of choices shown on a display means and having a function selection means for selecting the function and terminating the selection. Further, the present invention comprises an apparatus for selecting an additional device display in a recording apparatus having a plurality of selectively attachable devices. Moreover, the present invention comprises a call selection system having a function selection key wherein a plurality of selection functions and a function selection message are simultaneously display with the operation of a cursor.

12 Claims, 45 Drawing Sheets

FIG. 24(a)

| 1 | CONTROL WORD | |
|---|---|---|
| 0 | STATE | SUBSTATE |
| 0 | CASE NUMBER | |
| 0 | FREE DATA AREA 1 | |
| 0 | FREE DATA AREA 2 | |
| 0 | FREE DATA AREA 3 | |
| 0 | FREE DATA AREA 4 | |
| 0 | FREE DATA AREA 5 | |
| 0 | BCC | |

① CONTROL WORD

| 1 | 0 | 1 | 0 | 1 | 0 | 0 | 1 | = X'A9'

FIG. 25(a)

STATE : FUNCTION (=6)
SUBSTATE: NONE (=0)
CASE NO. : 9
SENTENCE : WHICH DO YOU SELECT? SELEC. SET. ▲ CALL ⌂ REGIST. ⌂ CARD REGIST.

| TRANS. DATA DETAIL | 7 | 6 | 5 | 4 | 3 | 2 | 1 | 0 |
|---|---|---|---|---|---|---|---|---|
| | 1 | | CONTROL WORD | | | | | |
| | 0 | | STATE | | | SUB STATE | | |
| | 0 | | CASE NO. | | | | | |
| | 0 | | | | | | | |
| | 0 | | CARD REGIST. (ERASING=1) | | | | | |
| | 0 | | CARSOR POSITION | | | | | |
| | 0 | | BCC | | | | | |

FIG. 25(b)

STATE : FUNCTION (=6)
SUBSTATE: NONE (=0)
CASE NO. : 30
SENTENCE : WHICH DO YOU SELECT? SELEC. SET. ▲ EXT. DEL. SHEET DUAL. PARA DUAL

| TRANS. DATA DETAIL | 7 | 6 | 5 | 4 | 3 | 2 | 1 | 0 |
|---|---|---|---|---|---|---|---|---|
| | 1 | | CONTROL WORD | | | | | |
| | 0 | | STATE | | | SUB STATE | | |
| | 0 | | CASE NO. | | | | | |
| | 0 | | | | | | | |
| | 0 | | PARA DUAL (ERASING=1) | | SHEET DUAL ERASING=1 | | | |
| | 0 | | CARSOR POSITION | | | | | |
| | 0 | | BCC | | | | | |

FIG. 25(c)

STATE : STANDBY(=0)
SUBSTATE : READY(=1)
CASE NO. : 10

SENTENCE :
```
READY FOR COPYING (FRONT)      ※※ mm
▤▥ ONE-SIDE → DUAL              ※※ COPY
```

TRANS. DATA DETAIL

| 7 | 6 | 5 | 4 | 3 | 2 | 1 | 0 |
|---|---|---|---|---|---|---|---|
| 1 | CONTROL WORD ||||||||
| 0 | | STATE ||| SUB STATE ||||
| 0 | CASE NO. |||||||
| 0 | | LEFT BINDING =1 | RIGHT BINDING =1 | BINDING AMOUNT $10^1$ |||||
| 0 | mm IND. =1 | | | BINDING AMOUNT $10^0$ |||||
| 0 | | | | SET NO. $10^1$ |||||
| 0 | BL=1 G=4 | R=2 BR=5 | B=3 | SET NO. $10^0$ |||||
| 0 | | | | | | | | |
| 0 | BCC |||||||

FRAME ERASING =1

CONTINUOUS PAGING =1

ONE-SIDE → DUAL =1
DUAL → DUAL =2
DUAL → ONE-SIDE =3

(a)

(b)

(c)

(d)

(e)

(f)

(g)

(h)

(i)

(j)

(k)

(l)

FIG. 27(a)
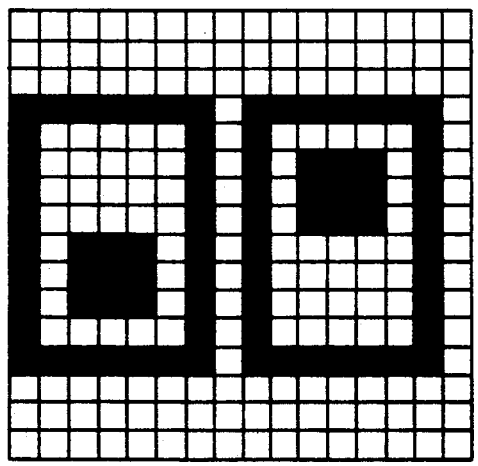
FIG. 27(c)
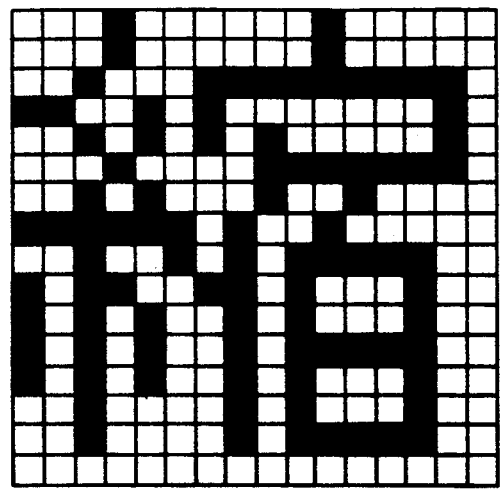
FIG. 27(b)
| 00 | 00 |
|----|----|
| 00 | 00 |
| 00 | 00 |
| FE | FE |
| 82 | 82 |
| 82 | BA |
| 82 | BA |
| 82 | BA |
| BA | 82 |
| BA | 82 |
| BA | 82 |
| 82 | 82 |
| FE | FE |
| 00 | 00 |
| 00 | 00 |
| 00 | 00 |
FIG. 27(d)
| 10 | 20 |
|----|----|
| 10 | 20 |
| 23 | FE |
| CA | 02 |
| 2A | 82 |
| 10 | FE |
| 28 | 90 |
| FD | 20 |
| 25 | 7C |
| 83 | 44 |
| A9 | 44 |
| A9 | 7C |
| A9 | 44 |
| 21 | 44 |
| 21 | 7C |
| 00 | 00 |

FIG. 35(a)

| MSG NO. | CASE NO. | JAPANESE MESSAGE | |
|---|---|---|---|
| 1.2.7 | 7 | READY FOR COPYING ⓖⓖⓖⓖⓖ | ** COPY |
| 1.2.10 | 10 | READY FOR COPYING (FRONT)<br>ⓖⓖⓖⓖⓖⓖⓖⓖⓖⓖ | ** mm<br>** COPY |
| 1.2.11 | 11 | READY FOR COPYING (REAR)<br>ⓖⓖⓖⓖⓖⓖⓖⓖⓖⓖ | ** mm<br>** COPY |
| 1.2.1 | 1 | READY FOR COPYING<br>ⓖⓖⓖⓖⓖⓖⓖⓖⓖⓖ | ** mm<br>** COPY |

FIG. 35(b)

| 7.1.28 | 28 | AREA *<br>SELEC.ⓖ  SETⓖ | ⓖ X1 ***  Y1 ***<br>ⓖ X2 ***  Y2 *** |
|---|---|---|---|
| 7.1.31 | 31 | WHICH DO YOU SELECT ?<br>Kⓖ COORDINATE CORREC./CONF. | SELEC.ⓖ  SETⓖ<br>Kⓖ EXT.⟶ⓖDELT. |
| 7.1.32 | 32 | WHICH DO YOU SELECT ?<br>Kⓖ COORDINATE CORREC./CONF. | SELEC.ⓖ  SETⓖ<br>Kⓖ DELT.⟶ⓖEXT. |
| 7.1.33 | 33 | WHICH DO YOU SELECT ?<br>Kⓖ COORDINATE CORREC./CONF. | SELC.ⓖ  SETⓖ<br>Kⓖ DUAL-COLORING |

FIG. 35(c)

① WHICH DO YOU SELECT ?
▶ ☐ COORDINATE CORREC./CONF.    SELEC. ▶    SET ↓
                                  ◣◥ DUAL COLORING

② WHICH DO YOU SELECT ?
▶ ☐ COORDINATE CORREC./CONF.    SELEC. ▶    SET ↓
                                  ☐ EXT. → ☐ DELT.

③ WHICH DO YOU SELECT ?
▶ ☐ COORDINATE CORREC./CONF.    SELEC. ▶    SET ↓
                                  ☐ DELT. → ☐ EXT.

④ AREA 1
SELEC. ▶    SET ↓
☐ ▶ $X_1$ nnn    $Y_1$ nnn
☐    $X_2$ nnn    $Y_2$ nnn

ICON AIDED RUN FUNCTION DISPLAY SYSTEM

This application is a continuation of application Ser. No. 07/266,536, filed Nov. 2, 1988, now abandoned.

FIELD OF THE INVENTION

The present invention relates to an icon aided run function display system in which a function is selected from among a plurality of functions appearing on a display means for displaying the selected function upon the termination of selection. Further, the present invention relates to a run function display system for displaying a run function for use in copying machines, facsimiles, and recording apparatus such as printers for recording image data. The run function display system is equipped with multiple functions for selective use.

BACKGROUND OF THE INVENTION

The consumer market for copying machines has become diversified and the demand for specific type machines has increased. As a result, now multifunctional and highly sophisticated copying machines are being developed for the market. Examples of relatively new functions available for a copying machine include the function for: allowing setting a reduction/magnification ratio that is optionally adjustable in increments of 1% when copies of originals are taken; taking multicolored copies using toner of more than one kind or monochromatic copies using selected color toners; successively copying the pages of a bookbound original one page after the other without moving the original; copying on sides of copying paper automatically and continuously; editing a plurality of originals through dualization or deletion; a job memory wherein copying conditions are automatically set by having the copying machine read the copying conditions stored in IC cards; and, other functions which will be described later.

Increasingly multifunctional recording apparatus for recording image data, such as fascimiles and printers, are being manufactured for the sophisticated user. However, the above-mentioned functions are seldom used even though the recording apparatus is made multifunctional. The frequency of use of particular functions depends on the type of business using the machine. To allow purchasers to select models based on their individual needs, products ranging from high class models provided with various functions to special models having a combination of functions have been provided. Further, in response to future demands, additional devices may now be purchased and selectively attached.

The range of desired functions must be selected when making the multifunctional recording apparatus. Conventionally, operating mechanisms such as switches and buttons or keys for use in selecting available functions and display mechanisms such as display panels and lamps have been installed on console panels. Consequently, multiple functions may be successively selected by operating the console panel.

The advantage of a multifunctional apparatus is that it is usually easy to repair and offers a wide range of applications. However, serious difficulties exist with a multifunctional apparatus. As the number of available consumer options increases and the number of additional distinct models increases the initial production costs also increase which will be reflected in a higher price tag for the recording apparatus. Although special models provided with various combinable functions are available, there is frequently no model that is equipped with only those features required by a specific user. Accordingly, there is a need for a affordable recording apparatus that is useful to the user and possesses excellent operability allowing ready selection, operation, and checking of any function. Further, there is a need for an economical apparatus having functions that can meet individual user requirements.

Conventional copying machines having a variety of functions tend to be bulky in size, complex in construction, and complicated to operate. Moreover, conventional copying machines are often difficult to operate and, therefore, induce user errors. These difficulties may arise, in part, because as a recording apparatus is made multifunctional in instances where each function requires a mechanism for selecting it. This increases the number of operating mechanisms, such as switches, keys, and buttons, on the operating panel. As the number of function selective operating steps increases the complexity of the operating procedure increases to such an extent that the operating steps cannot be used in conjunction with the selective operating mechanisms.

SUMMARY OF THE INVENTION

An object of the present invention is to overcome the problems and disadvantages of the prior art.

Another object of the present invention is an apparatus for selecting an additional device display, having a small number of operating mechanisms so that selective setting of the additional device by means of a single operating panel is easy to understand despite variations in usable functions.

A further object of the present invention is an icon aided run function display system designed to eliminate futile operation of a recording apparatus by displaying run functions intelligibly at the time when a predetermined function selective operation is performed in order to implement each run function.

To achieve the above and other objects and in accordance with the purposes of the present invention, as embodied and broadly described herein, the invention comprises an icon aided run function display system wherein a function may be selected from a plurality of choices shown on a display means and having a function selection means for selecting the function and terminating the selection, the display system comprises an apparatus for selecting an additional device display in a recording apparatus having a plurality of selectively attachable devices, a call selectable system having a function selection key wherein a plurality of selection functions and a function selection message are simultaneously displayed with the operation of a cursor.

BRIEF DESCRIPTION OF THE DRAWINGS

The accompanying drawings, which are incorporated in an constitute a part of this specification, illustrate several embodiments of the present invention and together with the description, serve to explain the principles of the present invention.

FIG. 23 shows a timing chart of serial communication within the copying machine of the present invention;

FIGS. 24(a) and 24(b) are diagrams of a structure of serial communication data within the copying machine of the present invention;

FIGS. 25(a), 25(b), and 25(c) are block diagrams of the message transmission table within the copying machine of the present invention;

FIGS. 27(a) and 27(b) are a diagram of an icon and corresponding format data stored in a ROM of the display controller of the present invention;

FIGS. 27(c) and 27(d) are a diagram of an icon and corresponding format data stored in a ROM of the display controller of the present invention;

FIGS. 35(a), 35(b), and 35(c) illustrate the relationship between a message No., a case No. and a message sentence;

DETAILED DESCRIPTION OF THE PREFERRED EMBODIMENTS

Figure 1A:
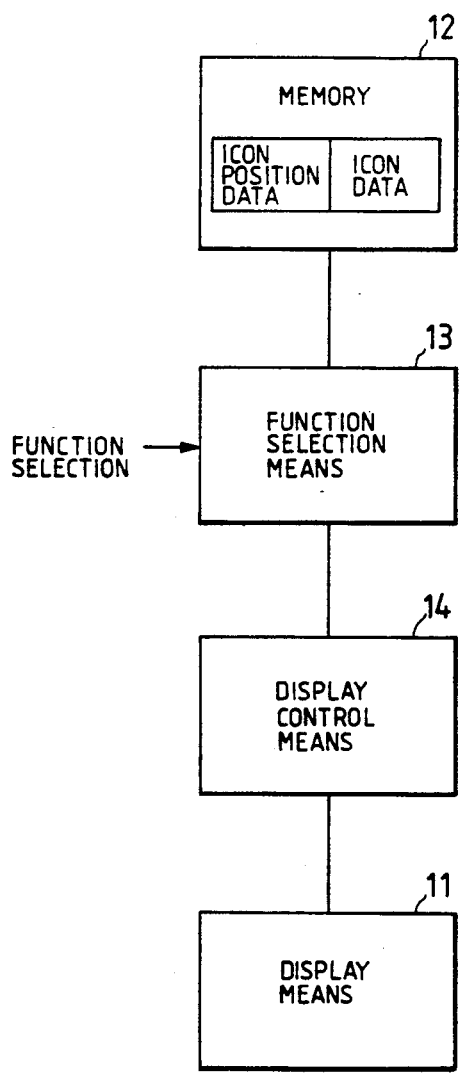
FIG. 1A shows a block diagram of the principle of the present invention.
Figure 1B:
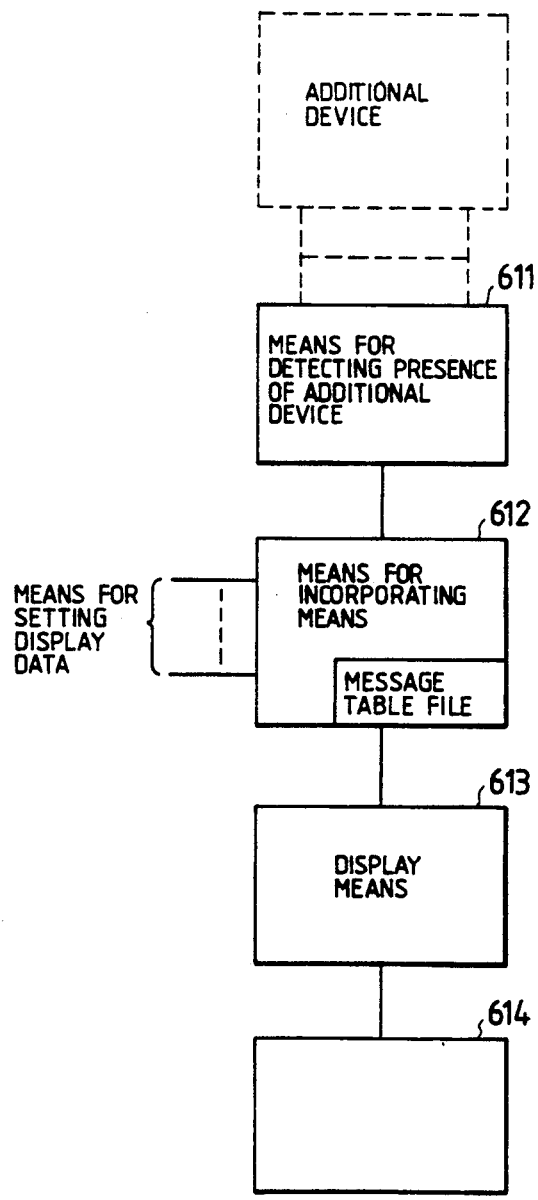
FIG. 1B shows the apparatus for selecting an additional display device in the recording apparatus of the present invention.
Figure 1C:
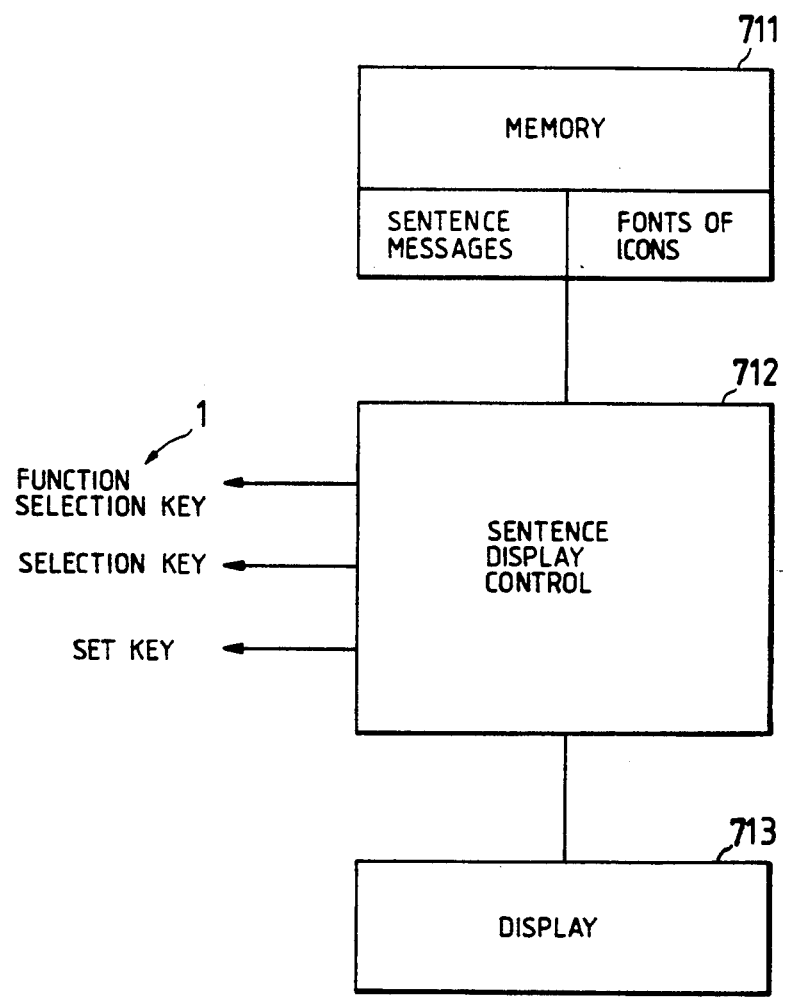
FIG. 1C shows the call selection system of the present invention.

As shown in FIGS. 1(A) to (C), the apparatus for selecting an additional display device in the copying machine of the present invention is constructed so that a plurality of additional devices may be selectively attached and used. Means 611 for detecting the presence of an additional device are provided and are connected to means 612 for setting display data based on the presence or absence of the additional device. A combination of operating switches and display means 613 for displaying the display data in various fonts are provided. The present invention allows a selected message, together with choices of functions, to be displayed, so that functions may be selected in accordance with the message.

The means 612 for setting the display data includes a message table file for storing a message table corresponding to the presence or absence of every additional device which is attached and incorporating menus for displaying and selecting usable functions. The means 612 for setting the display data reads messages stored in the message table in response to the presence of additional devices associated with the messages and the combination of the switches operated. In the process of setting the display data, the means 612 also erases from the display data any messages associated with absent devices to prevent the message from being displayed.

When the operator selects a function, the means 611 detects the presence or absence of the additional devices intended for the selection of a function. When the duplex copying function is used in a copying machine, for instance, the operator operates the duplex switch to cause the machine to detect whether the automatic original feeder for duplex copying and the intermediate tray are present. When the additional devices exist, the message table of the selective menu which shows the specific choice of the usable function, is read out and stored as display data. Subsequently, the operator operates the operating mechanism, such as switches, keys or buttons, according to the displayed menu and the corresponding message table is successively read out to provide the display data.

The message tables are provided with messages for many selectable functions, and the number of message tables stored may be decreased after each situation to save file storage space and simplify the process. In this case, the choice is erased by the means 612 for setting display data. The sentence to be displayed comprises a train of characters consisting of Katakana and Kanjis characters and alphanumeric letters and symbols as well as icons (pictorial symbols; image characters) and asterisks.

As shown in FIG. 1C, a call selection system having a function selection key is provided which comprises memory 711 for storing a train consisting of Katakana, Kanji, and alphanumeric character, icons and codes. The characters are used to represent messages or choices. The call selection system further comprises a cursor, character data constituting the message sentences and fonts of icons, sentence display control means 712 for reading the sentence from the memory 711 and developing the sentence into fonts by rewriting the cursor position in the sentence in accordance with the input of the set key; and, display means 713 capable of displaying the train of characters and the fonts of icons.

The function selection key is operated to display the message for the selection of functions, to display a plurality of functions that may be selected and to move the cursor to one of the selected functions. When the selection key is operated, the cursor is moved to the next choice among the icon display positions. The function located at the selected curcor icon display position is selected when the set key is operated. Accordingly, the choices appearing as a group of functions displayed by the display means 713 are selected one at a time by the operation of the function selection key 1. Within the range of displays, the choices are designated. The set key is employed to select the functions.

When the operator operates the function selection key 1 to select a desired function in the call selection system, functions classified into predetermined groups are displayed on the screen of the display means in conjunction with selective messages as choices. The only thing the operator has to do is to operate the function selection key 1 to select the group of functions. Accordingly, the number of functions that must be selected by the operator by the function selection key 1 is reduced significantly. Alternatively, an arrangement may be made to alter the function selection sentence displayed each time a function selection key 1 is operated. In any event, choices may be made and inputted by the operation of the selection and set keys jointly when the function selection sentence is displayed. The displayed sentence is easy to see and understand how to operate the sentence display while forming the train of characters and icons.

As stated above, as copying machines become increasingly multifunctional, each function requires a mechanism by which it may be selected. This causes an increase in the number of operating mechanisms such as switches and keys or buttons on the operating panel. For example, a copying machine equipped with an automatic original feeder for duplex copying and an intermediate tray has four distinct functional options: one-sided original/one-sided copy; one-sided original/duplex copy; duplex original/one-sided copy; and duplex original/duplex copy. Further it is now possible to install intermediate trays, and units for performing color marking, continuous dual color copying, partial color conversion, sheet and parallel dualization. The necessity of selecting and operating a suitable one from among so many functions inevitably increases the number of switches and buttons or keys, provided an operating mechanism is allotted to each function.

Attempting to select certain functions using the combination of operating mechanisms increases the number of operating steps in the function selective operation. Consequently, the operating procedure is further complicated. The problem is that the operating steps cannot be used in conjunction with selective operating mechanisms. In the case of a copying machine, it may go unnoticed that a function different from the intended function may be selected. Wasted copies will then be produced and as the number of waste copies increases the copying machine becomes uneconomical to use.

In a further embodiment of the present invention, an icon aided run function display system allows the selection of a function from among a plurality of functions displayed on display means. The function selected may be displayed following the selection. As shown in FIG. 1(A), the icon aided run function display system comprises display means 11 capable of displaying a train of characters and icon fonts, a memory 12 for storing separately a sentence having icon position data according to which icons of a run function are written and icon data, function selection means 13 for selecting a function using a set input by developing the sentence that it has read out from the memory 12 in conformity with the function selective operation into a font and displaying the font on the display means, and display control means 14 for reading out the sentence from the memory 12 and developing it into font data and further displaying the font on the display means 11 in the proper position when the function selection means terminates the selection.

Upon receiving instructions as to the selection of a function through the operation of a switch, the function selection means 13 reads out from the memory 12 a sentence on a selection menu which comprises a train of characters and icons, displays the sentence and if a set input exists, further selects the function according to a display menu. When a duplex switch is selected, for instance, the function selection means reads a sentence from the memory 12. The sentence may have the choice of functions regarding one-sided original/duplex copy, duplex original/one-sided copy and the like in addition to duplex original/duplex copy. If the one-sided original/duplex copy function is selected, the function selection means selects that function. When the function based on the selection is implemented, the display control means 14 reads a run sentence "Start Copy" from the memory 12 and adds the function to be executed, for example, icons of one-sided original/duplex copy, to the sentence.

In the icon aided run function display system with the aforementioned means the function selection means 13 reads a sentence from the selection menu from the memory 12. The selection menu includes the editing, duplex, and other functions that are selected by performing the function selection operation by using the switches and the keys or buttons disposed on the console panel. When the function selection instructions are given according to the menu displayed, the run function is set and the sentence on the run menu is read by the display control means 14 from the memory 12. The icons corresponding to the selected run menu are also read from the memory 12 and written to the position designated in the sentence. When the sentence is displayed, it is instantly determined whether the function specified by the icon has been selected because the icon of the run function is displayed in the sentence.

In this embodiment, a description will be given of an icon-aided run function display system equipped with switches and displays for selective operations, the switches and displays being disposed on a console panel of a recording apparatus comprising a copying machine. Prior to the commencement of the description, the following headings are provided for the respective articles: in the following description, (1)–(5) refer to the total construction of the copying machine to which the present invention is applied and (6) to the icon-aided run function display system according to the present invention applied to the copying machine.

Figure 2:
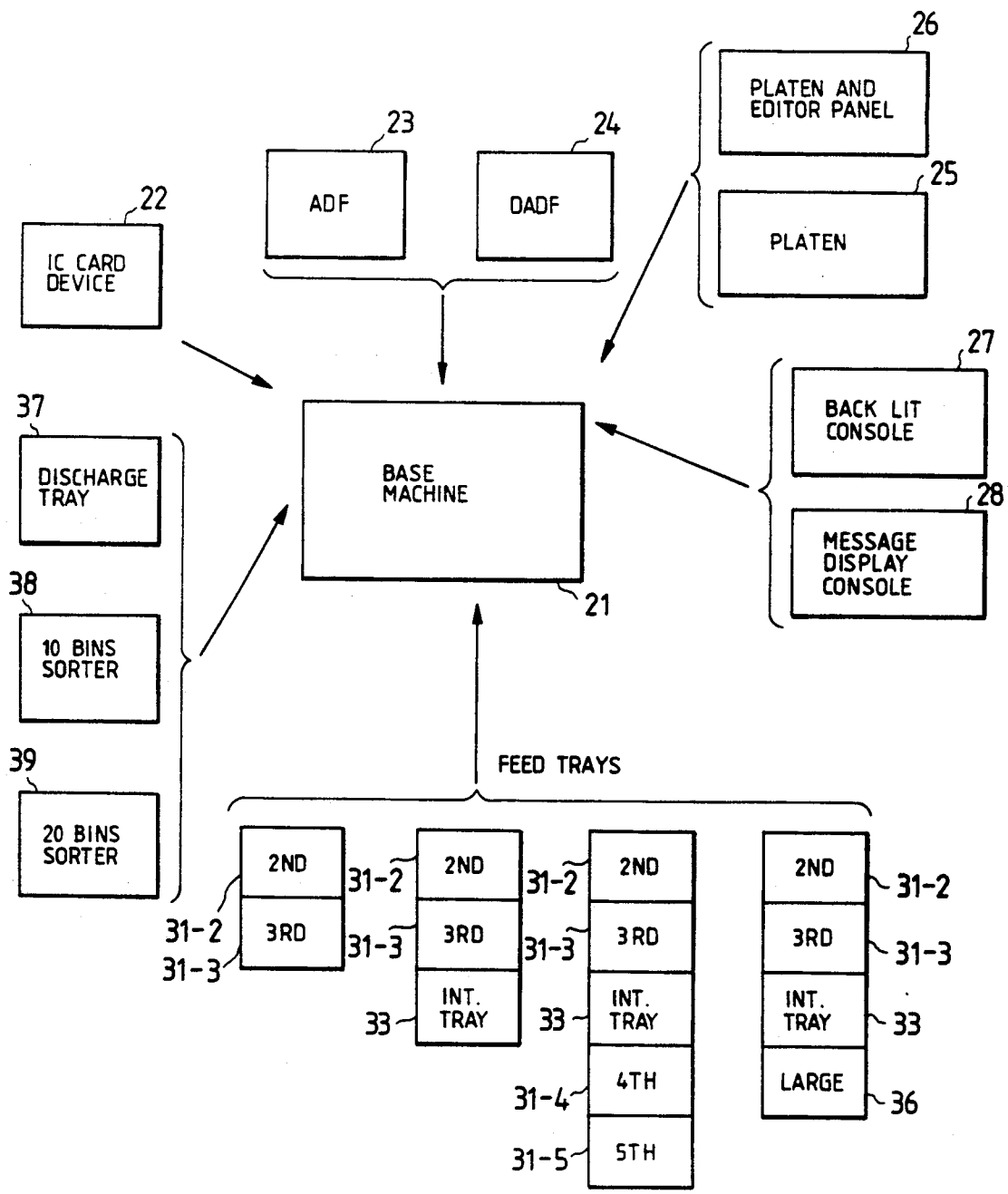
FIG. 2 shows the system configuration of the copying machine of the present invention.

(1) System configuration of copying machine
(2) Software package
   (2-1) Advantages of software combination
   (2-2) Examples of differentiation
(3) Example of construction of copying machine
(4) Circuit configuration of copying machine
(5) Detailed circuit configuration of copying machine
   (5-1) Periphery of photoreceptor drum
   (5-2) Switching mechanism of developing device
   (5-3) Optical system
   (5-4) Fixing device
   (5-5) Control of console
   (5-6) Billing counter
   (5-7) Power supply
   (5-8) Conveying system
   (5-9) DADF
   (5-10) Sorter
   (5-11) Intermediate tray
   (5-12) Editor pad
   (5-13) Large capacity tray
(6) Selection and display of functions
   (6-1) Additional devices and additional functions
   (6-2) Function selective system configuration
   (6-3) Communication protocol
   (6-4) Message transmission table and transmission data structure
   (6-5) Icon and font data
   (6-6) Construction of main controller and display controller
   (6-7) Display selective process
   (6-8) Processes in main and display controllers
   (6-9) Sentence displayed on liquid crystal display FIG. 2 shows a system configuration of a copying machine according to the present invention. In order to upgrade the functions of a copying machine, additional devices may be fitted to a base machine 21. The base machine may be equipped with a feed tray of one stage and a manual feed tray and be used to make a copy of an original by manually setting the original on a platen glass plate. The following are additional devices which can be fitted to the base machine.

An IC card device 22 may be used to supply necessary data to the base machine 21 by using IC cards and to write data from the base machine 21 to the IC cards. The data or coordinate data is read by means of an editor panel (described later). The editor panel is connected to the IC card device 22 to carry out the input operation. In one embodiment, the IC card device 22 is designed to control the IC card and alternatively the editor panel. However, it is not possible to read data simultaneously from both of them.

The IC card for use in the IC card device has an ISO type interface with a memory capacity of 32 kilobytes. The use of IC cards permits not only the storage of complicated data but also automated and multifunctional operation of the copying machine. By providing IC cards, classified by industries or customers, a copying machine operating method adopted by each group of owners can be implemented even if the copying machine has complicated functions. As a result, the copying machine becomes quite easy to operate without errors.

Generally, ADF 23 (automatic document feeder) is designed to feed originals one after another onto the platen glass plate of the base machine 21 and to discharge the original after completion of exposure. Normally, with an ADF 23 only one predetermined side of the original is exposed to light. However, a DADF 24 (duplex automatic document feeder) may be included as an automatic original feeder for copying both sides of an original. The DADF 24 operates to convey an original in so that one side of the original faces the platen glass plate to effect a first exposure then inverts the exposed original when returning it to the tray of DADF 24. Thereafter, the side opposite to the exposed side is exposed upon subsequent feeding. The base machine 21 is arranged so that two sides of copying paper can be used independently for copying. Further, it is equipped with the additional devices which are subsequently described.

Although the ADF 23 and the DADF 24 are usable independently of the copying machine, copy-making may be carried out automatically to copy both sides of originals and copies in combination. In this embodiment, the ADF 23 is essentially constructed similar to any of the conventional automatic original feeders for use in copying machines except that originals are inserted left to right facing the apparatus to prevent them from overflowing the base machine 21.

A platen 26 with an editor panel may be provided for editing originals on the platen and a conventional platen 25 is not equipped with such a mechanism.

There are two kinds of console panels, namely, back lit type console panel 27 and message display console panel 28. The back lit type console panel 27 has a display panel on which messages are arranged in predetermined locations and the messages are selectively lit by a lamp or the like in order to make them readable. The console panel 28 with a message display is formed with liquid crystal elements having the advantage that various messages can be selectively displayed at anytime within a relatively small area of display.

Japanese Patent Application (OPI) No. 77140/82, discloses not only the addition of a large capacity tray but also a combination of feed trays to meet the needs of customers and this structure is utilized in the copying machine depicted in FIG. 2. Applicants' Japanese Utility Model Application No. 081016/86 "Multistage Paper Feed Copying Machine" represents a combination of feed trays. The combination feed trays of the present invention are as follows:

(a) Second and third feed trays 31-2, 31-3.

The addition of these two feed trays allows copying paper of three different sizes to be fed to the base machine 21.

(b) Second and third feed trays 31-2, 31-3 and an intermediate tray 33. The intermediate tray 33 is employed to accommodate copying paper temporarily when one side of the paper is used for copying a plurality of times or when both sides are alternately used for copying.

(c) Second and third feed trays 31-2, 31-3, intermediate tray 33, and fourth and fifth feed trays 31-4, 31-5.

(d) Second and third feed trays 31-2, 31-3, intermediate tay 33, and large capacity tray 36. The large Capacity tray is a feed tray capable of accommodating several thousand sheets of copying paper.

Copying paper is normally received by a discharge tray 37. A 10 bin sorter 38 and a 20 bin sorter 39 may also be provided for sorting 10 or 20 copies of a multipage document.

As set forth above, the additional devices may be selectively fitted to the base machine 21 in the copying machine system to provide a suitable copying machine suitable for the individual needs of a customer. Moreover, functional upgrading of the copying machine can be attained as required.

Customers who do not want to obtain enlarged or reduced copies of originals or a large number of copies at a time may often purchase only the base machine 21. Those who need a large number of copies or a complicated copy-making operation often require the addition of the intermediate tray 33 and the large capacity tray. The copying machine of the present invention is designed for the simple replacement and detachment of additional devices in order to enhance requirement versatility. An independent Central Processing Unit (CPU) is provided for a group of additional devices to effect decentralized control operation by a plurality of CPUs. As a result, copy-making innovation is accelerated. The copying machine system of the present invention appeals to customers because it helps increase the productivity of office business processing.

(2) Software Package (2-1) Advantages of Software Combination

The system configuration of the copying machine as described above is further explained by reference to the software combination it utilizes. Since various additional devices can be fitted to the copying machine, the software is made to conform to the system configuration corresponding to an arrangement of additional devices.

One of the reasons for the adoption of such software package is that, if control programs for use in operating all of the additional devices are to be provided in the base machine 21, a large memory capacity would be required. Moreover, when additional devices are developed or when improvements are made in the existing ones, they can be utilized without the replacement of the Read Only Memory (ROM) in the base machine 21 or the addition of a new one.

Accordingly, two areas are provided in the base machine 21, namely, a basic storage area for use in controlling the basic part of the copying machine, and an additional storage area where the programs read from IC cards are stored. In the additional storage area, various programs for controlling the ADF 23, the DADF 14, the console panel 28, etc., are stored. After the predetermined additional devices are fitted to the base machine 21 and an IC card is set in the IC card device 22, a program for the copy-making operation is read out and loaded on the additional storage device. The loaded program may control either the copy-making operation in cooperation with the program written to the basic storage area or may have priority.

(2-2) Examples of Differentiation

The program stored in the IC card controls some of the additional functions of the copying machine. Accordingly, one mode of using the copying machine can be differentiated from the other by replacing the card with a new one which stores a different program. In the case where because of budget constraints a copying machine for common use is installed in a building housing a number of independent business institutions or in a company/factory having different departments or sections, an instrument for user identification and copy counting is normally employed to control service conditions on a department or section basis.

If all the expenses for the use of the copying machine were divided among various users having differing operational requirements depending on the volume of copying, then users with a small volume would be opposed to the introduction of a copying machine equipped with various additional devices.

FIG. 2 shows a copying machine having a relatively high grade system configuration comprising the base machine 21, the IC card device 22, the DADF 24, the sorter 38, the console panel 28, the second-fifth feed trays 31-2-31-5 and the intermediate tray 33. The various users may include those who do not need a DADF 24, a sorter 38, or other additional devices.

The problems with the conventional copying machine can be solved by alloting an IC card to each user to let users who want high levels functions bear greater basic expenses in proportion to the respective production rates. The owner of the highest level IC card, for instance, is allowed to freely use the DADF 24, the sorter 38, the second-fifth feed trays 31-2, 31-5 and the intermediate tray 33 by operating the copying machine while its IC card is set in the IC card device 22. On the other hand, the user who does not want to have copying paper sorted can save the expenses by setting its IC card lacking a sorting program and using the uppermost bin of the sorter 38 as a discharge tray.

Secondly, assuming that a user is running a self copy service store using IC cards, the present invention proposes that a plurality of copying machines be disposed in the store being equipped with IC card devices, respectively. Each customer may then ask for an IC card corresponding to his desired mode of service and by setting the IC card in the desired copying machine he can make copies on a self service basis. The customer who is unfamiliar with the operation of a copying machine may be given an IC card incorporating an operational instruction display function in the program.

The use of the DADF 24 or the execution of multicolor recording may be determined by a lend lease IC card. The storekeeper will be able to assign a copying machine at a proper rate to a particular customer by limiting the functions of the copying machine. A storekeeper can instantly charge a selected fee by writing copy making data to the IC card, the data including the number of sheets, the size of copying paper used and etc. Thus, a storekeeper may freely and carefully decide what options to make available such as offering copying fee discount service to regular visitors.

Thirdly, the present invention is helpful in the situation where a service uses an IC card that stores a program intended for a specified user. Specifically, in patent attorneys' offices, enlarged copies, e.g., 200% enlarged copies, are often necessary to achieve full scale copies. This is because patent gazette photos must be examined in full scale but are published in a reduced state. Moreover, the original drawings may have to be reduced or enlarged by fractional amounts. Further, in government secrecy situations resident card copy-making sections of municipal offices or ward offices, certified copies or abstracts of the originals may be desired with image data in columns or portions omitted to protect the privacy and confidential data.

Users may demand special modes of use for copying machines. If the functions of copying machines are set to meet such requirements, the console panels become complicated in construction and the ROMs inside the copying machines become large in size. Consequently, IC cards classified by special uses may be used to provide a variety of copying machine functions.

In the case of patent offices, the purchase of IC cards for special use allows them to simply select 200% enlargement or reduction in addition to several ordinary kinds of enlargement or reduction. It also becomes possible for enlargement or reduction at steps of, e.g., 1% within a range of required fine adjustments. In the government offices with secrecy concerns, instructions concerning kinds of resident cards, columns and items to be deleted, etc. can be displayed on liquid crystal displays by pressing selected keys. By pressing the start key, the desired range of the original may be copied or necessary contents may be edited before being recorded.

(3) Example of the Construction of Copying Machine

Figure 3:
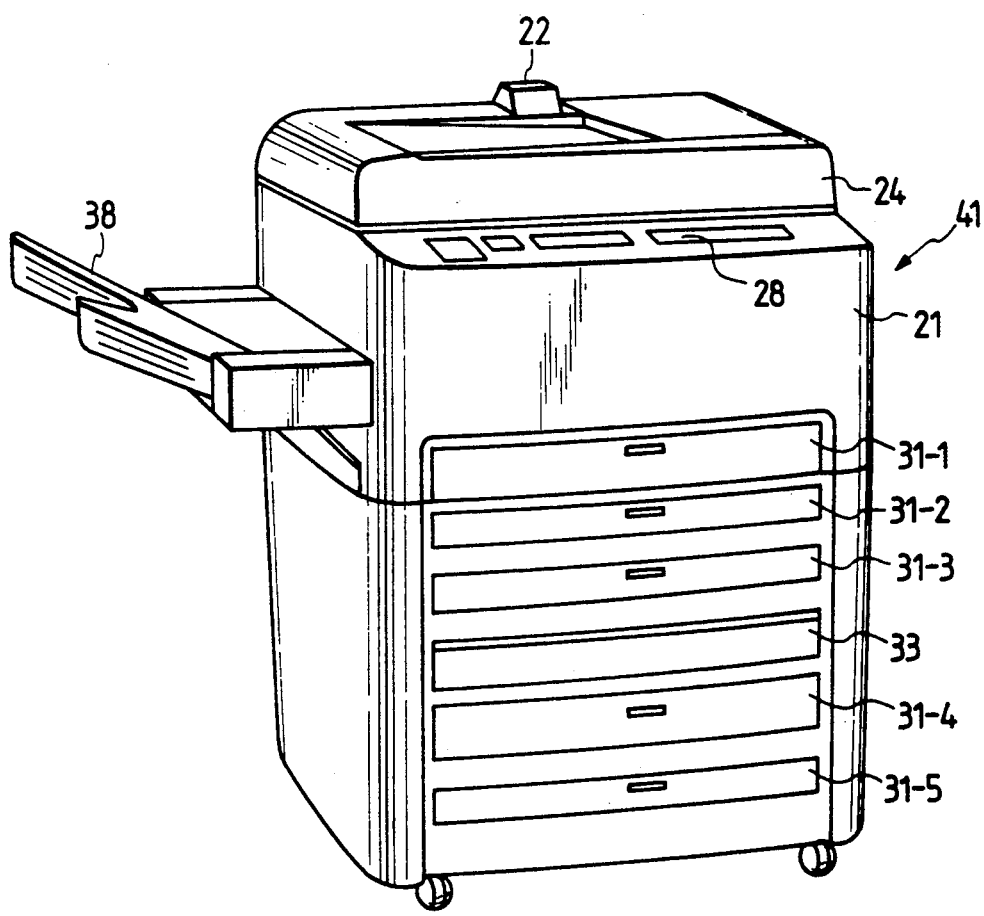
FIG. 3 shows an example of a front view of the copying machine of the present invention.

FIG. 3 shows a front view of an example of the system configuration of the copying machine of FIG. . In this embodiment, the DADF 24 is installed on the base machine 21 and the IC card device 22 is arranged at the rear. The console panel 28 having a message display is provided on the side surface of the base machine 21. A tray 41 for manual insertion is fitted on the right side of the copying machine. The 10 bin sorter 38 is fitted on the left side.

As set forth above, the base machine 21 is fitted with the first feed tray 31-1 as a basic component. In this copying machine, the second and third feed trays 31-2, 31 3 are disposed under the first tray 31-1. The fourth and fifth feed trays 31-4, 31-5 are arranged with the intermediate tray 33 sandwiched therebetween. All of these feed trays 31-1 to 31-4 and the intermediate tray 33 can be slid out and removed.

Figure 4:
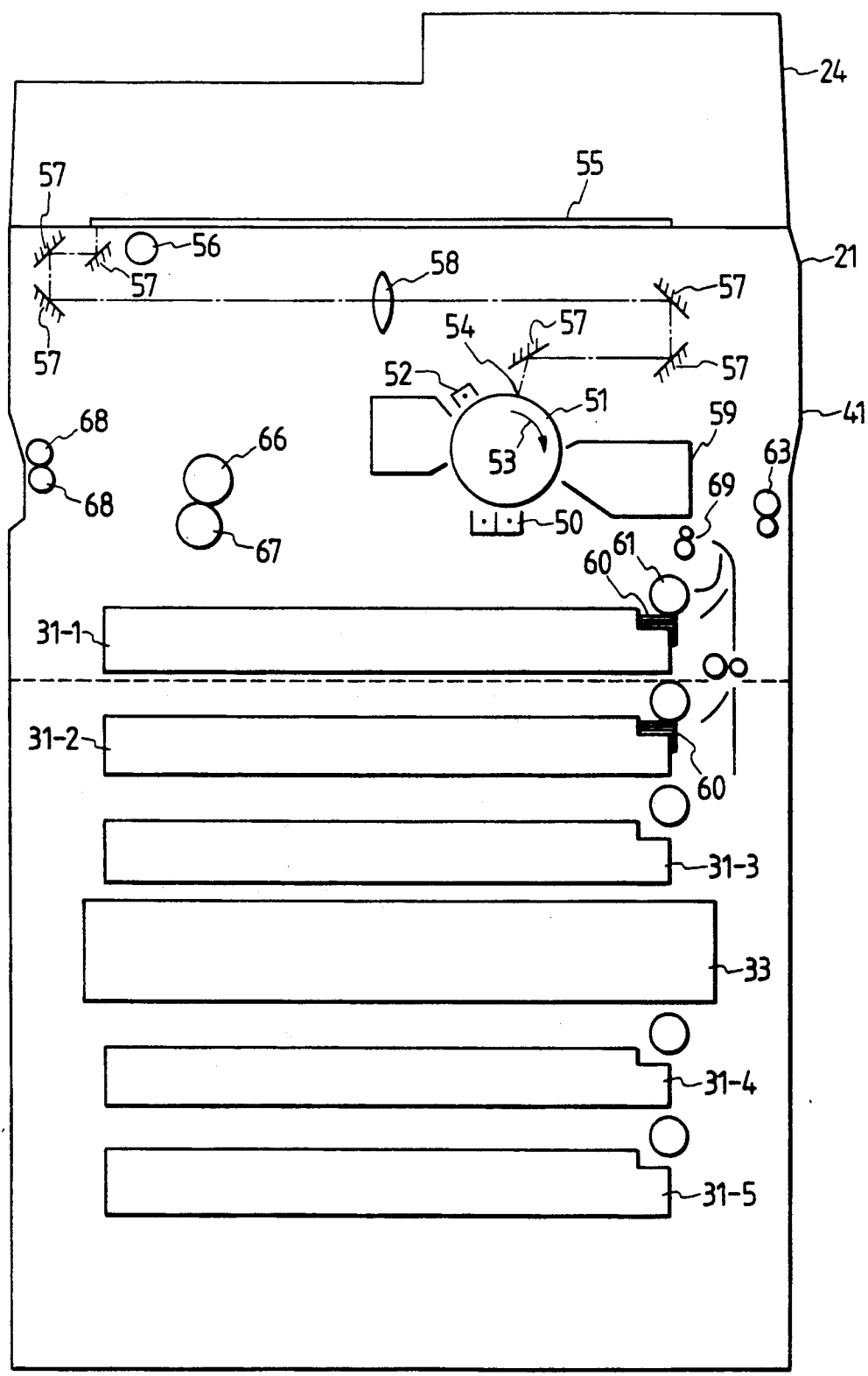
FIG. 4 show a schematic block diagram of the copying machine of the present invention.

FIG. 4 shows a schematic view of the copying machine, wherein a photoreceptor drum 51 is contained in the base machine 21. The photosensitive drum 51 is uniformly charged by a charge corotron or charger and turned at a fixed speed in direction of arrow 53. The charged surface is exposed to light in an exposure range 54. Optical images of an original that is placed on a platen glass plate 55 and disposed on the base machine 21 are incident on the exposure range 54. For this purpose, an arrangement is made using an exposure lamp 56, a plurality of mirrors 57 for transmitting the light reflected from the surface of the original illuminated thereby, and an optical lens 58. Part of the arrangement may be scanned for the purpose of reading the original.

Electrostatic latent images corresponding to the original are formed on the photoreceptor drum 51 by the image data exposed in the form of slits in the exposure range 54. The electrostatic latent image is developed by a developing device 59 and converted to a toner image. The toner image moves as the photosensitive drum 51 turns and passes by a transfer corotron 50 or other transfer device.

Before being passed between the photosensitive drum 51 and the transfer corotron 50, copying paper 60 is sent out by a feed roll 61 or rolls 63 and guided by conveyer rolls 69. Copying paper 60 is located on the first feed tray 31-1 and fitted to the base machine 21 or manually fed along the tray 41 for manual insertion. At this time, the toner images are transferred onto the copying paper 60. After the transfer is passed between a heat roll 66 and a pressure roll 67 the copying paper 60 is subjected to heat fixing. Subsequently, the copying paper 60 is passed between conveyer rolls 68 and discharged onto a discharge tray.

The DADF 24 is fitted to the base machine 21. Thus, both sides of the original can be placed successively on the platen glass plate 55. In this case, one side of each of the originals piled up in the original container of the DADF 24 is first set on the surface of the platen glass plate 55. When a copy is taken, the original is turned upside down and reset in the container. The original is then sent to the platen glass plate 55 again.

Although five trays 31-2 to 31-5 and 33 have been installed under the base machine 21, a cabinet may be substituted to accommodate expendables. Moreover, the copying machine having the base machine 21 left intact may be mounted on a desk and used as a desk top copying machine. Needless to say, only the second feed tray 31-2 may be installed under the first feed tray 31-1, so that the copying machine with this arrangement also may be mounted on a desk.

Figure 5:
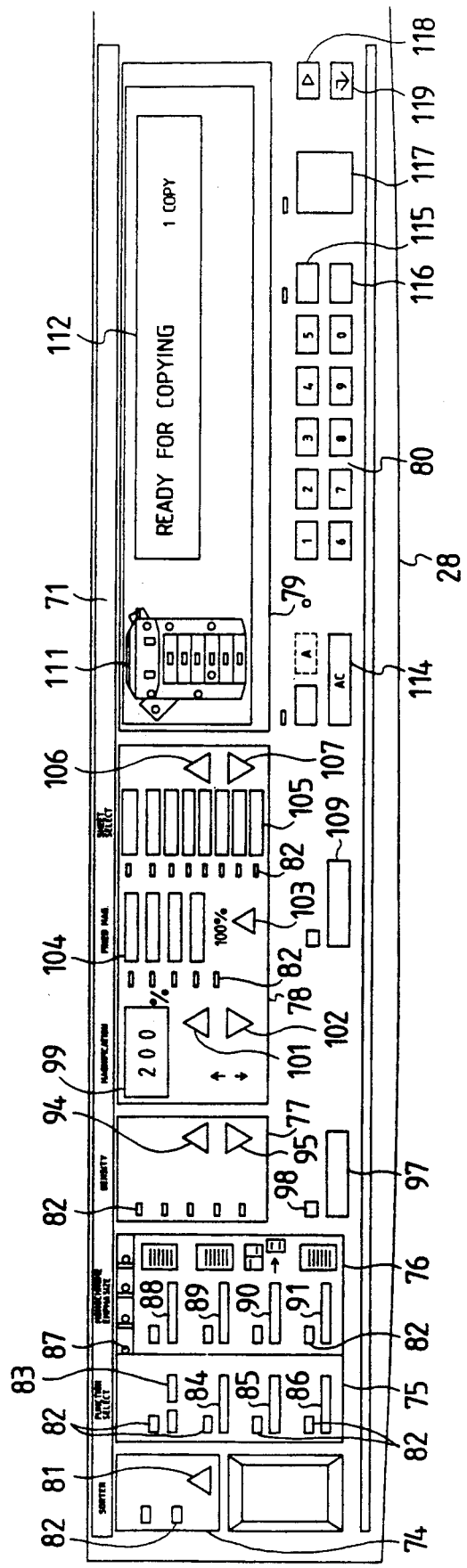
FIG. 5 shows a top view of a console panel of the copying machine of the present inventions.

FIG. 5 shows a top view of the console panel of the copying machine. Japanese Utility Model Application No. 130320/86 entitled "Display Unit" and Japanese Utility Model Application (OPI) No. 179792/87 entitled "Character Display Unit" represent the prior art. Japanese Utility Model Application No. 130320/86 discloses the provision of a graphic display area through a dot pattern in a copying machine, suggesting the use of the graphic display area in order to make various kinds of display. In a copying machine capable of copying part of an original, moving and deleting a picture, for instance, an image sensor reads an image in the area intended while the original is placed on the platen with the instruction of displaying its contour in the graphic display area. As a result errors in area setting and misoperation are prevented.

A plurality of console panels may be adopted. However, the console panel 28 with a message display is employed in the copying machine in the above described embodiment.

A menu display plate 71 is arranged above the console panel 28 and the contents of the respective panel sections 74-79 are displayed with characters. A switch 81 and two display lamps 82 are disposed in the panel section 74 for the sorter so that the sorting mode may be selected when the sorter is connected. The sorting mode consists of a stack mode in which sheets of copying paper are successively stacked and a gathering mode in which they are sorted in bins.

The copying machine of the present invention comprises a switch 83 for editing or correcting/identifying images, a switch 84 for storing images in a job memory, a switch 85 for implementing various stored copying forms, a switch 86 for making duplex copies, and display lamps 82 disposed in the function selecting panel section 75 for displaying whether or not these switches have been selected. The editing switch 83 initiates the function of reading data for editing by means of the editor panel. The correcting/identifying functions includes displaying the input data in a liquid crystal display for identification and for replacing the data. The memory used in association with the switch 84 is a nonvolatile memory composed of a random access memory backed up by a battery. Other storage media such as an IC card, a magnetic card, a floppy disk, etc., are usable as a nonvolatile memory. Image density and magnification can be preset in order to reduce the operating load of the console panel 28 by the operator. The preset values are stored in the nonvolatile memory. When the switch 85 is pressed, character data is displayed in the display panel section 79 of the console panel 28 and the desired function may be selected from the available choices.

Other functions include a continuous page copying function, a side cancelling function, and a binding-margin function. The continuous page copying function divides an original extending over two pages like a bound book into two one page sections while it is the double spread page state. The side cancelling function does not copy image data on the periphery of the image data. The binding margin function allows the setting of a right hand or left hand binding margin of a copy. The binding margin has a desired length that can be set and its value entered through the keyboard 80 at the console or selected from the values displayed on the display panel 79. Finally, the duplex copy means takes copies on both side of copying paper, respectively.

As shown in FIG. 4, when a duplex copy is made, the copying paper 60 is delivered onto the intermediate tray 33 with the first side to be copied showing. Subsequently, the copying paper 60 is sent out of the intermediate tray 33 and the second side is copied. For monochromatic copying by means of this copying machine, the first side is copied twice. In this case, the inside and outside of the copying paper accommodated on the intermediate tray 33 are turned upside down.

As shown in FIG. 5, the menu display plate 71 has four display lamps 87 disposed in the uppermost portion of the monochrome emphasizing panel section 76 under the portion displaying "For Emphasizing Monochrome" and it is used to indicate kinds of color developing agents. Individual lamps corresponding to the set colors are lit. One or a plurality of four possible color developing agents can be set in the copying machine.

One of the switches 88-91 is set and disposed in the remaining portion of the monochrome emphasizing panel section 76. A marking color switch 88 is used for marking color. If this switch is pressed to specify the area to be marked, that area is recorded with a superposed light color, and the intended effect of marking is produced.

The continuous color synthesizing switch 90 is used to record one color in the specified area of a copy. A figure to be displayed with color is placed e.g., on the right hand side of the platen glass plate 55 and an original is set on the left hand side. When a copy is made in the aforesaid condition, the image data of the original is copied in black and the figure is drawn in one color. If the figure specified is formed of dots, the colored figure is adjusted to the desired density by the reproduction of the dots and then recorded in the design or merchandize area which is set on one side of the platen glass plate 55.

When the partial color conversion switch 89 is selected, only the specified area is copied in one color and the remaining portion is copied in black. On the other hand, the original is copied in only one color when the monochromatic switch 91 is selected.

In the copy density panel section 77, provided under the portion where "Copy Density" is displayed on the menu display plate 71, display lamps 83 indicate which one of the five copy densities has been selected. Keys 94, 95 are used for selecting one of the copy densities. When the upper shift key 94 is pressed a decrease in the copy density results, whereas pressing the lower shift key 95 increases the copy density. The copy density can be adjusted by changing the developing bias of the developing device 59 shown in FIG. 4, changing the quantity of light from the exposure lamp 56, and changing the quantity of charge given by the charge corotron 52 relative to the photoreceptor drum 51. In this embodiment, the developing bias can be adjusted to one of 16 stages.

An automatic density adjusting switch 97 is arranged under the copy density panel section 77. When the automatic density adjusting switch 97 is pressed, an automatic density display lamp 98 is lit to provide an automatic density adjusting mode. In the automatic density adjusting mode, part of the light reflected from the original when the original is scanned is taken by a half mirror and the potential of the developing electrode within the developing device 59 is set depending on the proportional quantity of that part of light.

In the magnification paper selection panel section 78, provided under "Optional Magnification" on the menu display plate 71, are a display section for setting the magnification desired on the left hand side and a paper selecting section on the right hand side.

A magnification table display 99 is provided in the section where magnification is set and displayed. In this copying machine, 50-to-200% magnifications optionally can be set in 1% increments or in linear changes. The magnification set is displayed in the magnification table display 99. The magnification display is set by optionally operating shift keys 101, 102 or selecting the predetermined fixed magnification.

When the optional magnification is set, the shift keys 101, 102 are operated. Pressing the upper shift key 101, increases the magnification by 1%, whereas pressing the lower shift key 102 decreases the magnification by 1%. When the shift keys 101, 102 are kept pressed, the magnification increases continuously in steps of 1%.

The selection of the fixed magnification is made by a fixed magnification key 103. The fixed magnification is displayed on magnification display plates 104 and can be selected from, for example, 141.4%, 86.5%, 81.6% and 70.7%. The selected magnifications are indicated by display lamps 82 that are disposed next on the left hand side of the display plates 104.

(i) Display of Tray for Manual Insertion

In the copying paper selecting section are eight display plates 105 for displaying paper sizes and shift keys 106, 107 for selecting one of the sizes. Display lamps 82 are disposed next to the eight kinds of display plates 105, the lamps 82 is used to display the selected copying papers or sizes. The following are possible displays in the display plates 105.

As shown in FIG. 4, when the tray 41 for manual insertion is selected the operation is displayed. Conventional trays having manual insertion are only able to feed a single sheet of paper at a time thus, the operator must organize the copying paper by priority before feeding and the operator need not select the tray for manual insertion. In the present invention, a plurality of sheets of copying paper can simultaneously be placed on the tray 41 for manual insertion. If copying paper is set to use the tray 41 for manual insertion to convey the paper, the plurality of sheets of copying paper may begin being fed at the point of time they are set.

In order to avoid the problem above, the tray 41 for manual insertion is allowed to select copying paper. The A3 paper display is selected for copying A3 size paper in the long direction. The B4 paper display is selected for copying B4 size paper in the long direction. The A4 paper display is selected for copying A4 size paper in the long direction. The B5 paper display is selected for copying B5 size paper in the long direction. The A4 crosswise paper display is selected for copying A4 size paper in the direction perpendicular to its long direction. The B5 crosswise paper display is selected for copying B5 size paper in the direction perpendicular to its long direction. The nonstandard paper display is selected using nonstandard paper.

An automatic paper/magnification selecting switch 109 is arranged under the magnification paper selection switch 78. By pressing the switch 109, the automatic/-magnification selecting switch 109 is selected and a combination of preset magnification and paper size is selected. Thus, the operator can learn whether or not the desired combination has been selected from the display lamp 82 lit in the magnification paper selection panel section 78. In case the desired combination has not been attained, it is possible to change the combination by again pressing the automatic paper/magnification selecting switch 109.

The display panel section 79 is arranged to the right of the magnification paper selection panel section 78. A pattern display 111 and a liquid crystal display 112 of the copying machine are arranged in the display panel section 79. The pattern display 111 indicates by means of lit lamps the feed tray selected and the location clogged with paper. A sentence including Chinese characters can be displayed on the liquid crystal display 112. The liquid crystal display 112 is a color liquid crystal display which indicates the specified areas with colors.

The following keys or buttons are disposed under the display panel section 79. The all clear button 114 is used to restore the basic state, i.e., to return the operational mode of the copying machine to the priority one initially set wherein copying paper is selected. The ten keys 80 are used to set the number of sheets of copying paper and input numerical values for specifying the contents of diagnosis when the copying machine is diagnosed. The interruption button 115 is used in case of emergency when other copies must be taken while the continuous copy-making operation is performed. It is also used to release the interruption in order to restore the original copy-making operation as soon as the interruption process is terminated. The stop clear button 116 is used as a clear button to stop any unfinished copy-making and to set the number of copies and the bin of the sorter. The start button 117 is used to start copy-making operation. The selection key 118 is used to move a cursor in response to the message displayed, i.e., as a cursor key. The set key 119 is used as a return key to locate setting at the place specified by the cursor.

As set forth above, the basic operational area and the application operational area on the console panel are separated from one another. The selection of copying paper and copy density setting are carried out in the basic operational area while the selection of functions and emphasis on monochromatic color are effected in the application operational area. Errors in panel operation are minimized because of the assistance to the application operation given by the display characters including kanjis on the liquid crystal display.

(4) Circuit Configuration of Copying Machine

Figure 6:
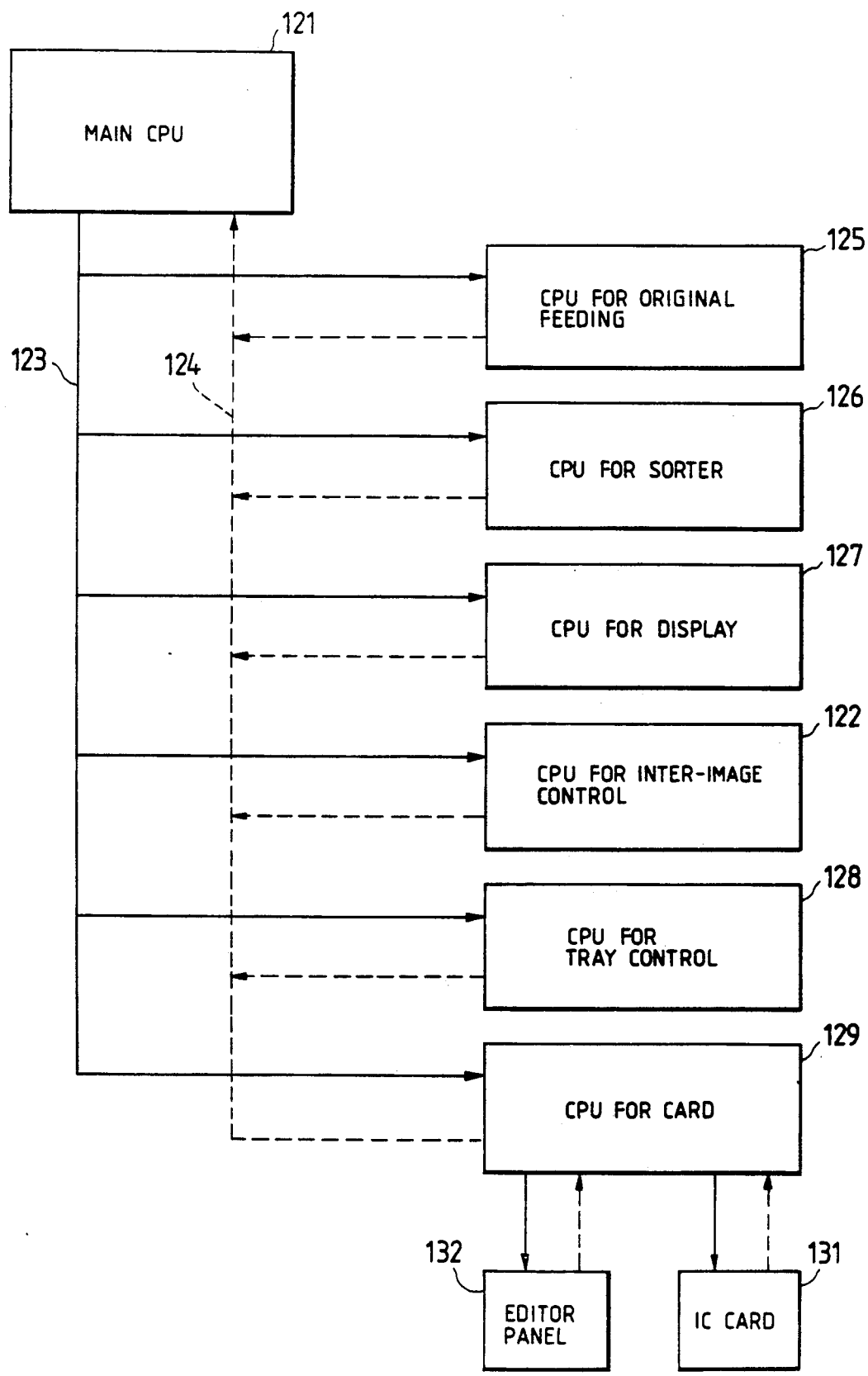
FIG. 6 a circuit diagram outlining a circuit configuration of the copying machine of the present invention.

FIG. 6 shows a schematic circuit configuration of the copying machine of FIG. 2. In FIG. 6, there is shown a decentralized CPU architecture for serial communication centering around a CPU 121 so as to make possible not only the optimum arrangement of a controller but also optimum cost performance. In view of the development of products such as copying machines, it is desired to shorten the period necessary for software development and to improve the efficiency. Further, it is desired to simplify wiring, reduce production costs, and facilitate troubleshooting.

Since processing efficiency is increased by the decentralization of processing by using a plurality of CPUs, programs prepared to the satisfaction of complicated high speed processing can be provided using inexpensive 8 bit CPUs and avoid using expensive 16 bit CPUs.

Moreover, the decentralization of processing facilitates the profusion of models. In other words, even when new input/output devices are developed, the modification of programs on the part of the main CPU may be unnecessary, so that the alteration is minimized.

With respect of the printed circuit boards on the main CPU side, the decentralization of the CPUs makes it unnecessary to store needless I/O ports and programs. Accordingly, it becomes possible to reduce the cost of the printed circuit board.

The base machine 21 of the copying machine is controlled by a main CPU 121 and a CPU 122 for an inter-image lamp located in the base machine 21. The CPU 122 in this case specializes in controlling the inter-image lamp.

The inter-image lamp is used to cast light for an interimage lamp on the photosensitive drum 51 after exposure and to erase part of an electrostatic latent image prior to development. Conventionally, when an original of B5 size is copied, the area other than the B5 size on the photosensitive drum 51 is illuminated to prevent a toner image from forming outside the area to be copied. In this embodiment, the copying machine is also provided with an editing image function. In restricting formation of an electrostatic latent image to a predetermined rectangular area or polygonal one, the partial deletion of the electrostatic latent image is needed to effect the aforesaid processing. In this case, a CPU independent of the main CPU 121 in the copying machine is utilized because the inter-image lamp is being used to a greater extent than is typical in the prior art.

Xerox Co. is one of the manufacturers that has introduced a decentralized processing system to control a copying machine. Japanese Patent Application (OPI) No. 78371/59 by Xerox Co. shows detailed examples of the art and refers to relevant references in "Copying Machine Control Apparatus and Method of the Same."

In the present invention, the communication method adopted is not the "Ether Network" intended for high speed processing employed in the aforesaid Patent Application but produces the same effect with a 4,800 Baud current loop. Applicants have disclosed a detailed description of the CPU 122 for an inter-image lamp in Japanese Utility Model Application No. 15259/86 entitled "Image Copying Machine" and Japanese Patent Application No. 023392/87 entitled "Imade Erasing Device for Copying Machine."

The copying machine is equipped with the following CPUs connected with communication lines 123, 124. The main CPU 121 assumes the role of central CPU. A CPU 125 for feeding originals controls the DADF 24. When the ADF 23 is used in place of the DADF 24, the CPU contained therein is connected to communication lines 123, 124. A CPU 126 is arranged in the 10 bin sorter 38. Another CPU is installed for special use in the 20 bin sorter 39. The main CPU 121 detects which one of the sorters 38, 39 has been connected and accordingly controls sorting.

A display CPU 127 is used to display various kinds of data with kanjis on the aforesaid display 112 that is fitted to the console panel 28 and an area for editing purposes. No special CPU is used when the console panel 27 of a back lit type is employed because a complicated display control is unnecessary. If the liquid crystal display 112 is employed, the ten keys are used to designate figures to be edited.

A CPU 128 for controlling trays is used to control the fourth and fifth trays 31-4, 31-5 and those newly added to the base machine 21, the large capacity tray and the intermediate tray 33. This CPU is located behind the tray cabinet containing each of the trays and controls them depending on the tray thus connected. Among these trays, the intermediate tray 33 is equipped with its own motor for conveying copying paper. Further the location of the copying paper placed on each tray differs according to size. Accordingly, the CPU needs to effect complicated control.

The mode of controlling each tray by the CPU 128 is as follows:

(i) Control of both or one of the fourth and fifth feed trays 31-4, 31-5 and the intermediate tray 33;

(ii) Control of the large capacity tray and the intermediate tray;

(iii) Control of only the intermediate tray;

(iv) Control of both or one of the fourth and fifth feed trays 31-4, 31-5;

(v) Control of only the large capacity tray; and, (vi) CPU 129 for controlling the IC cards.

The CPU 129 controls IC cards 131 used to store additional data for use in adding or correcting the functions of the copying machine. When the IC card 131 is used to designate the coordinates of an original, the CPU 129 controls the reading/writing operation of the card 131. Moreover, the CPU 129 can also control an editor panel 132, though not employed in this embodiment. The editor panel 132 is used to input coordinates and will be described in detail later.

Figure 7:
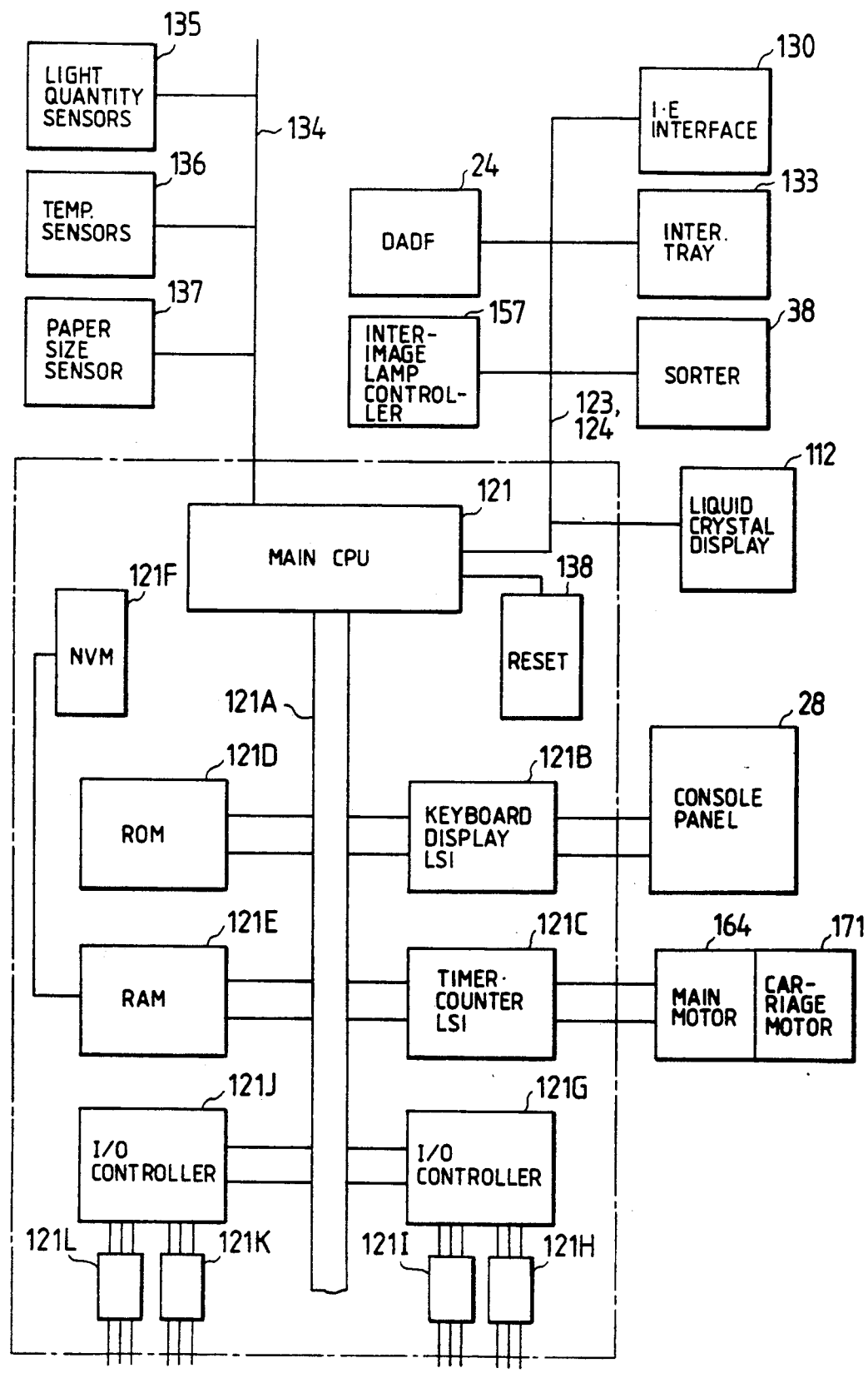
FIG. 7 a detailed block diagram of the main CPU of FIG. 6.

FIG. 7 shows a detailed circuit configuration having the main CPU as a central figure functioning in a pivotal role in the copying machine. Copying machines controlled by control apparatus such as CPUs and microcomputers have been described in "A Programmable Digital Control System for Copying Machines" by Sikandar Sheikh of Xerox Co., IEEE Trans, Com, Vol IECI-21, No. 1, Feb. 1974 and Japanese Patent Application (OPI) No. 62644/785 "Electrophotographic Copying Process and Apparatus". Like the main CPU, other CPU modules are composed of one-chip CPUs, ROMs, RAMs, I/O, etc.

FIG. 7 shows the main CPU 121 connected via the communication lines 123, 124 to the following component parts: DADF 24; sorter 38; liquid crystal display 112; IC card editor pad interface 130, an interface which is arranged in the IC card device 22 and causes data to be given to and received by the main CPU 121 when an IC card and an editor panel 132 are connected to the copying machine proper; inter-image lamp controller 157; and, control unit for controlling the fourth and fifth trays 31-4, 31-5, the intermediate tray 33, etc.

The main CPU 121 incorporates an A/D converter and there are 8 bit, one chip CPUs, e.g., uPD7810CW, uPD7811CW of Nippon Electric Co. and MB89713X of Fujitsu, Ltd. The main CPU 121 is connected via an analog data line 134 to the following parts: light quantity sensor 135 used to detect the quantity of light derived from the exposure lamp 56 and to control it; a group of temperature sensors 136 for controlling fixing temperatures as will be described later, and a group of paper size sensors 137 for detecting the sizes of paper placed on the feed tray 31. Copying paper can be fed from a maximum five kinds of trays according to the system configuration of the copying machine in this embodiment. Consequently, if four sensors for detecting the paper size are disposed on one feed tray, with digital data being used for processing purposes, 4 bit digital data will have to be sent to the main CPU 121 from one tray. This will also necessitate a maximum of 20 input ports in total, together with a number of connectors and cables constituting a harness. This construction is not preferable in view of not only cost and size reduction but also reliability.

Accordingly, the conditions specified by four sensors per tray of the copying machine are sent out as analog data. The analog data received by the main CPU 121 is converted into digital data, so that a maximum of 16 sizes of copying paper placed on each tray are identified.

Further, the main CPU 121 is reset at the time of runaway or initialization of the reset circuit. The main CPU 121 is also connected via a bus line 121A to the following parts: keyboard display LSI 121B for interfacing with the console panel 28; timer counter LSI 121C, for controlling the driving of a main motor 164 and a carriage motor 171; ROM 121D having a capacity of 56K bytes and storing the basic control data of the copying machine; and, RAM 121E having a capacity of 6K bytes and temporarily storing data. Nonvolatile memory (NVM) 121F is connected to this RAM 121E and capable of preserving the necessary data even when the power supply of the copying machine is cut off.

The necessary data stored in the NVM.121F includes a setup value for use in regulating the registration of copying paper; the quantity of erasing the tip portion of an image by the inter-image lamp; a fine adjusting value for use in adjusting the vertical and horizontal magnifications when the same-size copying value is set; each parameter adjusting value for use in adjusting the parameter on the copying machine production line such as the quantity of a binding margin when a copy is taken with a blank for providing the binding margin; and data for use in detecting the operating condition of the copying machine such as the actual value resulting from the use of the feed counter on each feed tray 31.

A first I/O controller 121G is an input/output controller for reading various data via a filter circuit 121H and driving various parts via a driver circuit 121I. Switches and sensors are connected to the filter circuit 121H. Solenoids such as developing solenoids and clutches 233, contained in the feed trays 31-1 to 31-5, are also connected thereto.

A second I/O controller 121J is an input/output controller for reading various data via a filter circuit 121K and driving various parts via a driver circuit 121L. Switches and sensors are connected to the filter circuit 121K. The driver circuit 121L is equipped with a Digital-Analog (D/A) converter and a Pulse Width Modulator (PWM) and is used to set the developing bias of a developing device 59 and the current value of the charge corotron 52 as the program is processed.

(5) Detailed Circuit Configuration of Copying Machine

Figure 8:
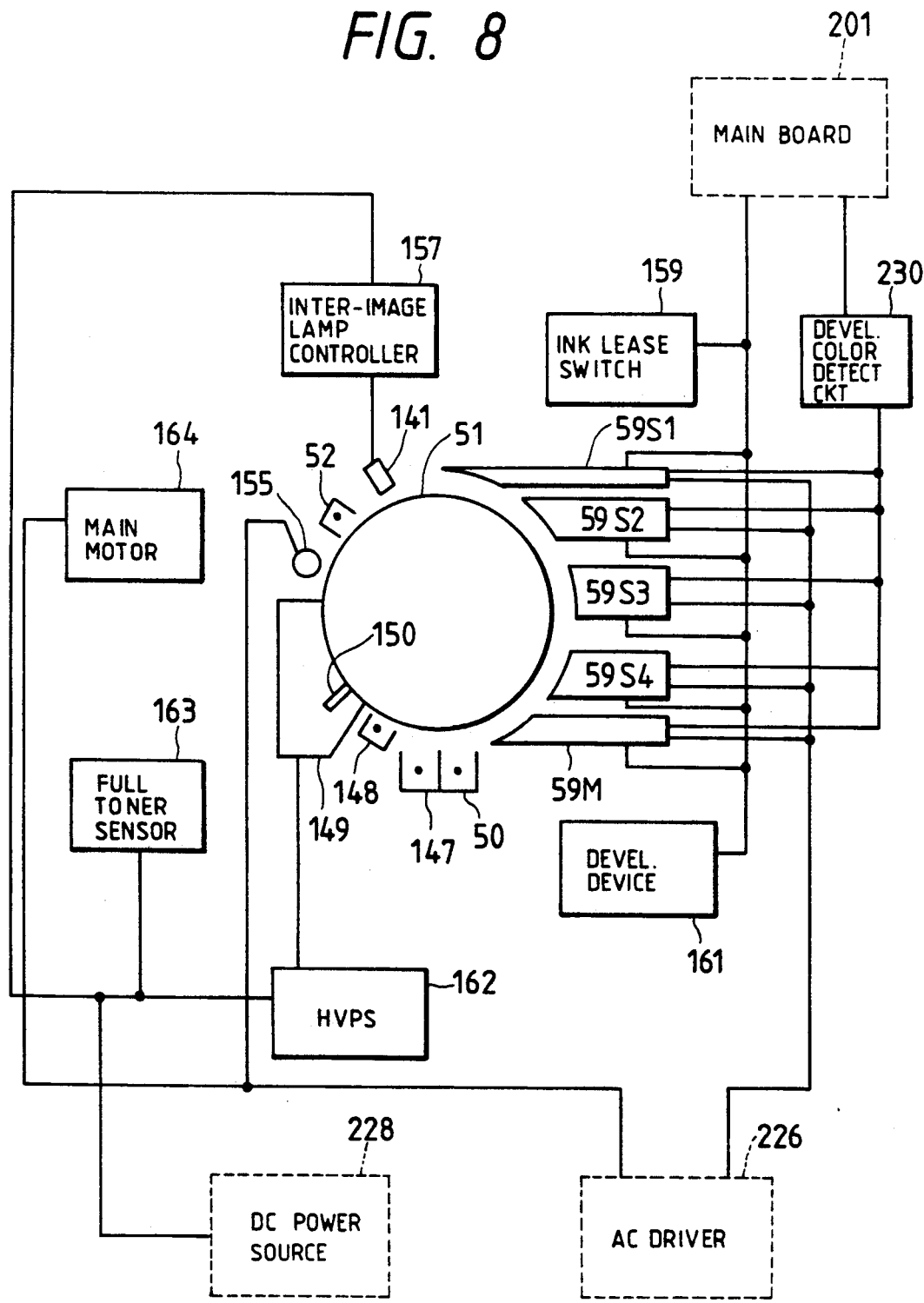
FIG. 8 shows a block diagram of a circuit configuration around a photoreceptor drum of the copying machine of the present invention.

Referring to FIGS. 8-13, a detailed description will be given of the circuit configuration of the copying machine of the present invention. FIG. 8 shows a block diagram of the periphery of the photoreceptor drum 51. On the periphery of the photoreceptor drum 51 are, order, a charge corotron 52, an inter-image lamp 141, four kinds of subdeveloping devices 59S1-59S4, a main developing device 59M, a transfer corotron 50, a detack corotron 147, a pre-clean corotron 148, a cleaning device 149, and a deelectrifying erase lamp 155. The first, second, third, and fourth subdeveloping devices 59S1, 59S2, 59S3, and 59S4 use red, blue, green and light brown toner for developing, respectively.

The inter-image lamp 141 consists of a train of 128 light-emitting diodes disposed in a row and a plastic lens arranged in parallel with and in front of these diodes. The plastic lens has a nonspherical convex surface in a position corresponding to each light emitting diode and is arranged so that, even when the light emitting diodes adjacent to each other emit light, the intensity of the light on the photoreceptor drum 51 will not be uneven in the boundary therebetween. Moreover, the focal point of the plastic lens is constructed to properly shade off on the photoreceptor drum 51. Accordingly, when a triangular figure is processed (e.g., extracted or deleted) by the inter-image lamp 141, for instance, the difference in stage between the light emitting diodes as a unit is considerably decreased in the boundary being processed.

An inter-image controller 157 is designed to control the on/off of the light emitting diodes as 128 segments of the inter-image lamp 141. The cleaning device 149 is provided with a doctor blade 150 and is used to peel the toner that is de-electrified by the pre-clean corotron 148 off of the photoreceptor drum 51.

In the copying machine in this embodiment, a main motor 64 is started 0.2 second after the doctor blade contacts the photosensitizer drum 51. The doctor blade 150 is not separated from the photoreceptor drum 51 immediately after the main motor 164 stops but separates therefrom five seconds later. As a result, the toner is prevented from contaminating the interior of the copying machine by scattering because of the vacuum suction strength.

The subdeveloping devices 59S1-59S4 are each equipped with the following parts: color sensor, toner sensor, and dispense motor. The color sensor identifies which one of the color developing agents has been set in each developing device. Even if the subdeveloping devices 59S are installed with the combination of red, blue, green and light brown colors, the color sensors can be used to detect the respective colors provided for the subdeveloping devices 59S1-59S4. Each detection output is sent to a developing color detecting circuit 230 and transmitted to a main board 201. A toner sensor is used to determine whether a supply of toner is needed. A motor is used for churning and supplying the toner contained in a toner box.

The main developing device 59M uses black toner for developing and has a toner sensor and a dispense motor. An ink release switch 159, may be pressed to increase the quantity of toner. While one of the subdeveloping devices 59S1-59S4 is selected, if the ink release switch 159 is pressed, it operates to increase the quantity of toner supplied to the subdeveloping device involved. If the switch is pressed while the main developing device 59M is selected, the quantity of black toner increases.

A developing device selecting solenoid 161 is used to selectively switch the five developing devices, namely, the main developing device 59M and the subdeveloping devices 59S1-59S4. The switching operation will be described later in a separate paragraph.

A high voltage power supply (HVPS) 162 is used to form a parallel electric field in the main and subdeveloping devices 59M, 59S1-59S4 so as to improve the reproducibility of the solid portion or solid black one. A full toner sensor 163 is used to detect whether the toner has been satisfactorily recovered in the toner recovery container. The main motor 164 is used to drive the photoreceptor drum 51, a heat roll 66 or a conveyer system from the registration of timing at which the copying paper 60 is conveyed up to the discharging time.

Figure 9:
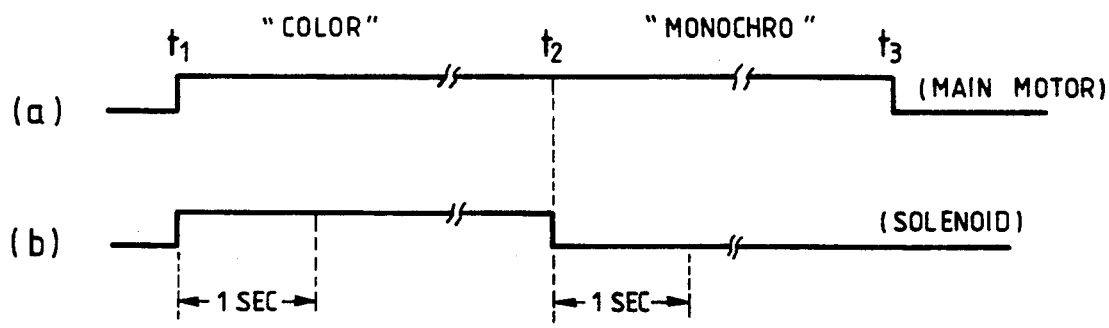
FIG. 9 shows a timing chart of the operations of a main motor and a developing solenoid as first development is made by a subdeveloping, device and second development is made by a main developing device.

FIG. 9 shows a waveform chart of the switching timing of the main developing device and the subdeveloping devices. The waveform chart shows red color developing being carried out in the first developing device 59S1 and monochromatic developing thereafter in the main developing device. As shown in FIG. 9(a) when the start button 117 is pressed to start copy-making operation, the main motor 164 is driven from time $t_1$. The main motor 164 is being driven up to $t_2$, when the copy-making operation is completed in both developing devices 59S1, 59M.

FIG. 9(b) shows the driving timing of the developing device selecting solenoid 161. The developing device selecting solenoid 161 is kept excited until red copy-making operation by the first subdeveloping device 59S1 is terminated. Because of the excitation of the developing device selecting solenoid 161, a lever abuts against the peripheral face of a clutch. Upon receiving the driving force from the main motor 164, the clutch shifts 72 degrees at a time and begins rotating five sets of cams that each having a protrusion. When one of the protrusions abuts against the first subdeveloping device 59S1, it presses the first subdeveloping device 59S1 toward the photoreceptor drum 51. The protrusions of the remaining cams are left apart from the main developing device 59M and the other subdeveloping devices 59S2-59S4. The main developing device 59M and the other subdeveloping devices 59S2-59S4 remain most apart from the photoreceptor drum 51.

There are five protrusions disposed on the periphery of the clutch. When the lever abuts against the protrusion involved, the protrusion of the respective cam is strongly pressed against the first subdeveloping device 59S1. Development with red color toner is made in this position. However, since the main developing device 59M in the initial state is arranged close to the photoreceptor drum 51, the red color development is not started immediately at $t_1$ but is kept on standby for one second. At this time the cam, in place of the main developing device 59M, sets the first subdeveloping device 59S1 or the other subdeveloping devices 59S2–59S4 to the photoreceptor drum 51.

When the first subdeveloping device 59S1 has completed the copy-making operation, the five cams move to let the lever position the protrusion of the monochromatic cam, whereas the main developing device 59M is set to the photoreceptor drum 51 for one second after $t_2$. Then the monochromatic developing is carried out.

What has been described above refers to only red color marking. When marking with a plurality of colors, one of the subdeveloping devices 59S1–59S4 is successively selected in predetermined order and the monochromatic developing is made after the completion of the operations above.

Figure 10:
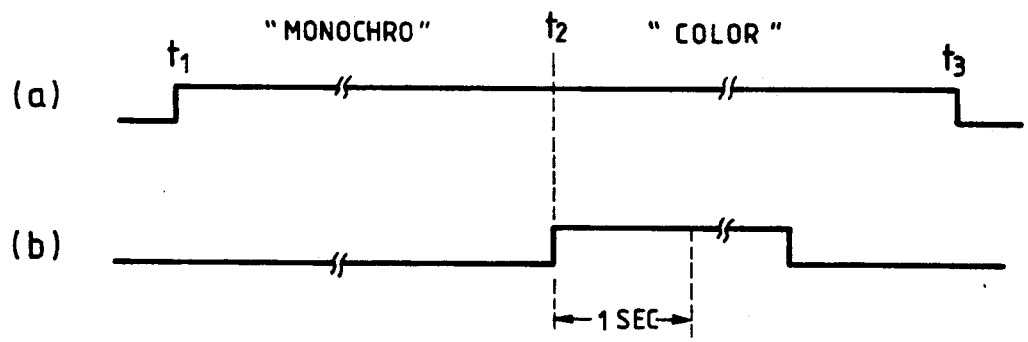
FIG. 10 shows a timing chart of the operations of the main motor and the developing solenoid as first development is made by the main developing device and second development is made by the subdeveloping device.

FIG. 10 shows, first monochromatic developing and subsequently red color development. FIGS. 10(a), 10(b) are graphic presentations respectively illustrating the operation of the main motor 164 and the developing device selecting solenoid 161. Development is first carried out by the main developing device 59M; thus, one second of standby time is unnecessary. However, one second has to be secured after the completion of the monochromatic development as the second one and the main developing device 59M has to be set again to the photoreceptor drum 51.

Figure 11:
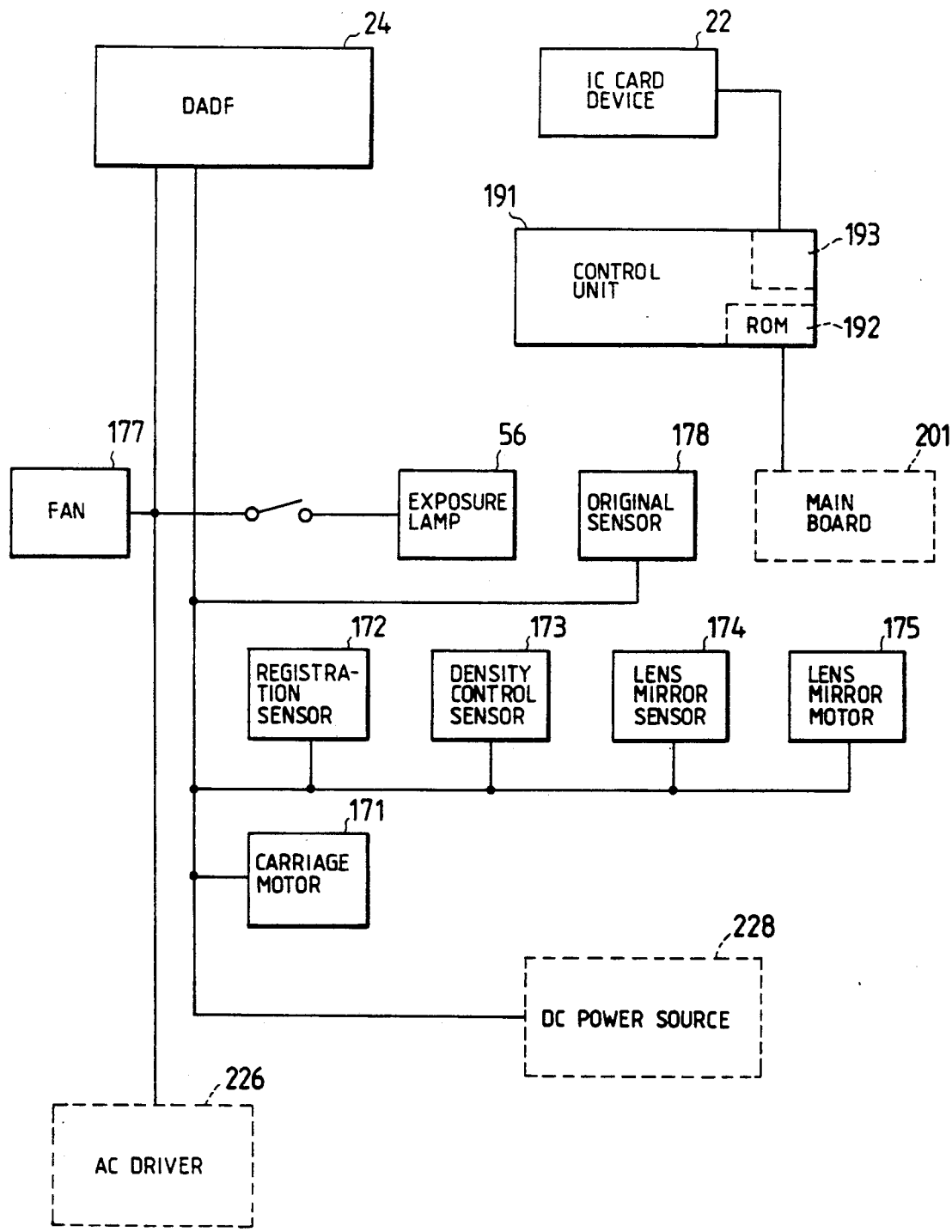
FIG. 11 shows a block diagram of the details of an exposure system and periphery of a console control unit of the copying machine above of the present invention.

FIG. 11 shows a control system for an optical system having a carriage provided with a lens and mirrors that are reciprocally operated by a carriage motor 171. The carriage motor 171 includes a step motor and the position of the carriage returning to the home position is controlled by a registration sensor 172.

The registration sensor 172 is used to set the timing at which the optical system relative to the conveyance of the copying paper 60 is adjusted. The carriage is provided with an actuator for intercepting the transmission of the light. As the carriage moves, the registration sensor 172 detects the temporary interruption of the light rays. The signal detected thereby is used to determine the position or timing for implementing the registration or to determine the home position at the time the carriage is returned.

A density control sensor 173 is used to control the copy density of an original. As set forth above, the copying machine is designed to control the copy density by simultaneously adjusting the charge quantity given to the photosensitive drum 51, the image exposure quantity and the developing electrode bias. A lens mirror sensor 174 controls the movement of the optical lens 58 and the mirrors 57 and consists of one detecting element. A lens mirror motor 175 is redesigned to simultaneously drive the lens 64 and the mirror 57 that have been driven separately in the conventional copying machine. The exposure lamp 56 has already been described. A fan 177 for the optical system is used to cool part of the optical system in order to remove heat from the platen glass plate 55. An original sensor 178 is used to detect the size of an original.

The base machine 21 is provided with a main fuser lamp 181 and a subfuser lamp 182, i.e., two kinds of fuser lamps within the heat roll 66. The subfuser lamp 182 is shorter than the main fuser lamp 181 and slightly deviated from one end of the main fuser lamp 181. The so-called corner registration method is employed, wherein the copying paper 60 in this copying machine is aligned with one side of the platen plate 55, whereby the required quantity of heat energy in the axial direction of the heat roll 66 differs with the size of copying paper 60 for use. In order to correct the deviation of temperature distribution in the axial direction, the power supplied to the subfuser lamp 182 is controlled, depending on the size of copying paper 60. The adoption of the subfuser lamp 182 makes it possible to satisfactorily prevent temperature variations in the fixing device.

A fuser outlet sensor 184 and a Soft Touch Sensor (STS) 185 are connected to the fixing device. The fuser outlet sensor 184 is employed to detect whether the copying paper is discharged on the discharge tray without being rolled in between both the rolls 66, 67 after it is passed between the heat roll 66 and the pressure roll 67. The STS 185 is the temperature sensor of the fuser lamps 181, 182.

FIG. 11 shows a console control unit 191 provided with a message ROM 192 for displaying messages in kanjis. The IC card device 22 or IC card reader/writer is used for reading and writing the IC card 131 and connecting the editor panel 132 via an interface board 193. The IC card device is, controlled by the card CPU 129. The console control unit 191 is connected to a main board 201 with the aforesaid main CPU 121 mounted thereon.

Figure 12:
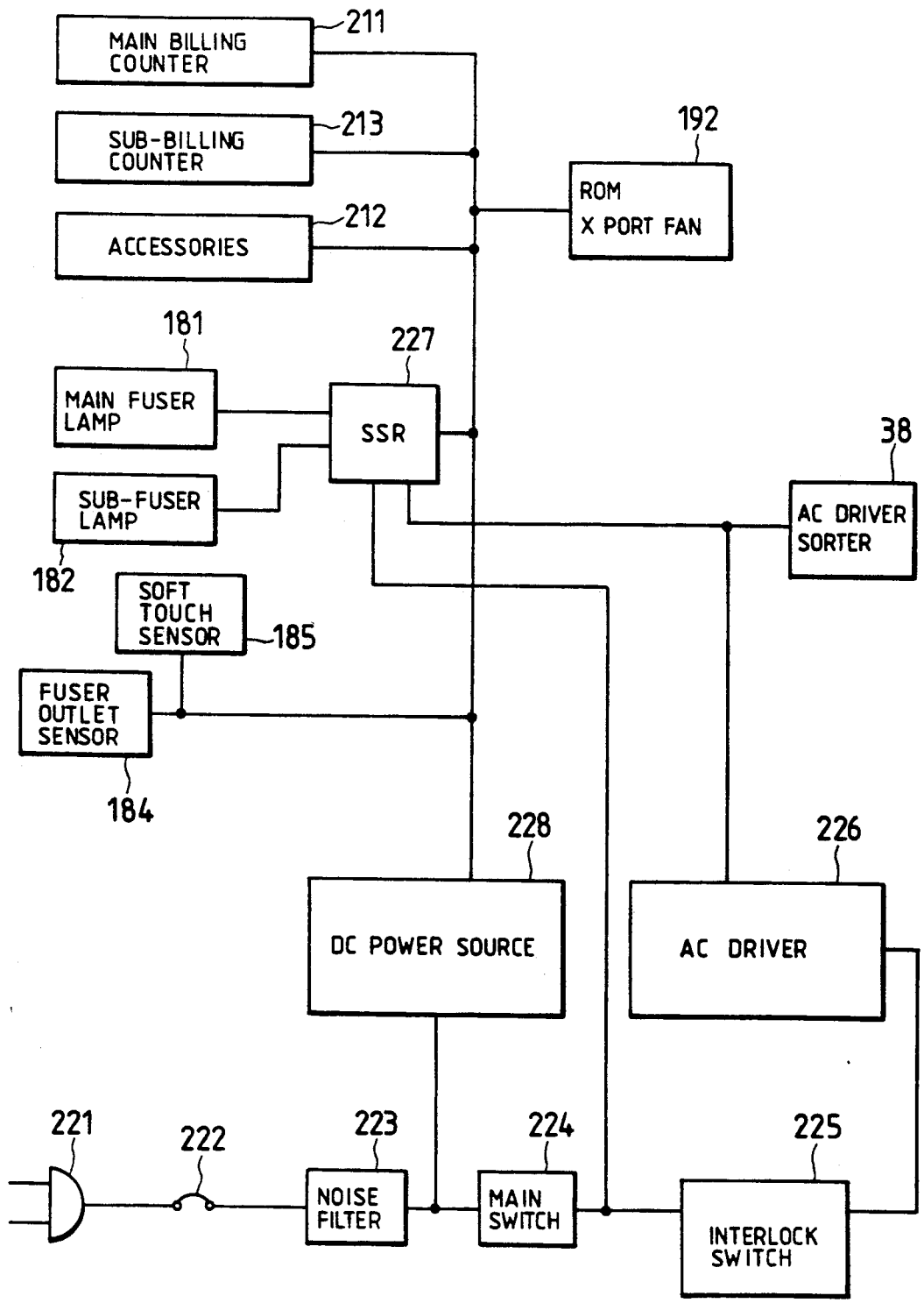
FIG. 12 shows a block diagram of the details of a power supply and a fixing device of the copying machine of the present invention.

FIG. 12 shows a billing counter for use in collecting copying charges. The base machine 21 is capable of making copies in five colors, and two kinds of billing counters are installed. Of the two, a main billing counter 211 counts the number of copies taken, irrespective of the color. The values counted by the main billing counter 211 are employed as data for use in controlling counts even when accessories 212 such as a coin kit and a key counter are fitted to this copying machine. A sub-billing counter 213 is used to count the sum of the number of colors used for each color copy taken.

FIG. 12 shows a power supply. The base machine 21 is connected to a commercial 100 V power supply. As to machines placed in overseas markets, they can be connected to a 115 V/60 Hz or 220 V/50 Hz power supply. The power supplied via a plug socket is given to a main switch 224 through a circuit breaker 22 and a noise filter 223. The power is then supplied from the output of the main switch 224 via an interlock switch 225 to an AC driver 226, a fixing control element 227 and a DC power supply 228. Further, the power is supplied to the DADF 24 and the intermediate tray 33. The AC driver 226 supplies the power to the following parts at a predetermined timing: deelectrifying erase lamp 155 (FIG. 8); exposure lamp 56 and a fan for an optical system (FIG. 11); and, main fuser lamp 181 and the subfuser lamp 182 (FIG. 12).

The DC power supply 228 supplies power to the following parts at a predetermined timing: interlock switch 225 (FIG. 12); AC driver 226 (FIG. 12); high-voltage power supply device 162 (FIG. 8); sorter 38 (FIG. 12); fuser outlet sensor 184 (FIG. 12); element 227 for controlling fixation (FIG. 12); accessories 212 (FIG. 12), including a coin kit for having copies taken using, e.g., coins and a key counter for controlling copying-making operation in each section; main billing counter 211 and a sub-billing counter 213 (FIG. 12); X-port fan (FIG. 12), a vacuum fan for sucking the copying paper conveyed in a conveyer passage called an X-port; inter-image lamp controller 157 (FIG. 8); carriage motor 171 (FIG. 11); registration sensor 172, density control sensor 173, lens mirror sensor 174 and mirror motor 175 (FIG. 11); original sensor 178 (FIG. 11); ink lease switch 159, air detecting sensors of subdeveloping devices 59S1–59S4 and main developing device 59M and development selecting solenoid 161 (FIG. 8); and, main board 201 (FIG. 8, etc.).

Figure 13:
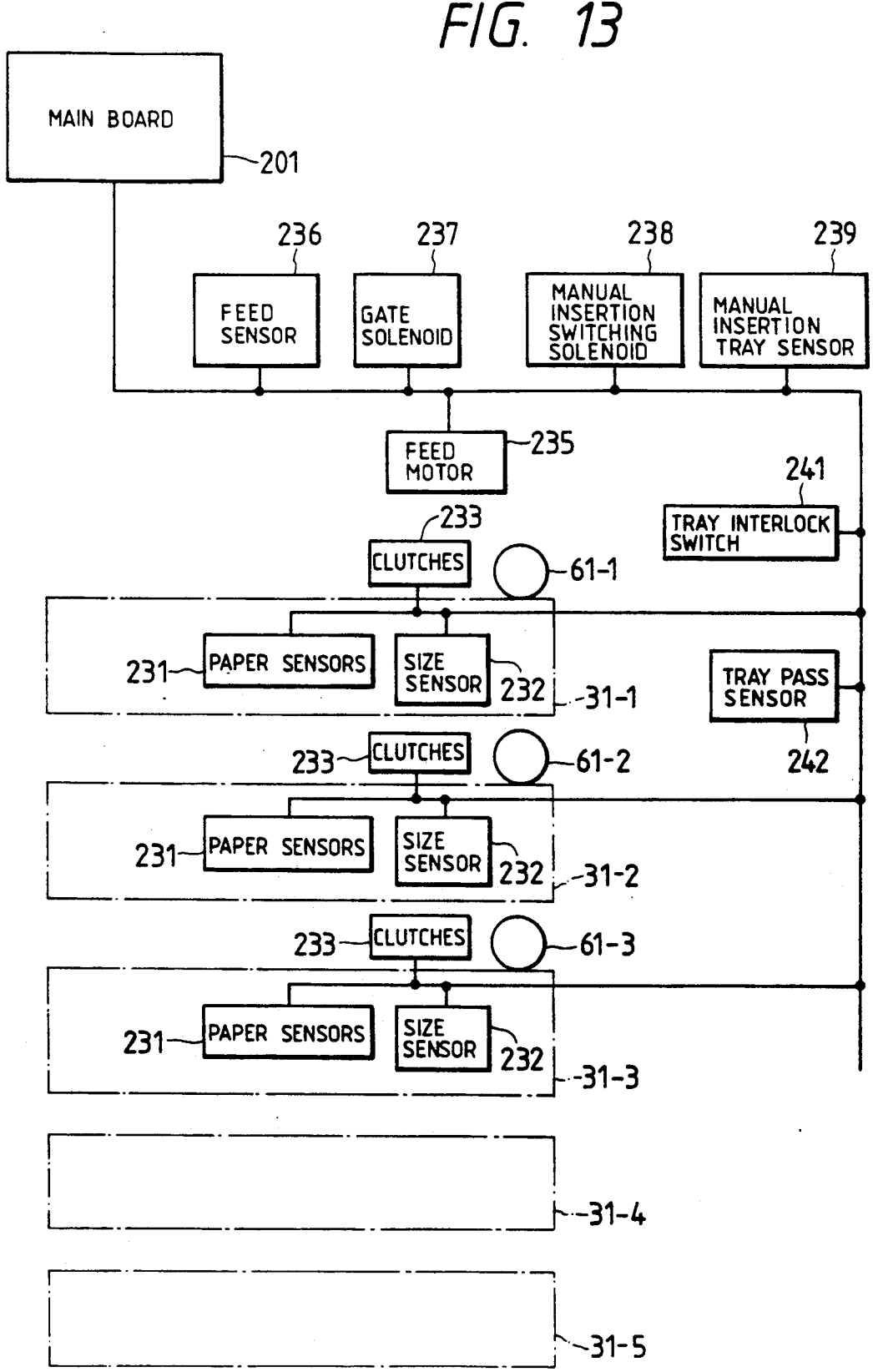
FIG. 13 shows a block diagram of the copy paper conveying system of the present invention.

FIG. 13 shows a conveyer system for conveying copying paper will be described. The first to fifth feed trays 31-1 to 31-5 are provided with paper sensors 231, size sensors 232 and clutches 233, respectively. The paper sensors 231 are used to detect the presence or absence of copying paper on the feed trays 31-1 to 31-5. Copying paper of the same size can be set on the plurality of feed trays in this copying machine. Copying paper of the same size is automatically supplied from another feed tray when no copying paper is present on one of the feed trays. The size sensor 232 identifies the size of copying paper placed on the tray. The clutch 233 is a component part for controlling the on/off state of each of the driven feed rolls 61-1, 61-2.

Copying paper is fed by a feed motor 235 for special use. A step motor is used as the feed motor 235. A feed sensor 236 detects whether copying paper is being properly conveyed. A gate solenoid 237 is used to even out the front edges of sheets of copying paper sent out. The gate solenoid 237 is different from the conventional type and is used to control copying paper so that the paper is passed as it opens or when energized.

More specifically, power is not supplied to the gate solenoid 237 in the standby state in which no copying paper arrives and the gate is kept open. Power is then supplied to the gate solenoid 237 slightly before the arrival of Copying paper and the gate is shut to check the passage of the copying paper. Subsequently, the gate solenoid 237 is deenergized and opened at the point of time the copying paper is conveyed again at a predetermined time. The gate solenoid 237 is controlled so that there is less fluctuation in its position at the point of time the front edge of copying paper is held in check. Thus, the copying paper is accurately positioned even while it is relatively strongly pressed against the gate solenoid 237.

A manual insertion switching solenoid 238 is used to switch the driving of a carrier roller for conveying copying paper sent out from the first feed tray 31-1 and a carrier roller for conveying copying paper manually fed from the tray 41 for manual insertion. A manual insertion tray sensor 239 detects the presence of copying paper when sheets of copying paper are fed from the tray 41 for manual insertion. A tray interlock switch 241 is fitted to a mechanism operated to remove the blocked copying paper. A tray pass sensor 242 detects the copying paper 60 supplied from the second and third feed trays 31-2, 31-3 and arranged near the connection of the base machine 21 and the feed trays 31-2, 31-3.

Figure 14:
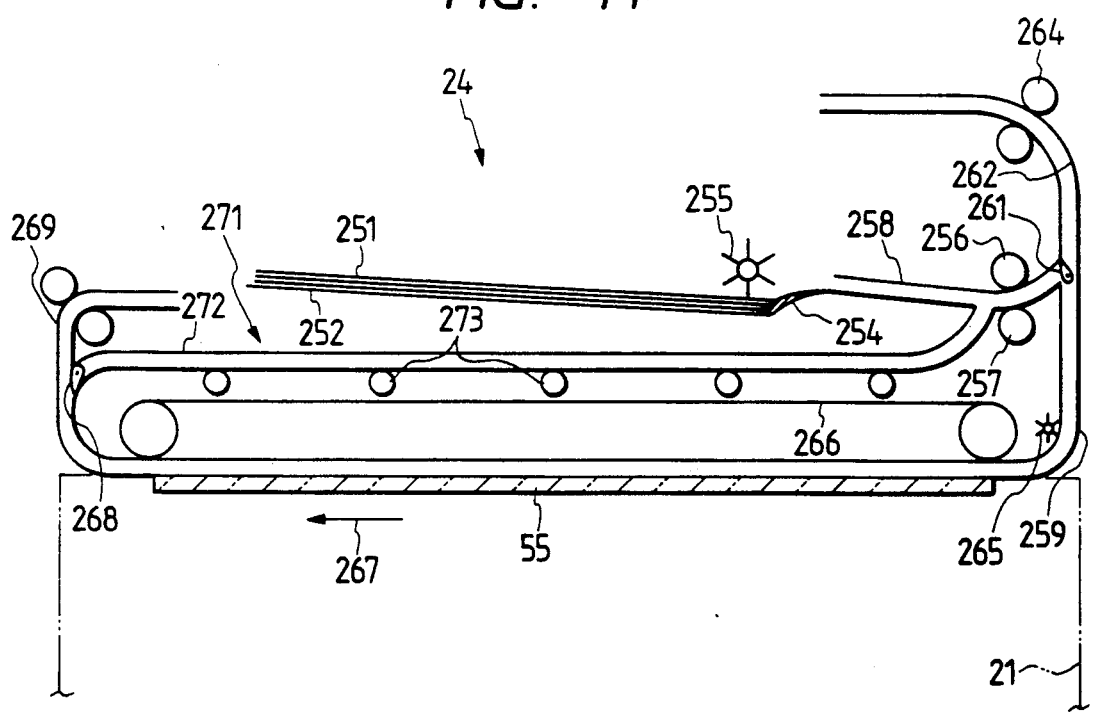
FIG. 14 a schematic block diagram of a DADF of the present invention.

FIG. 14 show the DADF 24 that is mounted on the platen glass plate 55 of the base machine 21 and provided with an original tray 252 on which originals 251 are placed. Originals 251 are piled on the original tray 252 so that the first side of each from which a copy is taken faces down.

A retard pad 254 and a feed paddle 255 are disposed on one side of the original tray 252 from which originals 251 are sent out one after another. The original 251 fed is moved by a driving roller 256 and a driven roller 257 and passed through an S-shaped conveyer 258 before being pressed against a branch guide 261 that is arranged in the position where the S shaped conveyer 258 and a vertial conveyer 259 intersect. Thus, the branch guide 261 is opened and the original 251 is sent to an inverted conveyer 262.

The action of a spring stops branch guide 261 on the side of the S-shaped conveyer 258 side when the rear end of the original 251 passes through the branch guide 261. The passage of the original 251 is detected by a sensor that is arranged close to the branch guide 261. A driving roller 264 for inverting the original responds to the detection signal output and turns inversely. As a result, the direction in which the original 251 is conveyed is inverted and changed to what is roughly perpendicular to the platen glass plate 55.

The original 251 is conveyed while one side of the original abuts against a side positioning guide to adequately position the paper. The original is further carried by an endless conveyer belt 266 up to a proper position on the platen glass plate 55. In this manner, a copy of the first side of the original 251 is taken.

After the completion of exposure of the first side, the original 251 is conveyed by the endless conveyer belt 266 in the direction of arrow 267. When one side only is copied, a vertical conveyer 269 is selected by a quid on the outlet side and the original 251 is received by an original receiving part 271.

If the second side opposite to the first one is copied, a horizontal conveyer 272 is selected. The original 251 fed onto the horizontal conveyer 272 is conveyed by a carrier roller 273 in the direction opposite to the arrow 267 and further conveyed by the driving roller 256 and the driven roller 257 to the S-shaped conveyer 258. At this time, the underside of the original 251 is the second side which is opposite to the first side of the original placed on the original tray 252. Accordingly, the second side is copied when the original 251 is sent to the platen glass plate 55.

The original 251 is sent to the vertical conveyer 269 by the action of the guide 268 on the outlet side after the exposure of the second side and discharged onto the original receiving part 271.

Figure 15:
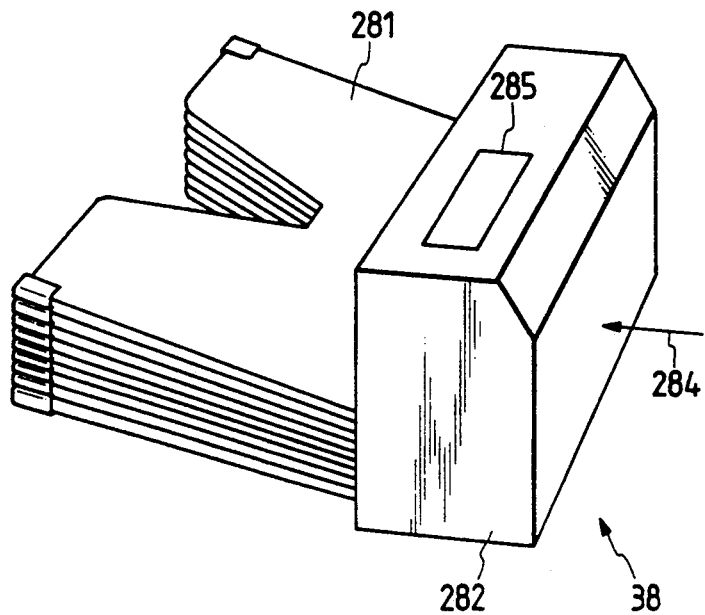
FIG. 15 shows a perspective view of a sorter of the present invention.

FIG. 15 shows a perspective view the 10 bin sorter 38 constructed so that 10 sheets of bins 281 are integrally moved up and down. The sorter proper 282 consists of: a driving source or bin motor for moving the bins 281 up and down, a cam and a cam switch for controlling the movement of each bin, and a down limit switch for detecting the arrival of the bins 281 at the lowest limit position.

Copying paper 60 is moved by the carrier rolls 68, in direction of arrow 284 and is fed into the sorter proper 282 and it is at this point the copying paper 60 is discharged onto the bins located opposite to the conveyer passage. Some sorters are designed to switch the discharge passage by moving the sorter proper 282 and not the bins 281. Mode selection in the sorter 38 is effected by operating the panel 74 for a sorter.

Figure 16:
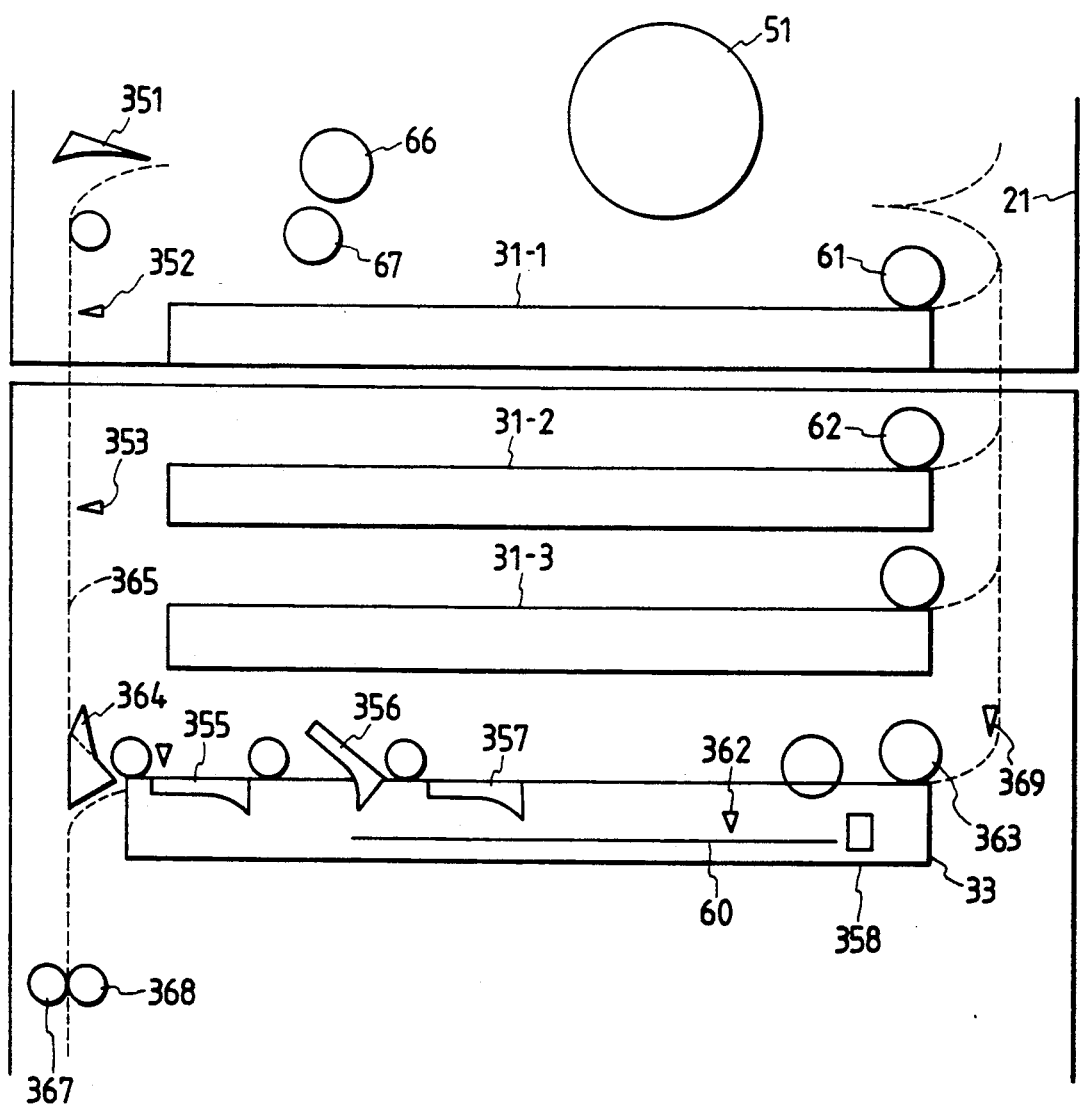
FIG. 16 shows a schematic side view of the conveying system centering around an intermediate tray of the copying machine of the present invention.

FIG. 16 shows the conveying system centering around the intermediate tray 33. The copying paper 60, heat fixed by the heat roll 66 in the base machine 21, is controlled so that it is discharged by a duplex gate solenoid, that is installed in the base machine 21, onto the discharge tray or sent to the intermediate tray 33. A first duplex pass sensor 352 is disposed on the base machine 21 side. A second duplex pass sensor 353 is located close to the second feed tray 31-2. The pass sensors are used to detect whether or not the copying paper 60 approaching the intermediate tray 33 is blocking the passage.

A no feed roll for feeding the front edge of copying paper 60 up to the front edge of the tray is provided for the intermediate tray 33. Consequently, three duplex solenoid gates 355-357 are provided for carrying the copying paper 60 received up to a desired position, depending on its size, and "dropping" the paper onto the tray. These duplex solenoid gates 355-357 operate the solenoid selectively, depending on the size of the copying paper received, so that the corresponding gate opens or closes. A skew roll solenoid gate 358 controls the copying paper 60 that is dropped so that one corner of the front edge thereof is caused to abut against the front edge of the intermediate tray 33 and uniformly arranges the front edges of sheets of copying paper. Each time the operation equivalent to one sheet of paper is completed, the main billing counter 211 counts the value upward.

As already described, the intermediate tray 33 is controlled by the CPU 128 for controlling trays and the copying paper is conveyed under the control of the duplex motor 361. A duplex paper sensor 362 is used to detect the presence or absence of copying paper 60 on the intermediate tray 33. A duplex clutch 363 functions as a mechanism for turning on/off the driving source feeding copying paper 60.

An inverter gate solenoid 364 is used to switch the operation to take duplex copies, give a marking to the same side with a plurality of colors or to obtain synthesized copies. While the inverter gate solenoid 364 is kept directed as shown in FIG. 16, the copying paper 60 that is conveyed downwardly through a conveying passage 365 is guided by the inverter gate solenoid 364 and dropped before being conveyed upwardly by carrier rolls 367, 368. The direction in which the copying paper 60 is conveyed is to turn right in FIG. 16 before the inverter gate solenoid 364 and the paper is placed on the intermediate tray 33 upside down. To restart the state a duplex copy is taken.

On the other hand, if the direction in which the copying paper 60 is conveyed downwardly to turn right in FIG. 16 before the inverter gate solenoid 364, the copying paper 60 is placed with its surface side up again. If the state is restarted, a copy is then taken again on the same side. When marking is made with N kinds of colors, one sheet of copying paper is normally put on the intermediate tray 33 N times and then subjected to monochromatic development before being discharged. A duplex feed sensor 369 detects whether the copying paper sent out of the intermediate tray 33 has become lodged.

Figure 17:
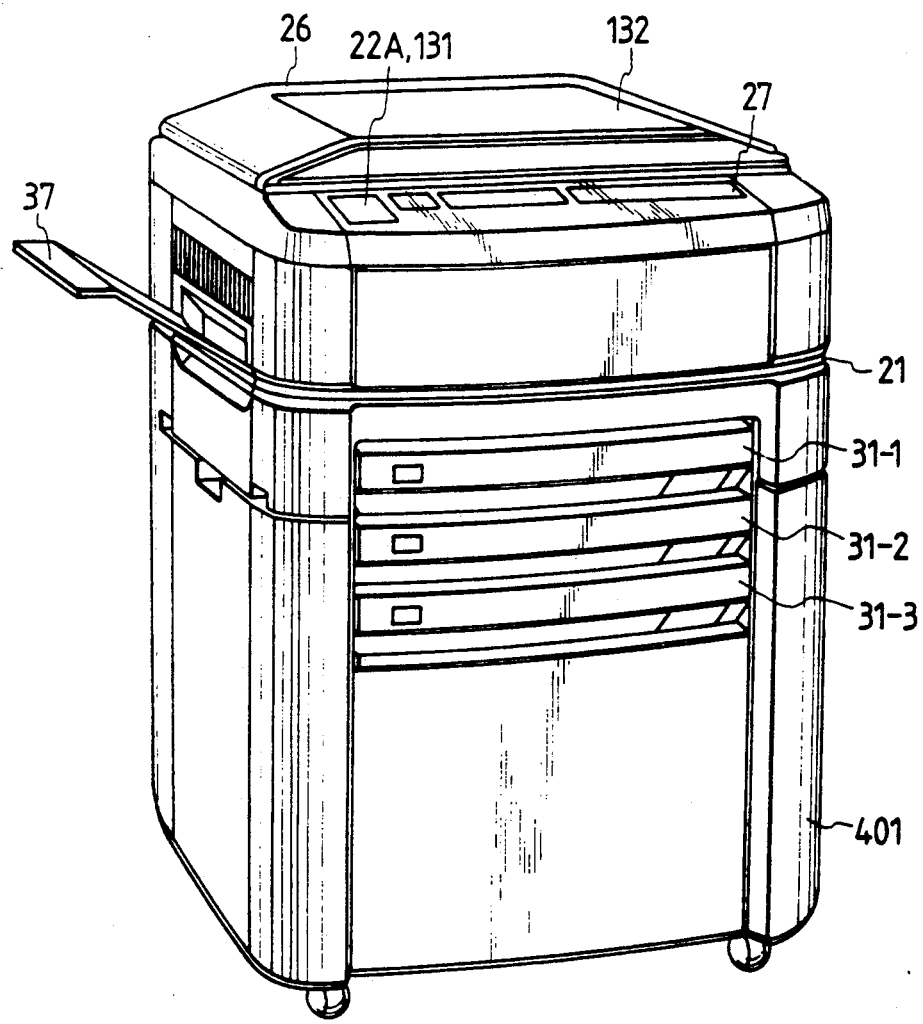
FIG. 17 shows a perspective view of the system configuration of a copying maching of the present invention fitted with an editor panel.
Figure 18:
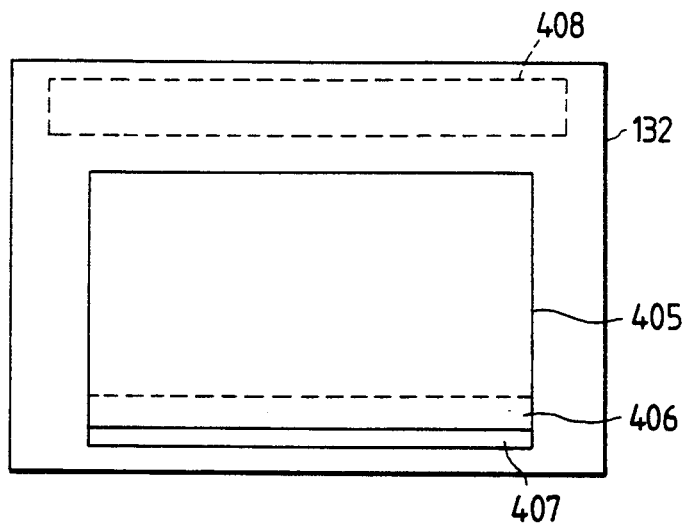
FIG. 18 shows a top view of the editor panel of the copying machine of the present invention.

FIGS. 17 and 18 show an editor panel 132. FIG. 17 shows the system configuration of the copying machine with an editor panel. More specifically, because the copying machine embodying the present invention is equipped with the DADF 24 mounted on the platen glass plate 55 as shown in FIG. 3, the platen 26 with an editor panel cannot be mounted thereon.

In the copying machine shown in FIG. 17, the platen with the editor panel is mounted on the base machine 21. The editor panel 132 is located in a square portion. This copying machine is provided with a back lit type console panel. Moreover, a cabinet 401, containing only the second and third feed trays 31-2, 31-3, is arranged under the base machine 21. The base machine 21 is not fitted with a sorter but the discharge tray 37 for receiving the discharged copying paper is installed.

The editor panel 132 is extremely convenient for coordinate input and is usable as an independent unit for the copying machine shown in FIG. 3. In this case, the editor panel 132 may be placed on a desk or the like and directly connected to the IC card device 22 with a cord to write coordinate data to the IC card 131, which is then mounted on the IC card device 22 for use.

FIG. 18 shows the editor panel provided with a rectangular coordinate input pad 405 which is approximately 307 mm long and 432 mm wide. An area 10 mm wide on this side of the panel is employed as an editor panel 406. The editor pad 132 including the editor panel 406 is such that a first rubber pad with a resistance wire for designating a position on the abscissa and a second rubber pad with a resistance wire for designating a position on the ordinate are superposed with a spacer sandwiched therebetween. The position pressed by the finger of the operator or tip of a pen is sensed in the form of values on the abscissa and ordinate. On this side of the editor panel 406 is a display panel 407 for displaying various kinds of data. Moreover, a circuit board for processing coordinate data and a circuit board 408 for an interface circuit are disposed in the rear portion of the editor pad 132.

Figure 19:
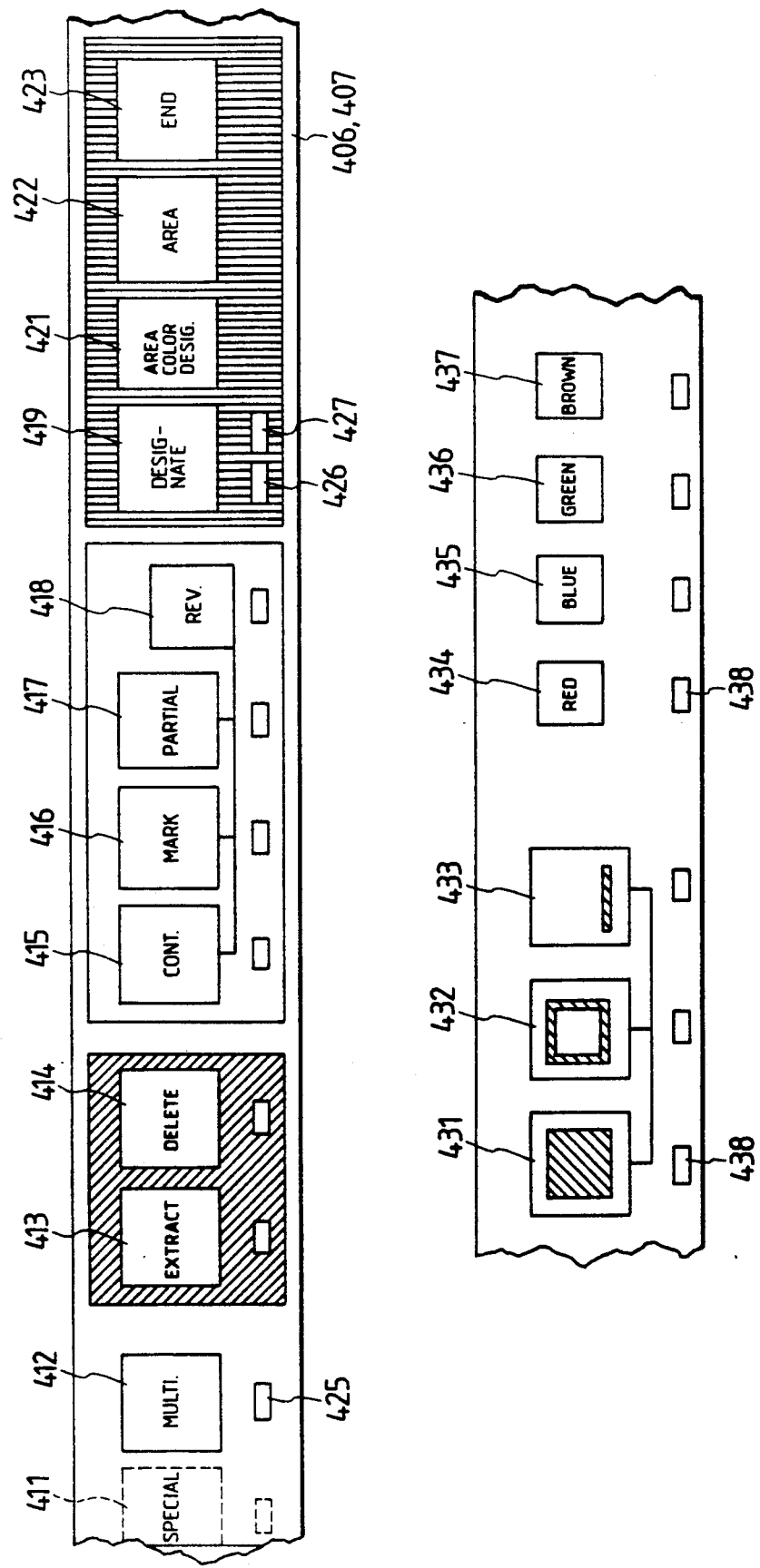
FIG. 19 shows a top view of the editor panel and a display panel of the copying machine of the present invention.
Figure 41:
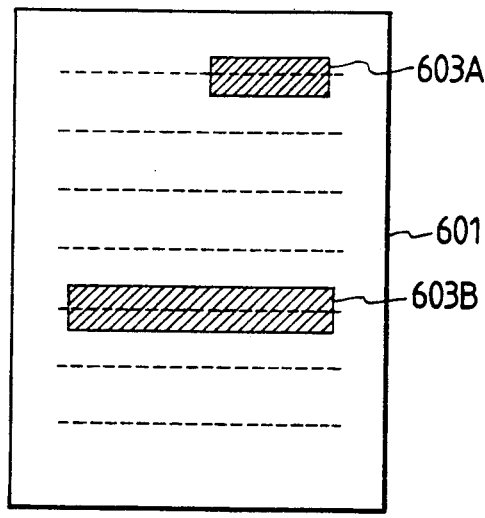
FIG. 41 is an illustration of a document editing function of the present invention.
Figure 42:
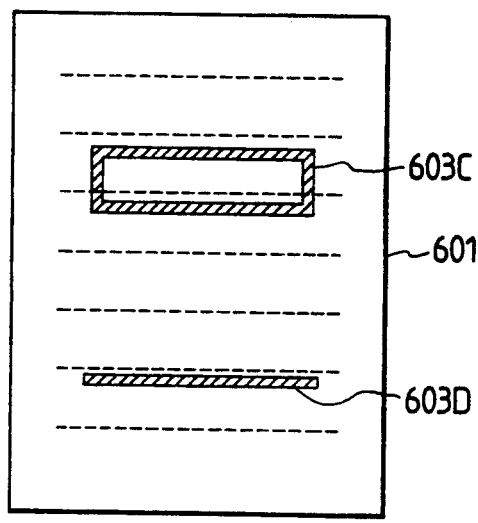
FIG. 42 is another illustration of a document editing function of the present invention.

FIG. 19 shows the editor panel 406 illustrated in FIG. 18 and the principal part of the display panel. The following buttons are disposed on the editor panel 406:

(i) Special function button 411 for use when special functions are employed;

(ii) Button 412 for dimensional alteration and redoubling, and used to specify reduction and enlargement by designating distances;

(iii) Extraction button 413 for extracting the area specified, and used for monochromatic recording;

(iv) Deletion button 414 for deleting the area specified, and also used for monochromatic recording;

(v) Continuous color synthesizing button 415, which is a function button for specifying the function of continuous color synthesizing;

(vi) Marking color button 416, which is a function button for specifying the function of marking color;

(vii) Partial color conversion button 417 used to specifying the function of converting partial color;

(viii) Color inversion button 418 used to color the area specified by color in black and to convert the area specified by black to color. The continuous color synthesizing button 415, the marking color button 416, the partial color conversion button 417 and the color inversion button 418 are all function buttons for color recording;

(ix) Method designation button 419 used to choose whether an area is specified with the coordinates of two points at both ends of a diagonal line of a rectangle or the coordinates of each point of a polygon;

(x) Area color designation button 421 used when an area is specified;

(xi) Area clear button 422 used to release the designation of an area;

(xii) Setting termination button 423 used when the designation of one or a plurality of areas is completed. To the display panel section 407, corresponding to the first eight buttons 411-418, are attached display lamps 425 for displaying whether respective 8 buttons 411-418 have been selected. The designation lamp 426 or a polygon designation lamp 427 is lit depending on the designation selected;

(xiii) Normal marking button 431 used to specify the normal marking form for uniformly marking, e.g., rectangular areas 603, 603 or an original 601 of FIG. 41;

(xiv) Side marking button 432 used to mark, e.g., an frame-like area 603C enclosing the specified area shown in FIG. 42;

(xv) Line marking button 433 used to mark, e.g., the specified area like a thick underline 603D shown in FIG. 42; and, (xvi) Color designaton buttons 434-437 for specifying a color relative to a marking area because the marking color can be determined independently on an area basis.

In this case, the color designation button 435 is used to specify red and the color designation button 435 to specify blue. The color designation button 436 is employed to specify green and the color designation button 437 to specify light brown. As set forth above, the color marking apparatus permits colors other than the above-described ones to be set. In this case, top covers attached to the surface of the color designation buttons 434-437 will have to be replaced with desired ones, respectively. Display lamps 438 are annexed to the buttons 431-437 for special use in marking, which have been described in (xiii)-(xvi), respectively, in order to display which one of the lamps has been selected.

Figure 20:
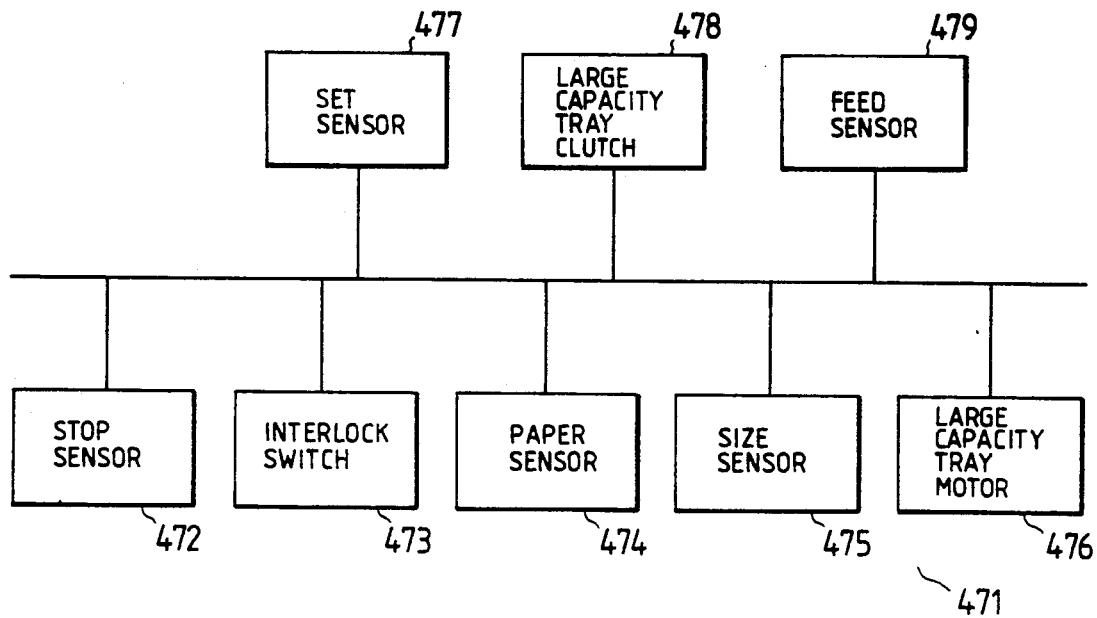
FIG. 20 shows a block diagram of a circuit configuration for use with a large capacity tray of the copying machine of the present invention.

A large capacity tray may be used in place of the fourth and fifth feed trays 31-4 and placed in the copying machine. FIG. 20 shows a block diagram illustrating the circuit configuration of a large capacity tray. The large capacity tray 471 is employed to set 1,000-2,000 sheets of copying paper at a time. A large number of copies can be made without interruption. The large capacity tray 471 is equipped with the following circuit components. The large capacity tray 471 is supplied with alternating current from the output of the noise filter 223, shown in FIG. 8, and direct current from the DC power supply 228 via the main board 201, shown in FIG. 8.

The large capacity tray operates the following circuit components:

(i) Stop sensor 472, fitted to the large capacity tray 471 equipped with an elevator mechanism for moving copying paper 60 up and down and used to detect the lower limit position;

(ii) Interlock switch 473, fitted to the front panel of the large capacity tray 471 and used to detect the opening and closing of the panel;

(iii) Paper sensor 474, for detecting that sheets of the copying paper 60 contained are running short;

(iv) Size sensor 475;

(v) Large capacity tray motor 476, for driving the elevator mechanism of the large capacity tray to move its copying paper 60 container up and down;

(vi) Set sensor 477, for detecting the upper limit position of the large capacity tray 471 equipped with the aforesaid elevator mechanism;

(vii) Large capacity tray clutch 478 for controlling the feeding of copying paper 60; and, (viii) Feed sensor 479, for detecting the jamming of copying paper 60 fed from the large capacity tray 471.

(6) Selection and Display of Functions

As previously described by reference to FIG. 5, switches 83-86, for selecting various functions and the display lamp 82 for the selection of these switches are disposed on the function selective panel 75. A plurality of functions are associated with each of the switches 83-86. The function that can be selected by the selective operation varies with the additional device attached. The DADF 24, the intermediate tray 33, the IC card device 22 and the like ca be installed in this copying machine and can be installed in the form of an optional additional device whenever the user desires. Provided the additional devices are attached, new functions unusable with the base machine become usuable and the combination of usable functions also correspondingly varies.

When the DADF 24 is attached, for instance, both sides of an original can be exposed. That is, the original is conveyed while one side thereof faces the platen glass to practice a first exposure and, after the exposure is completed, the original is turned upside down before being returned to the tray of the DADF 24. The original is then conveyed again to expose the side opposite to what has already been exposed.

When the intermediate tray 33 is installed, the copying paper used for copying can be stored thereon, whereby the copying paper may be stored upside down or with its surface side as what is intended for copying again.

The functions usable in this case depend on the selection of the installation of either DADA 24 and intermediate tray 33 or both of them at a time. In view of the duplex function, for instance, the duplex original-one-sided copy function is usable with ony the DADF 24, whereas the one-sided-duplex copy function is usable with only the intermediate tray 33. When both of them are installed, use can be made of three further functions namely, duplex original-duplex copy in addition to the duplex original-one-sided copy and one-sided original-duplex copy. When these functions are selected, the duplex switch 86 is operated. The editing processes such as the sheet-and parallel-dualization are unavailable without the DADF 24 and the intermediate tray 33. With the intermediate tray 33, sheet-dualization is possible Parallel dualization is possible with the addition of the DADF 24. When these functions are selected, the editing switch 86 is operated. As is obvious from the aforesaid examples, the presence or absence of the additional devices such as the DADF 25 and the intermediate tray 33 affects the variation of the combination of usable additional devices.

The sheet dualization is the function of duplicating the first and second originals both on one sheet of copying paper. In the copying machine of the present invention, up to five areas can be designated on the first original and the first and second originals can further be copied with different colors, using the monochromatic switch 91. In the case of the parallel dualization, a dual copy is taken on one sheet of copying paper so that the whole of the first original is combined with that of the second original. The originals are fed from the ADF 23 or DADF 24. Consequently, no parallel dual function is usable in a copying machine without either of them.

The copying machine of the present invention has a nonvolatile memory comprising a battery backup random access memory in which preset copying conditions including image density and magnification can be stored in the nonvolatile memory. When the contents of the preset memory are called or registered, the job memory switch 84 is operated and the IC card falls under the category of the nonvolatile memory, whereby the IC card device 22 is used as an additional one. In order to automate complicated copying operations classified by categories of business and users and to ensure that the multifunctional copying machine can be operated without errors, the IC card device 22 writes data of formatted copying operations to the IC card and supplies the data from the IC card to be base machine. For this purpose the IC card is arranged so that predetermined data for operating the copying machine according to formats can be written from the IC card device 22. The data includes the number of copies, continuous paging, reduction/enlargement ratios, binding margins, left and right margins, copy density, selection of the editing function and the duplex function. Accordingly, if the user has the IC card device 22 read the data stored in his IC card when formatted copies are taken, he is able to perform the formatted copying operation automatically without bothering to perform complicated operations on the console panel. Even when the IC card device 22 is installed like this, the contents of the usable job memory function differs.

Various additional devices are attachable to the base machine and usable additional functions vary with the combination of additional devices. However, the user can not always readily discriminate between what is usable and what is not and therefore may become confused. To eliminate such confusion, the functions that are not utilizable are not displayed and only those utilizable are displayed intelligibly in order that the desired functions can simply be selected and used within the range of additional functions without being conscious of the presence or absence of additional devices. Recording apparatus having excellent operability is thus achieved because the liquid crystal display as a display means in capable of displaying a train of characters and icons or pictorial symbols and image characters, it becomes possible to provide easy to identify displays for the operator with icons as function displays, i.e., minimal data such as pictorial data.

Figure 21:
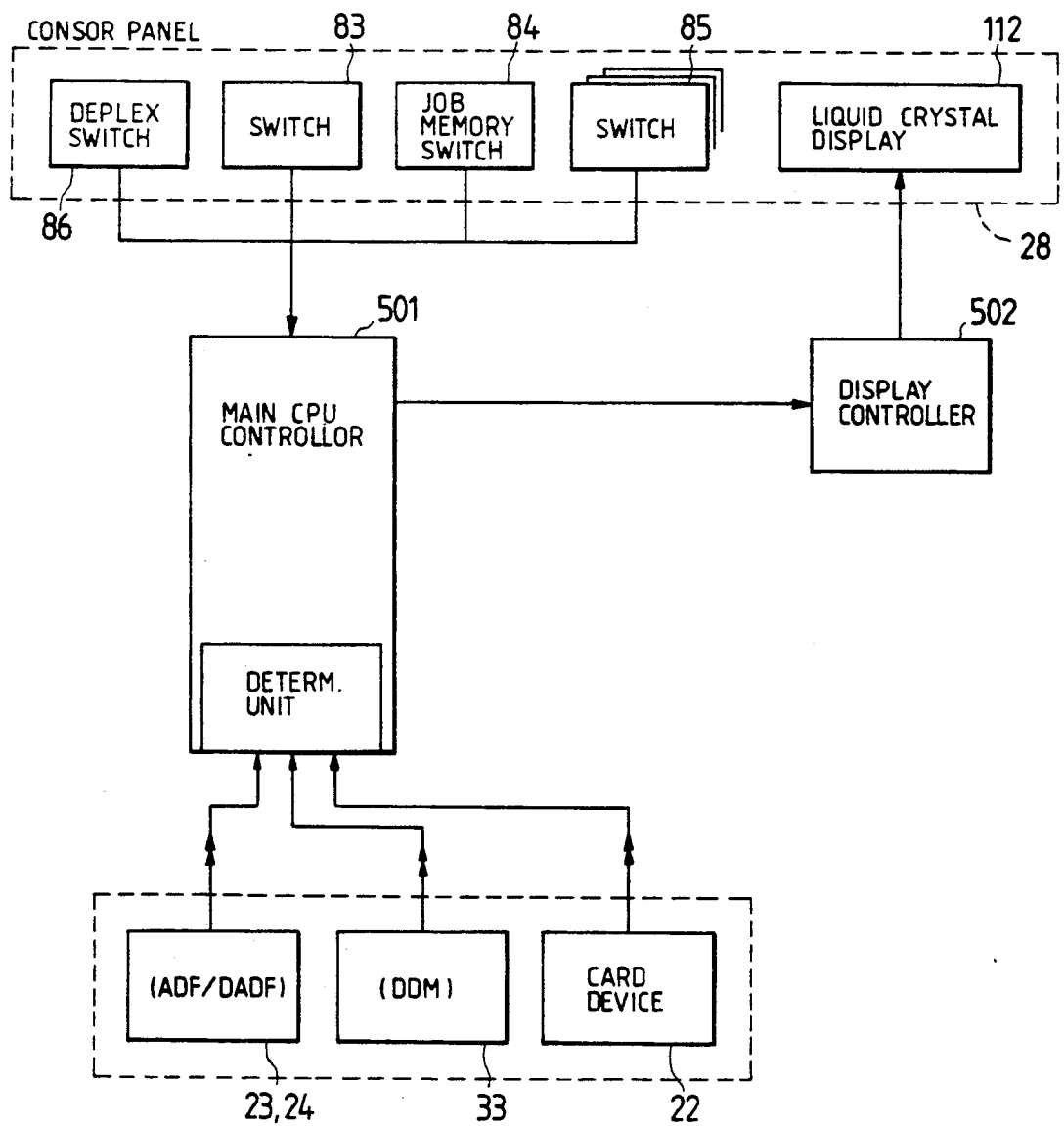
FIG. 21 shows a block diagram of a function selection system using a liquid crystal display for message display.
Figure 22:
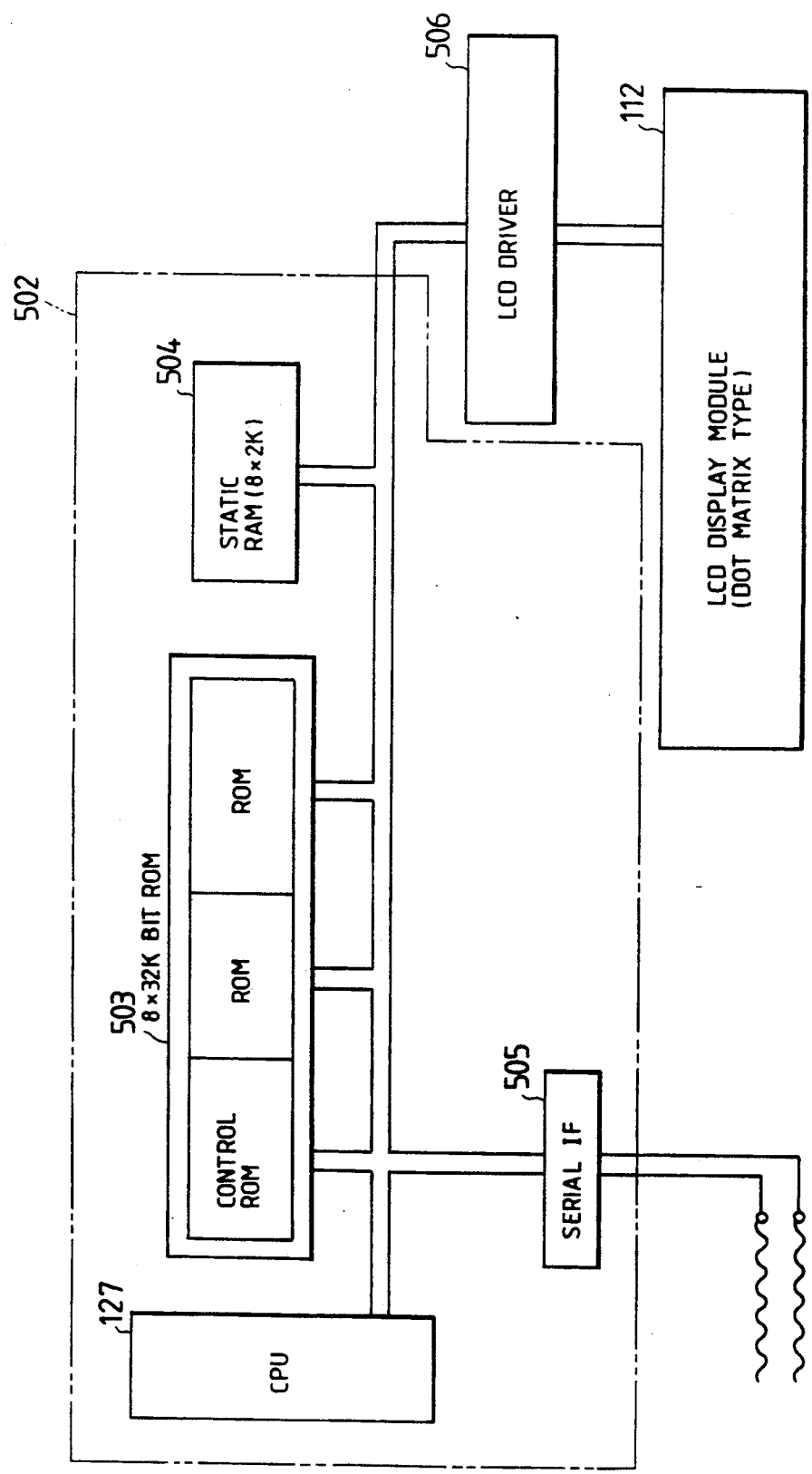
FIG. 22 shows a block diaqram of a display controller.

FIG. 21 shows a function selective system configuration using a liquid crystal display capable of displaying messages. FIG. 22 shows a block diagram of a display controller. In FIG. 21, a main controller 501 comprises: main CPU 121, ROM 121D, RAM 121, and I/O controllers 121J, 121G. The main controller 501 is provided with the function or program of identifying the presence or absence of an additional device such as a DADF 24, the intermediate tray 33 and the IC card device 22. A signal line is provided and is turned on when a connector is connected to a connector unit that connects each additional device and the machine body. A signal is received by the main controller 501 via the filter circuit 121H, shown in FIG. 7, and processed by the identifying program stored in the ROM 121D. For identifying the presence or absence of an additional device like this it is not the signal based on the connection of the aforesaid connector, but a contact signal of a switch pressed to turn on when an additional device is installed, a contact signal of a contactless switch, and a signal of an optical sensor designed for its light receiving means to detect light from light emitting means when an additional device is attached or any other signal.

The presence or absence of the additional devices such as the DADF 24, the intermediate tray 33 and the IC card device 22 is identified in the main controller 501. The main controller 501 has a message transmission table for displaying guides to the selection of various functions and the setting of copy conditions in compliance with the operation of the function selective switches and the keys. When the function selection switch or the duplex switch 86, editing switch 83, job memory switch 84 or another switch 85 is operated, the main controller 501 determines the message transmission table corresponding to the presence or absence of the additional device and sends the data of the message transmission table to a display controller 502. This is done by setting the presence or absence of function data, the quantitative dimension of the binding margin, the number of copies, etc.

As shown in FIG. 22, the display controller 502 comprises: display CPU 127, a ROM 503, a RAM 504, and a serial interface 505. The display controller 502 stores modules for processing data of the message transmission table, sentences corresponding to each message transmission table, and fonts of characters and icons in the ROM 503. The display controller 502 reads sentences from the ROM 503 according to the data of the message transmission table received from the main controller 501, sets the data designated to the sentence, develops characters and icons constituting the sentence into a font to control an LCD driver 506, and displays a designated message on the liquid crystal display 112.

Sentences are selected and consists of: a train of message characters such as "Which Do You Select?" icons of keys or selection and set keys to be operated subsequently, icons and a train of characters of the functions intended of selection choices, and icons of the cursor. When the sentence like this is displayed, the main CPU 121 recognizes the operation of the selection key 118 by the operator and increments the designated data of the cursor position of the message transmission table. The cursor display position is shifted by one on the row of the functions intended for selection. When the set key 119 is operated, the main CPU 121 recognizes this operation, selects the function corresponding to the cursor position of the message transmission table, and determines a new message transmission table corresponding to the function thus selected. It is in this state that copies can be taken. The message transmission table of the sentence having a train of message characters reading "Start Copy" is determined. In this case, the number of set sheets and the value of the binding margin are set. When the start button 117 is operated, the copy-making operation is started with the function thus selected under desired copy conditions.

Figures 23, 24B:
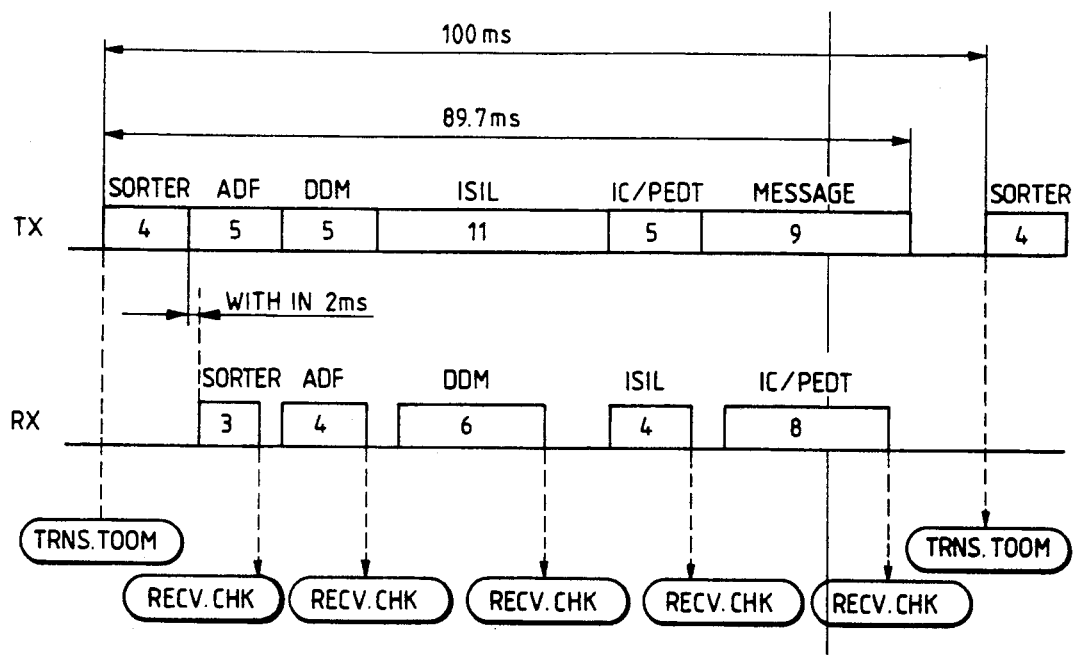

FIG. 23 shows a timing chart of serial communication and FIG. 24 shown a structural diagram of serial communication data. As shown in FIG. 6, the communication lines 123, 124 connect the main CPU 121 of the main controller 501. The display CPU 127 of the display controller 502 and serial communication is implemented through the communication lines 123, 124. The timing is such that transmission and reception of data are carried out in the order shown in FIG. 23 with a period of 100 msec. Data of 4 bytes, 5 bytes and 9 bytes are transmitted from the main CPU 121 to the sorter CPU 126, the original feed CPU 125 and the display CPU 127, respectively. Among the aforesaid data, what is transmitted from the main CPU 121 to the display CPU 127 is such that, as shown in FIG. 24, a control word (X'A9') is allotted to byte 1; a 3 bit state and a 3 bit substate to byte 2; a 7 bit case number to byte 3; a 7 bit free data area to bytes 4–8; and a check code to byte 9. The free data area of bytes 4–8 is utilized to receive data necessary for each sentence. As shown in FIG. 24(b), bits of 1#DGT, and 2nd #DGT are, for instance, allotted as transmission bits of numbers corresponding to mm and those of 3rd #DGT, 4th #DGT as transmission bits of numbers corresponding to copy. The remaining bits are allotted as data bits in the following manner: the presence or absence of mm display with '1; left and right of binding margin with '2; the presence or absence of continuous paging with '3; the presence or absence of frame erasing with '4; whether interruption is kept on with '5; color (without (0), black (1), red (2), blue (3), green (4), light brown (5)) with '6; the presence or absence of parallel dual with '7; and, dual function (one-sided-duplex (1), duplex-duples (2), duplex one-sided (3)) with '8.

FIG. 25 shows a block diagram of the message transmission table. The serial transmission data shown in FIG. 24 is the serial data formed on the basis of the message transmission table shown in FIG. 25 and is controlled by the main controller 501. The table is divided by the following kinds: (STATE), (SUBSTATE), (CASE NO.). The contents of a sentence becomes those actually displayed on the liquid crystal display 112.

In the main controller 501, one of the message transmission tables is selected by the operation of various switches on the console panel 28. The message transmission table shown in FIG. 25(a) is, for instance, selected when the job memory switch 84 is operated. The contents of the detailed transmission data are transmitted via the transmission lines to the display controller 502. The message transmission table shown in FIG. 25(b) is selected when the editing switch 83 is operated. Initially, the message transmission table is selected by the operation of the function switch in the main controller 501. When the message data is transmitted to the display controller 502, a corresponding sentence is read in the display controller 502 where it is developed into a font prior to being displayed on the liquid crystal display 112. The selection of functions is made according to the sentence or message thus displayed. When the selection key is operated during the step of selection, the contents of the cursor in the message transmission table are shifted by one place each time. When the set key is operated, the function in the cursor position and the message transmission table shown in FIG. 25(c) is selected in the following step. The message transmission table has the sentence "Start Copy" simultaneously with icons expressing the selection of erasing the frame on the right binding and one-sided duplex function displayed and prompts the inputting of the dimension of finding margin and the number of copies. When the aforesaid contents are transmitted from the main controller 501 to display controller as serial data, there is a sentence read out with a special code (OG) and an asterisk (*) written in the position of data designated with the free area such as the function icon and the numerical value out of the contents of 'sentence.' The special code and asterisk is rewritten with the data designated in the free data area before being displayed on the liquid crystal display 112. As shown in FIG. 22 to implement the process, display control programs, sentence and font data by codes are stored in the ROM 503 if the display controller 502. The sentence data is then read from the reception data of the reception buffer area of the ROM 504 into the work area and each of the sentence data is developed into the font after it is filled with the icon and numerical values.

FIGS. 26(a)–(l) show examples of icons for use in the present invention. These icons are expressed by 16×16 dots and include those indicating the following functions: (a) extraction, (b) deletion, (c) partial coloring, (d) frame erasing, (h) cursor, (i) memory readout, (j) memory registration, (k) left binding margin, and (l) right binding margin. The use of icons in sentences, for displaying on the liquid crystal display 112 combinations of messages as described above, ensures that the guide and confirmation data required is quickly given to the operator. The amount of information and a display area is less than that which is displayed with a train of characters only.

FIG. 27(a) shows a font of a dual sheet icon. FIG. 27(b) shows font data. FIG. 27(c) shows a font of a Kanji character FIG. 27(d) shows font data. The font is composed of 16×16 dots and, as for the font data, one line of 16 dots is divided into 8 dot halves and expressed in hexadecimal notation. Kanas, alphanumeric codes and other icons are fonts 16×16 dots like-wise and also expressed in hexadecimal notation.

Figure 28:
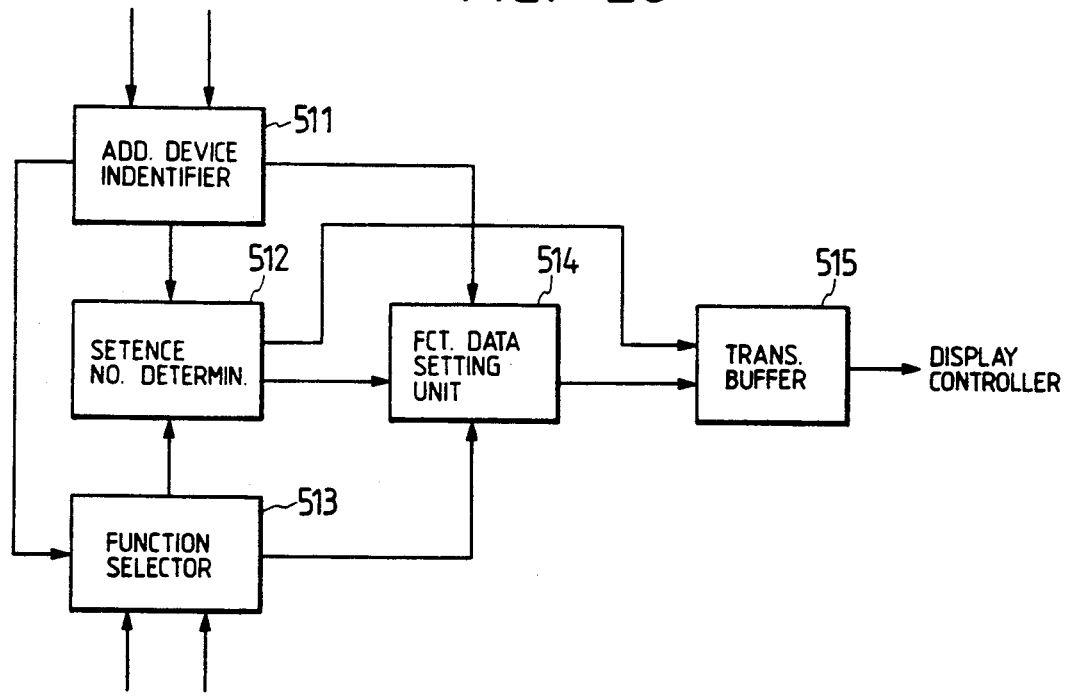
FIG. 28 is a block diagram of the function block in the main controller 501 for selecting additional function displays.
Figure 29:
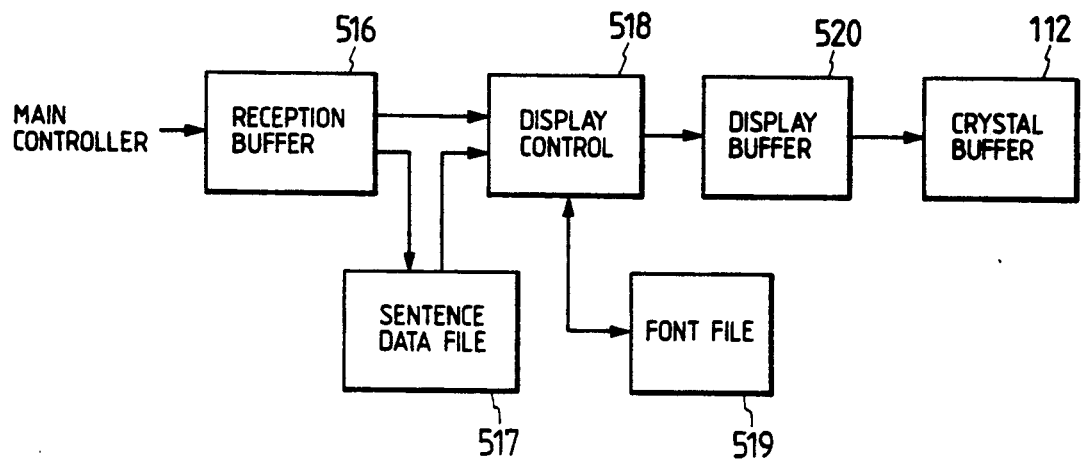
FIG. 29 is a block diagram of the function block in the display controller 502 of the present invention.

FIG. 28 shows a diagram of a functional block in the main controller 501 when the additional functions are selectively displayed. FIG. 29 shows a diagram of a functional block in the display controller 502.

Figure 26:
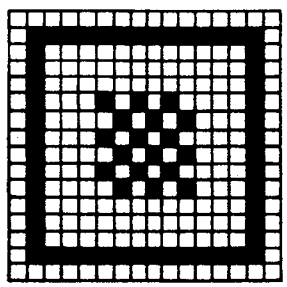
FIGS. 26(a) through 26(l) are diaqrams of icons used by the copying machine of the present invention.
Figure 26:
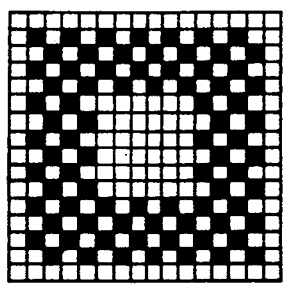
Figure 26:
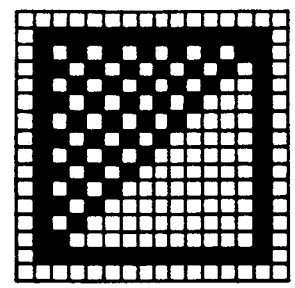
Figure 26:
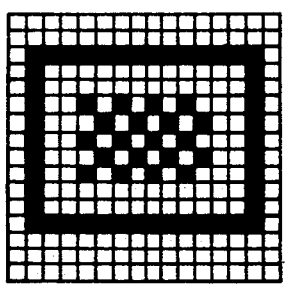
Figure 26:
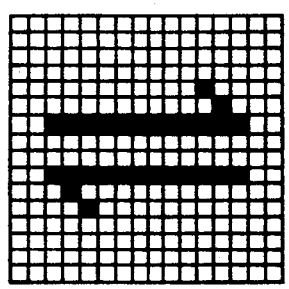
Figure 26:
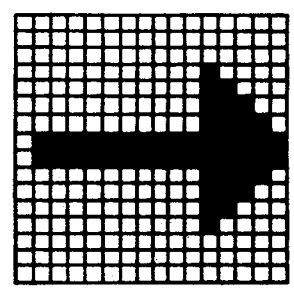
Figure 26:
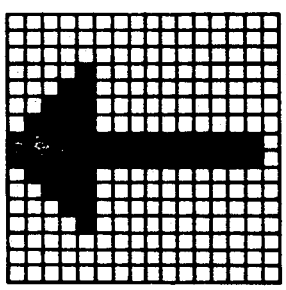
Figure 26:
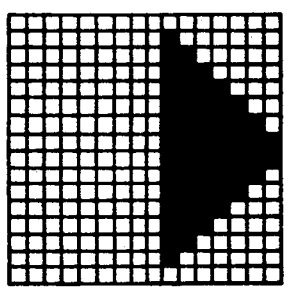
Figure 26:
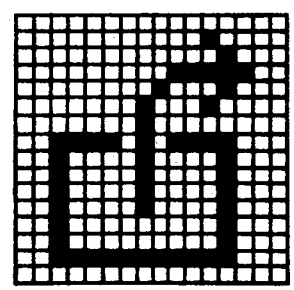
Figure 26:
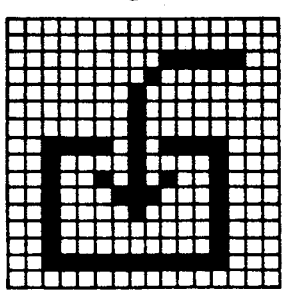
Figure 26:
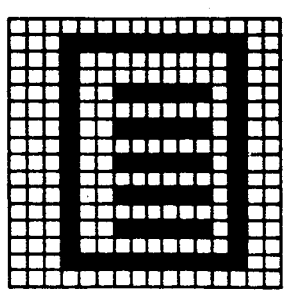
Figure 26:
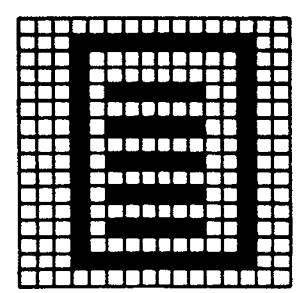

FIG. 28 shows the functional construction of the main controller 501. An additional device identifier 511 identifies a decision signal of the presence or absence of the additional device. A function selective switch operating signal. A function selector 513 selects functions in conformity with the signal of the additional device identifier 511 and the operation of the selection key 118 and the set key 119 installed on the console panel. A sentence number determinator 512 having the message transmission tables controlled by sentence numbers determines the sentence number to be displayed on the liquid crystal display 112 according to the signals of the additional device identifier 511 and the function selector 513. As shown in FIGS. 26, 27, there are prepared 200 and several tens of sheets as sentences depending on the display mode for the selection of functions when they are executed. Accordingly, the sentence number is determined by the function selective switch operated when the corresponding switch on the console panel is operated. The sentence shown in FIG. 26(a), for instance, is what is determined when the job memory switch 84 is operated, whereas the sentence shown in FIG. 26(b) is what is determined when the editing switch 83 is operated. A function data setting unit 514 sets function data with respect to the sentence determined by the sentence number determinator 512 and, when the sentence number shown in FIG. 26(a) is determined by the operation of, e.g., the job memory switch 84, checks the presence or absence of the IC card device 22. When the IC card device 22 is absent, it erects a flag [1]in the card registration erasing column. In the same manner, it checks the presence or absence of the intermediate tray 33 and the DADF 24 upon the decision of the sentence number shown in FIG. 26(b) based on the operation of the editing switch 83 and erects the flag [1]in the parallel dual column with the presence of the intermediate tray 33 but the absence of the DADF 24. The message transmission table of the sentence number determined by the sentence number determinator 512 is set in the transmission buffer 515, whereas the function data unit therein is further set by the function data setting unit 514 and transmitted to the display controller 502.

FIG. 29 shows the construction of the display controller 502. A reception buffer 516 is used to set the data of the message transmission table received from the main controller 501. A sentence data file 517 stores the sentence data or the trains of characters and icons to be displayed on the liquid crystal display 112. A font file 519 stores fonts of characters constituting sentence data and icons. A display control 518 processes the data of the message transmission table set in the reception buffer 516 and develops display fonts in a display buffer 520. It also reads desired sentence data from the sentence data file 517 based on the reception data [CONTROL WORD], [STATE], [SUBSTATE], [CASE NO.] and plants the designated data in the sentence to develop fonts in the display buffer 520.

Some of the sentence data require rewriting the contents according to the data set each time. The function display, the binding margin, the number of set sheets, the cursor and the like fall under the category above. A special code or asterisk is preset in a position where the data is written in each of the sentence data. When the sentence is read from the sentence data file 517, the special code or asterisk is set blank in the display control 518 first and the position is simultaneously prestored. The icon and the numerical value are written to that position according to the data designated by the reception buffer 516. The train of characters and the icons are written to the liquid crystal display 112 in this manner and the contents of the display buffer 520 with the fonts thus developed are displayed thereon.

Figure 30:
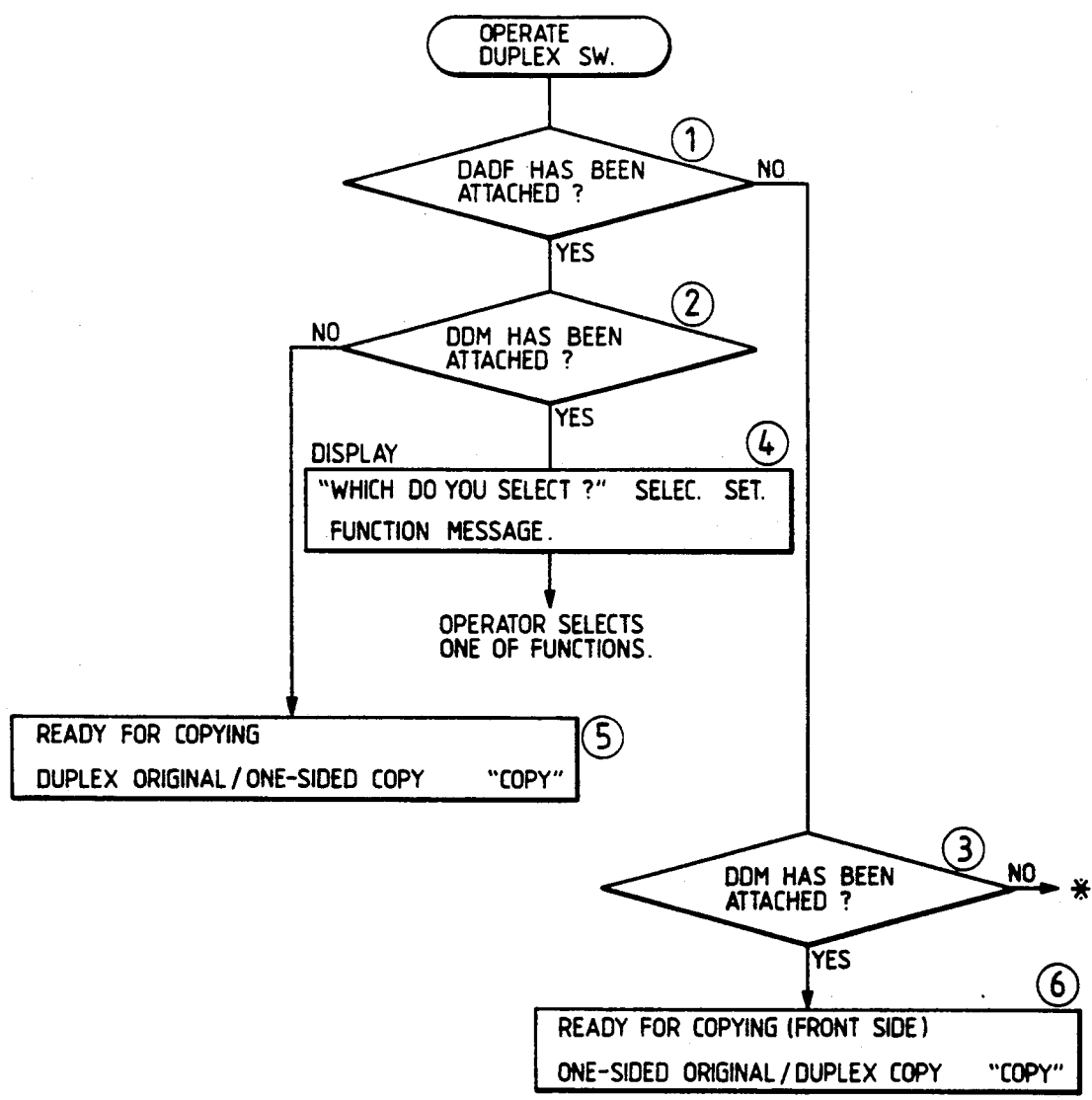
FIG. 30 is a flow chart of operations performed as a result of selection of a duplex switch.

The following is a description of function selection made when function selection switches are respectively operated and displayed. FIG. 30 shows a flowchart of operations when the duplex switch operated. As shown in FIG. 30 at steps (1), (2), (3), when the duplex switch 86 of the console panel is operated, it is determined whether the DADF 24 and the intermediate tray 33 have been attached. As shown in FIG. 30 at step (4) when the DADF 24 and the intermediate tray 33 both are installed, a message transmission table of a sentence comprising a train of message characters "Which do you select?" icons. This message indicates: selection and set keys are next operating keys, choices from the three functions intended for selection. The cursor showing a function selective position is determined and the sentence is displayed on the liquid crystal display 112. The selection can be made from among the three functions of one-sided original/duplex copy, duplex original/duplex copy, and duplex original/one-sided copy. When the sentence is displayed, the desired function is to be selected by the set key 119 after the cursor is moved by the selection key 118 to a desired position. If the desired function is selected at this time, the message of "Start copy" is subsequently displayed, whereby a copy making operation in accordance with the function thus selected is performed.

As shown in FIG. 30 at steps (5), (6) with the presence of the DADF 24 but the absence of the intermediate tray 33, the function of duplex original/one-sided copy is automatically determined, whereas the function of one-sided/duplex copy is determined with the absence of the DADF 24 but the presence of the intermediate tray 33. Consequently, a message transmission table of a sentence comprising the contents suggesting the setting of "Start copy," functions, and the number of copies is determined and the sentence is displayed on the liquid crystal display 112. In this case, the copying making operation can be started correspondingly by setting originals, instructing the number of copies from the ten keys 80 and operating the start button 117. When the duplex switch 86 is operated, as set forth above, the message transmission table shown in FIG. 30 at steps (4) or (5), and (6) is used.

Figure 31:
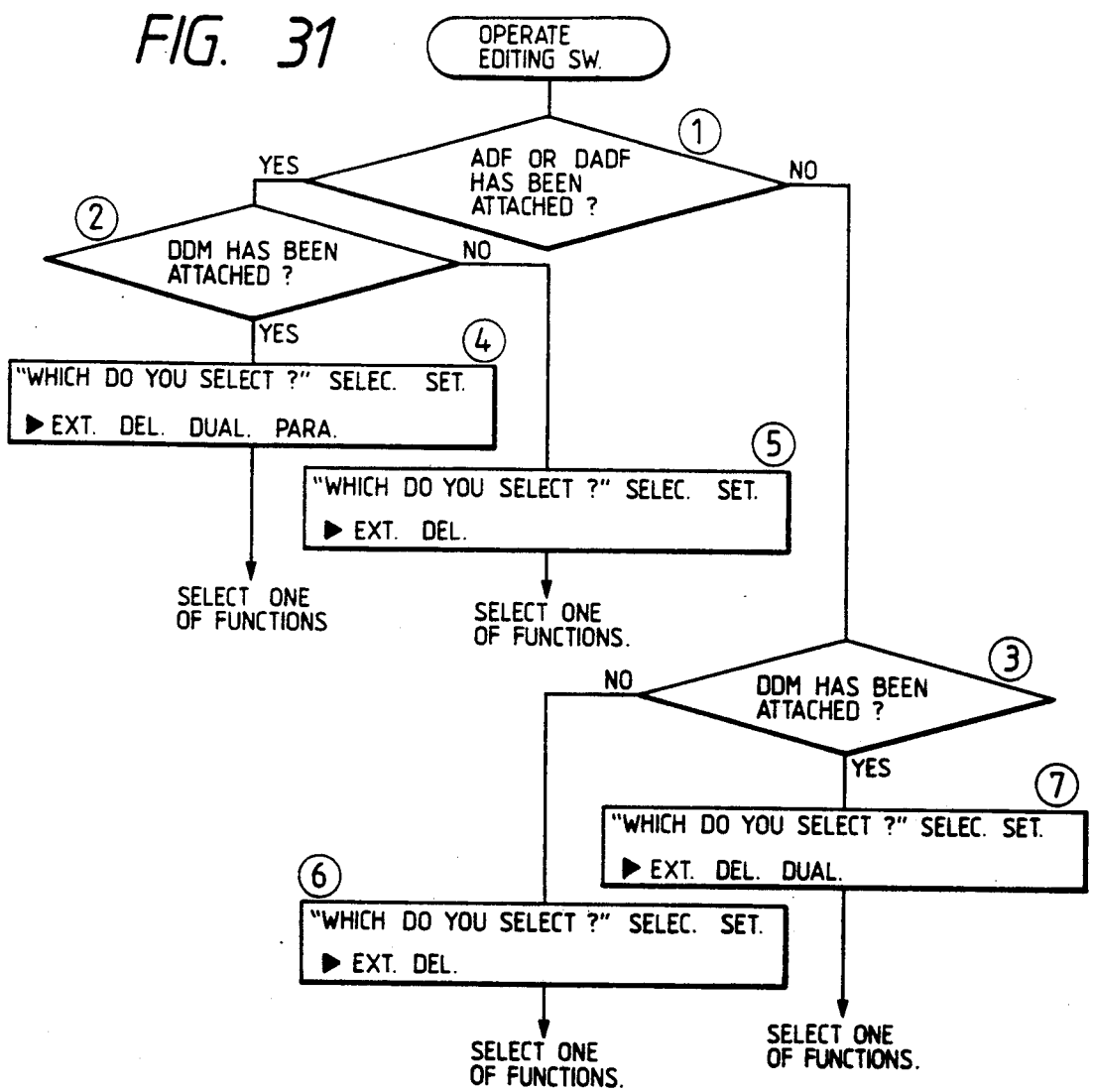
FIG. 31 is a flow chart of operations performed as a result of selection of an editing switch.

FIG. 31 shows a flowchart defining a process wherein the editing switch is operated. When editing switch 83 of the console panel is operated, at steps (1), (2), (3) it is first determined whether the ADF 23 or DADF 24 and the intermediate tray 33 have been installed. As shown in FIG. 31 at step (4), when the ADF 23 or DADF 24 and the intermediate tray 33 both are present, a message transmission table of a sentence comprising a train of message characters "Which do you select?" icons indicating the selection and next operating keys. Choices from the three functions intended for selection and the cursor showing a function selective position is determined. The sentence is displayed on the liquid crystal display 112, since four of extraction, deletion, dual sheet and parallel dual functions are usable. As shown at steps (5), (6), with the absence of the intermediate tray 33, however, the sheet dual and parallel dual functions are not usable. Accordingly, upon the determination of the message transmission table of the same sentence, function data for erasing the choices from these functions is set and a sentence with extraction and deletion as choices is displayed.

As shown at step (7), with the presence of the intermediate tray 33, the absence of the ADF 23 and the DADF 24, since the parallel dual function is unusable, function data for erasing the choice of the function is set and a sentence with extraction, deletion and dual sheet choices is displayed.

When the editing switch 83 is operated, the difference only lies between the function data to be set relative to the four choices. Therefore, the message transmission table of the same sentence is determined and, by selecting the desired function using the selection and set keys on the message display, the next step of procedure is dealt with.

Figure 32:
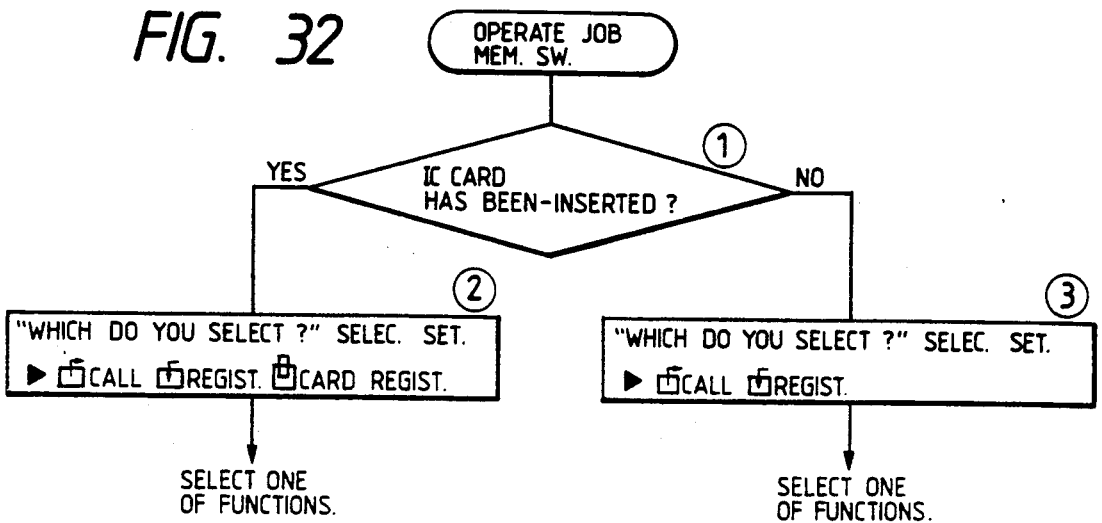
FIG. 32 is a flow chart of operations preformed as a result of selection of a job memory switch.

FIG. 32 shows a flowchart of a process when the job memory switch is operated. When the job memory switch 84 of the console panel is operated, step (1) indicates the determination whether the IC card device 22 has been inserted. In step (2), if the answer to step (1) was yes, i.e., when the IC card device 22 is present, the card registering function is usable. Accordingly, a message transmission table of a sentence comprising "Which do you select?" icons indicating: selection and next operating keys, and choices from the three function intended for selection [call], [registration], and [card registration]. The cursor showing a function selective position is determined and the sentence is displayed on the liquid crystal display 112. In step (3), in case of No. i.e., no IC card device 22 exists. However, the function data for erasing choice of the function or card registration is set, upon determination of the message transmission table of the same sentence. Accordingly, the sentence with the call and the registration as choices is displayed.

Figure 33:
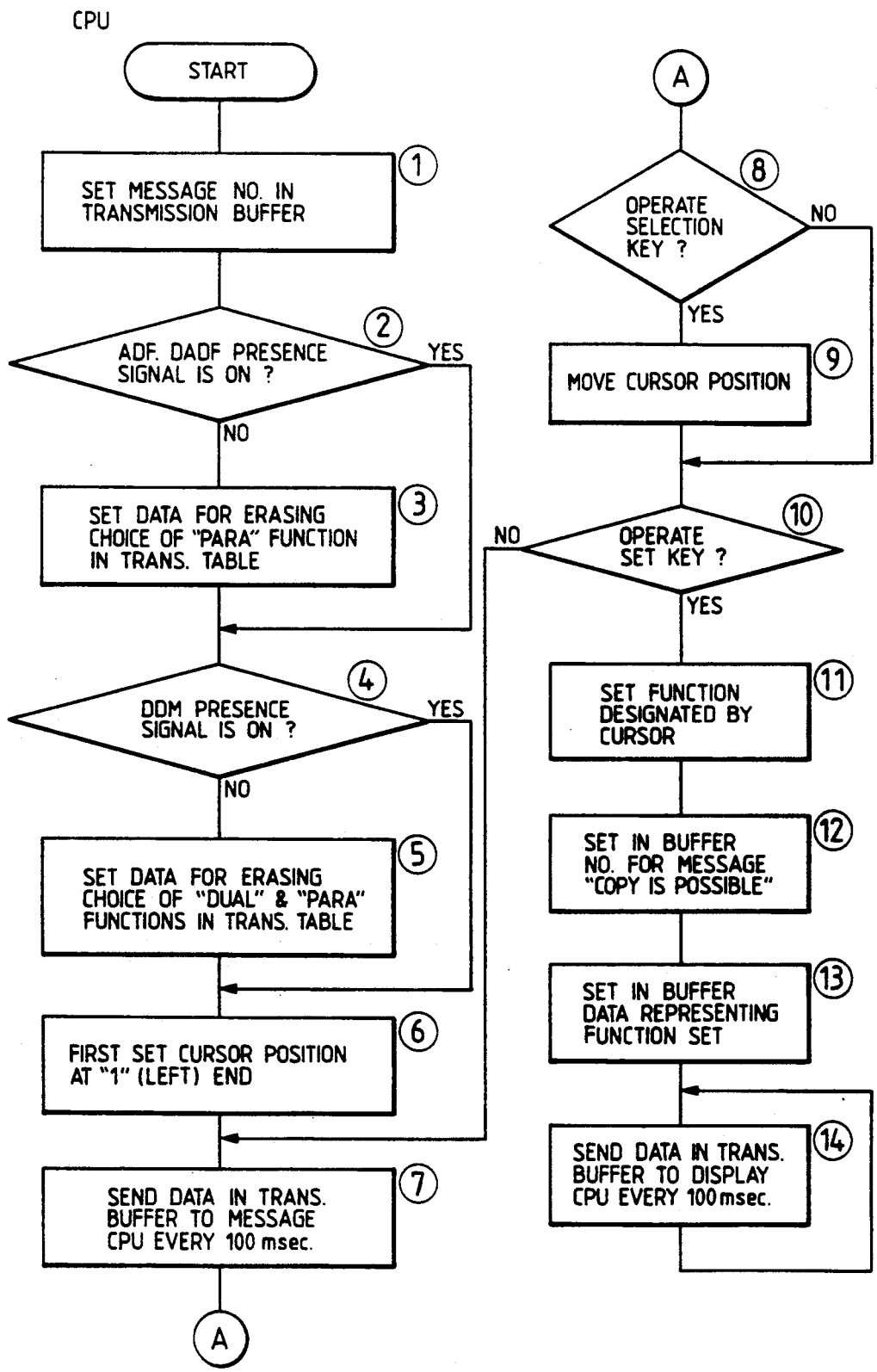
FIG. 33 is a flow chart of operations performed as a result of selection of an editing switch in the main controller 501.
Figure 34:
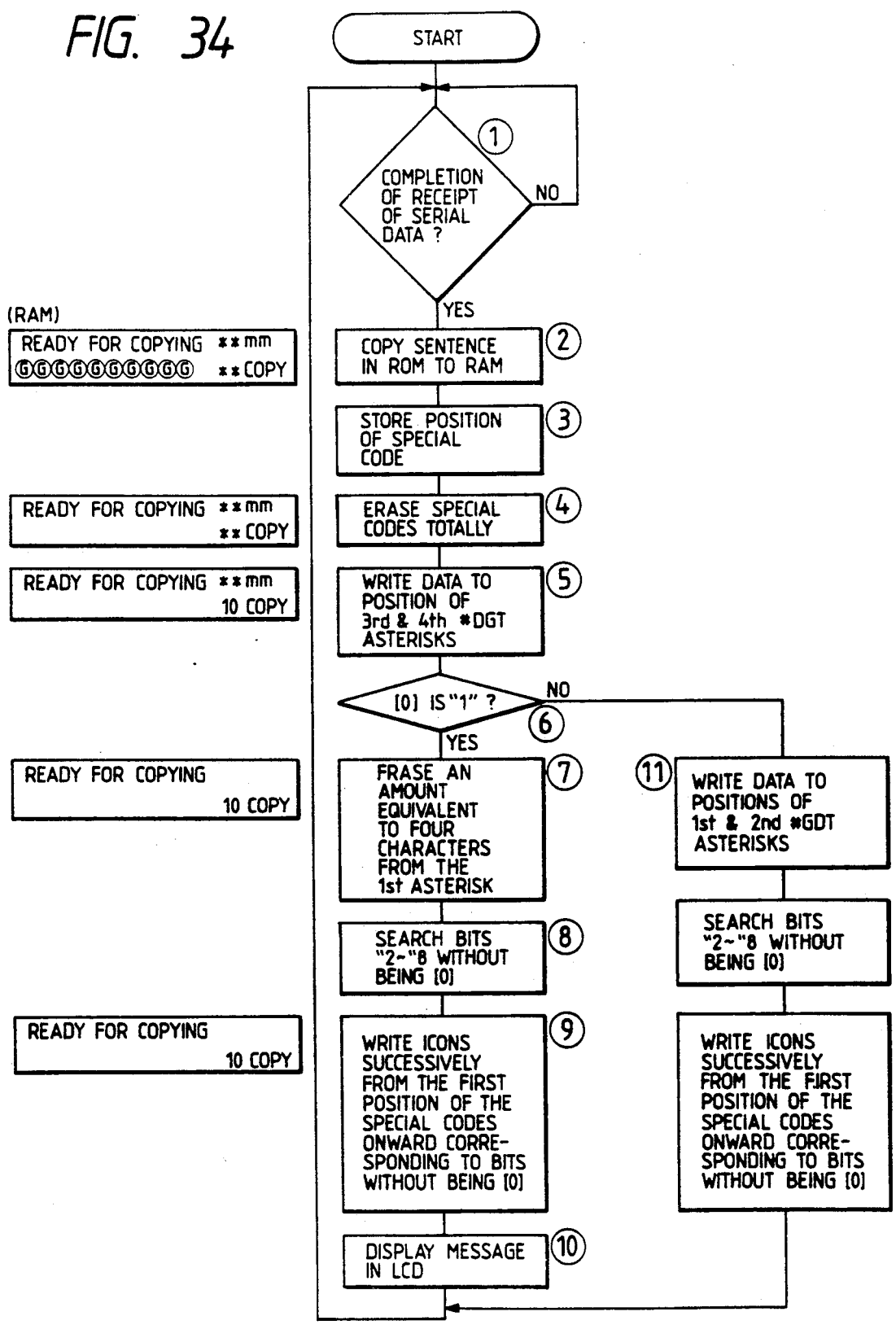
FIG. 34 is a flow chart of the operations of the main controller 502.

FIG. 33 shows a flowchart of the process in the main controller 501 in detail of operation of editing switch. FIG. 34 shows a flowchart defining a process in the display controller 502. Referring to FIG. 33, the flowchart illustrating the process in the main controller 501 will be described. When the editing switch 83 is operated the following steps result:

(1) a message transmission table for having functions selected is set in the transmission buffer;

(2) Subsequently, whether a presence or absence signal of the ADF 23 or DADF 24 is on or off is checked;

(3) If NO is the process of (2), data for erasing choice of the [parallel dual] function is set in the transmission table; or (4) If YES in the above process of (2) or after the process (3) is performed, whether a presence or absence signal of the intermediate tray 33 is on or off is checked; and, (5) If NO in the above process of (4), the sentence is used in the color conversion of the transmission table. FIG. 35(c) shows a diagram illustrating a display picture plane with icons and numerical values written to the sentences.

Figure 36:
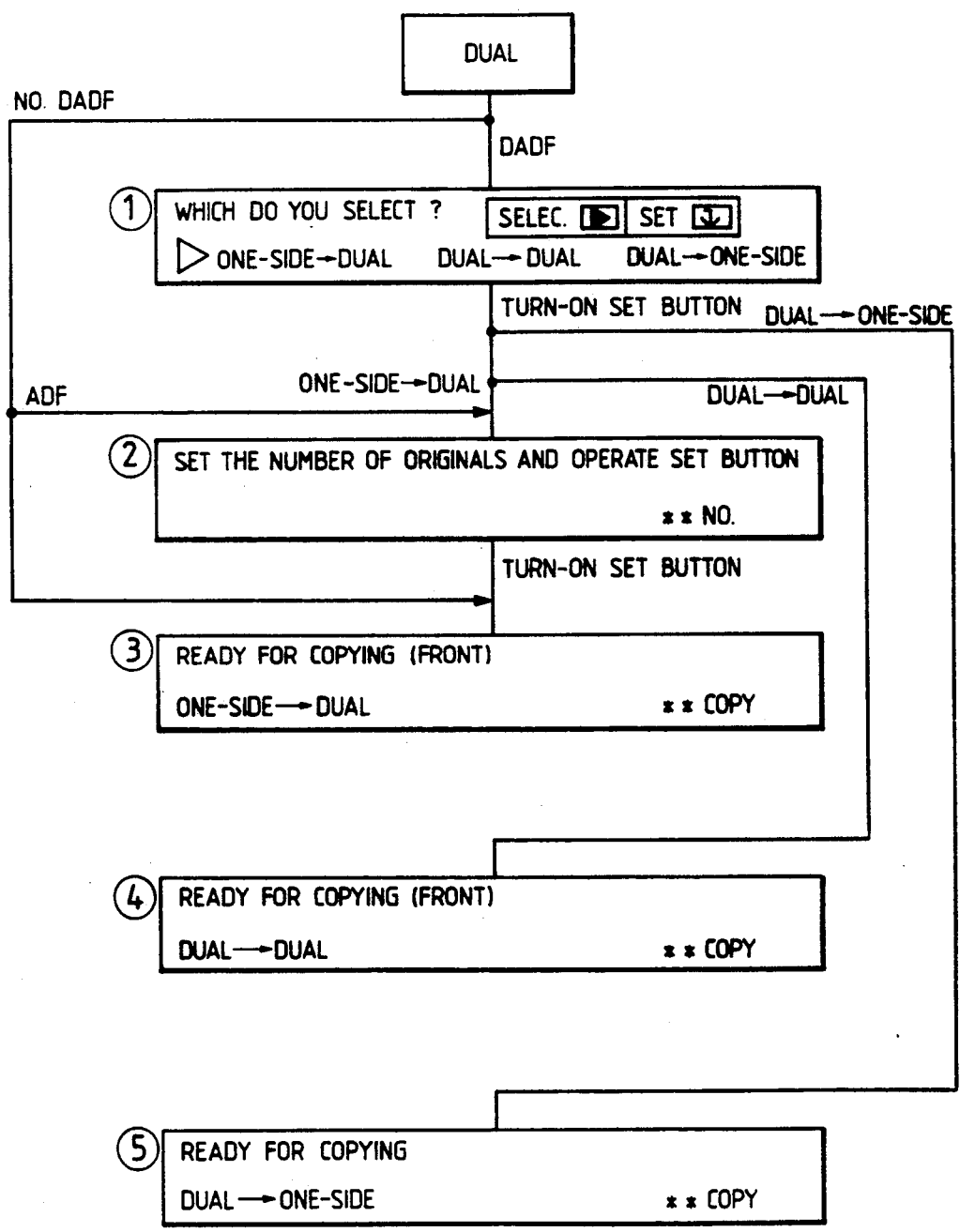
FIG. 36 shows sentences displayed in the course of selecting the duplex function.

FIG. 36 shows examples of sentences displayed in the operation of selecting the duplex function. When the duplex switch 86 is operated, one-sided-original/duplex copy, duplex original/duplex copy functions are usable by installing the intermediate tray 33 in combination with the existing DADF 24. Steps (10), (11) indicate whether set key 119 is operated, monitored and, when it is operated. The function of the cursor position is set to the base machine. Step (12) indicates the message transmission table with the message No of "Start copy" simultaneously set to the transmission buffer. Step (13) indicates the data of the set function that is set to the transmission table. Step (14) indicates the transmission table data is sent to the display controller 502 every 100 msec.

On the other hand, the display controller 502 performs the following processes (FIG. 34, FIG. 25) in conformity with the process performed by the main controller 501. As shown in steps (1), (2), upon completion of reception of the serial data, the head address of a sentence to be displayed is obtained and copied in the RAM. In step (3) the positions of the special code (G) and asterisk (*) are stored. In step (4) the special codes are totally erased. In step (5) data is written to the positions of 3rd #DGT and 4th #DGT asterisks (*). If the data is 10, it signifies 10 copies, which is the number of copies. In step (6) it is determined whether [0] is '1. In step (7) if the answer to step (6) is YES, i.e., without the function of the binding margin, an amount equivalent to four characters from the first asterisk is erased. In step (8) bits '2-'8 without being [0] are searched. In step (9) icons are successively written to the first position of the special codes onward corresponding to the bits without being [0]. As illustrated, '8 is [3], i.e., what is applicable to the duplex/one-sided function. In step (10) the message sentence comprising icons and the train of characters is displayed on the liquid crystal display 112. In step (11) if the answer is NO in the above process of step (6) (mm display), i.e., without the function of the binding margin, the data is written to the positions of the 1st #DGT and 2nd #DGT asterisks (*). The same process is applied in and after (8).

FIG. 35 shows a diagram of the relationship among message No., case No. and a message sentence. As shown in FIG. 35, the message sentence stored in the ROM 503 of the display controller 502 comprises the train of characters consisting of kanas, kanjis, alphanumeric letters, icons used for function display, special codes (OG) indicating the positions to which the icons are written, and asterisks (*) to which numerical values are written. The sentence is read out with the message No. and the case No. as addresses. Asterisks are written to the positions of the special codes and the icons and the numerical values correspond to the date in the free data area of the reception data as described in FIG. 34. When the fixed icons are used in a sentence, the sentence may be constituted by icon codes from the beginning without the use of the special codes. FIG. 35(a) shows an example of the sentence having a message "Start copy." FIG. 35(b) shows an example of the sentence of a message for inputting an area having a message of an [area 1]. There are shown message No. 7.1.28 for dual sheet, 7.1.31 for extraction, 7.1.32 for deletion and 7.1.33 for color-marking. continuous dual coloring. A button is used when color is marked by setting an area 171 with a thick underline as shown.

Color designating buttons 434–437 are provided. Since color marking can be made independently on an area basis, these buttons are used to designate colors relative to the areas to be colored. In this case, the color designating buttons 434, 435, 436 designate red, blue, green and light brown, respectively. As both one-sided/duplex, duplex/one-sided are usable, the sentence (1) having all the choices is displayed as shown in FIG. 36 and the cursor or triangle flashes at the head point of the choice [one-sided/duplex]. When the selection key is pressed, the cursor moves up to the front of [duplex/-duplex]and, if the selection key is further pressed, the cursor moves to the front of [duplex one-sided] and flashes. If the set key is pressed while the cursor flashed at the front of [duplex duplex], the sentence of step (4) is displayed to set the copying mode. Without the DADF 24, however, the sentence of step (2) or (3) is displayed. If the set key is pressed after the cursor position is selected by the selection key while the sentence of step (1) is displayed, the sentence of steps (2), (4) or (5) is selected and displayed.

Figure 37A:
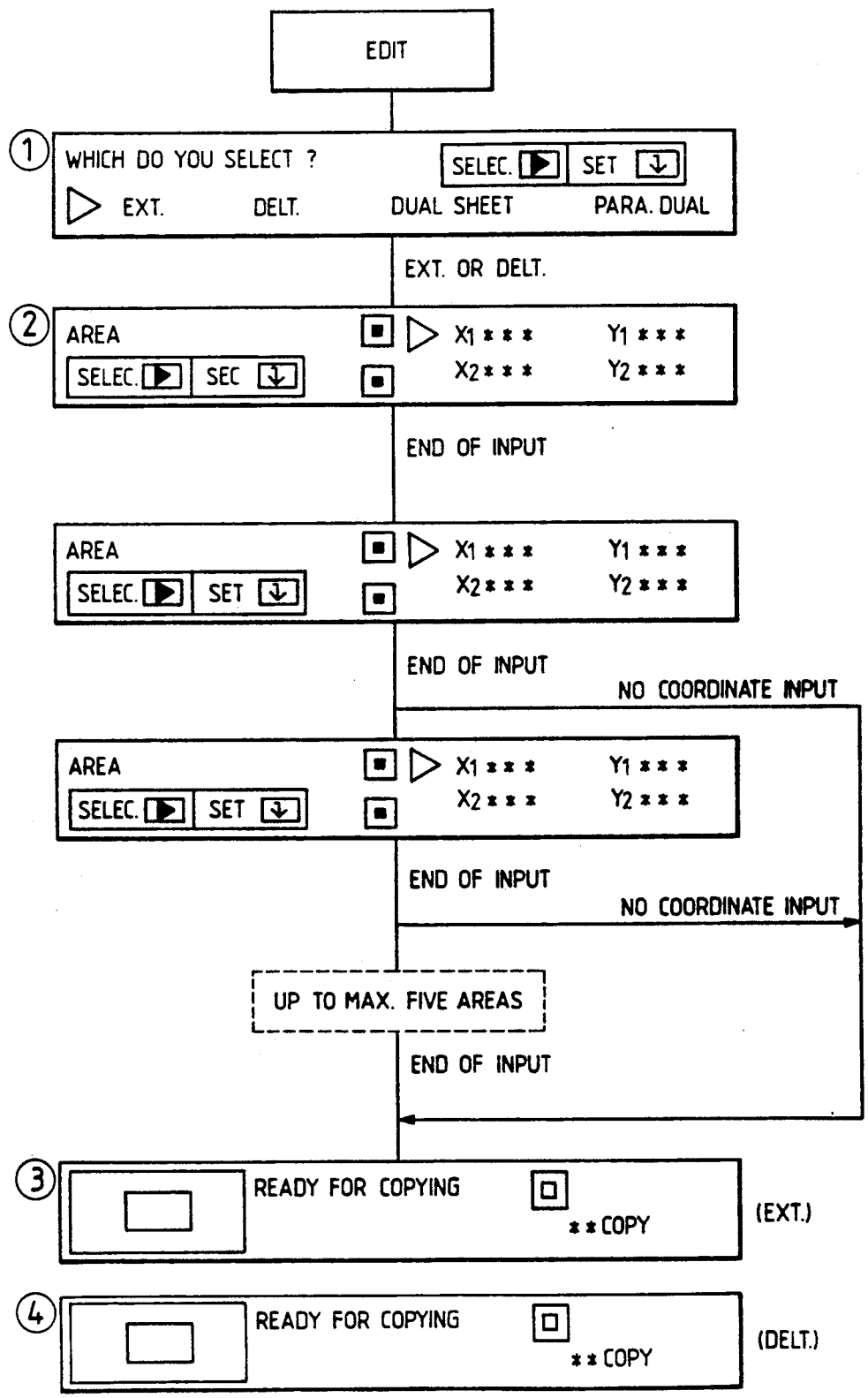
FIGS. 37(a), 37(b) and 37(c) show sentences displayed in the course of selecting the editing function.
Figure 37B:
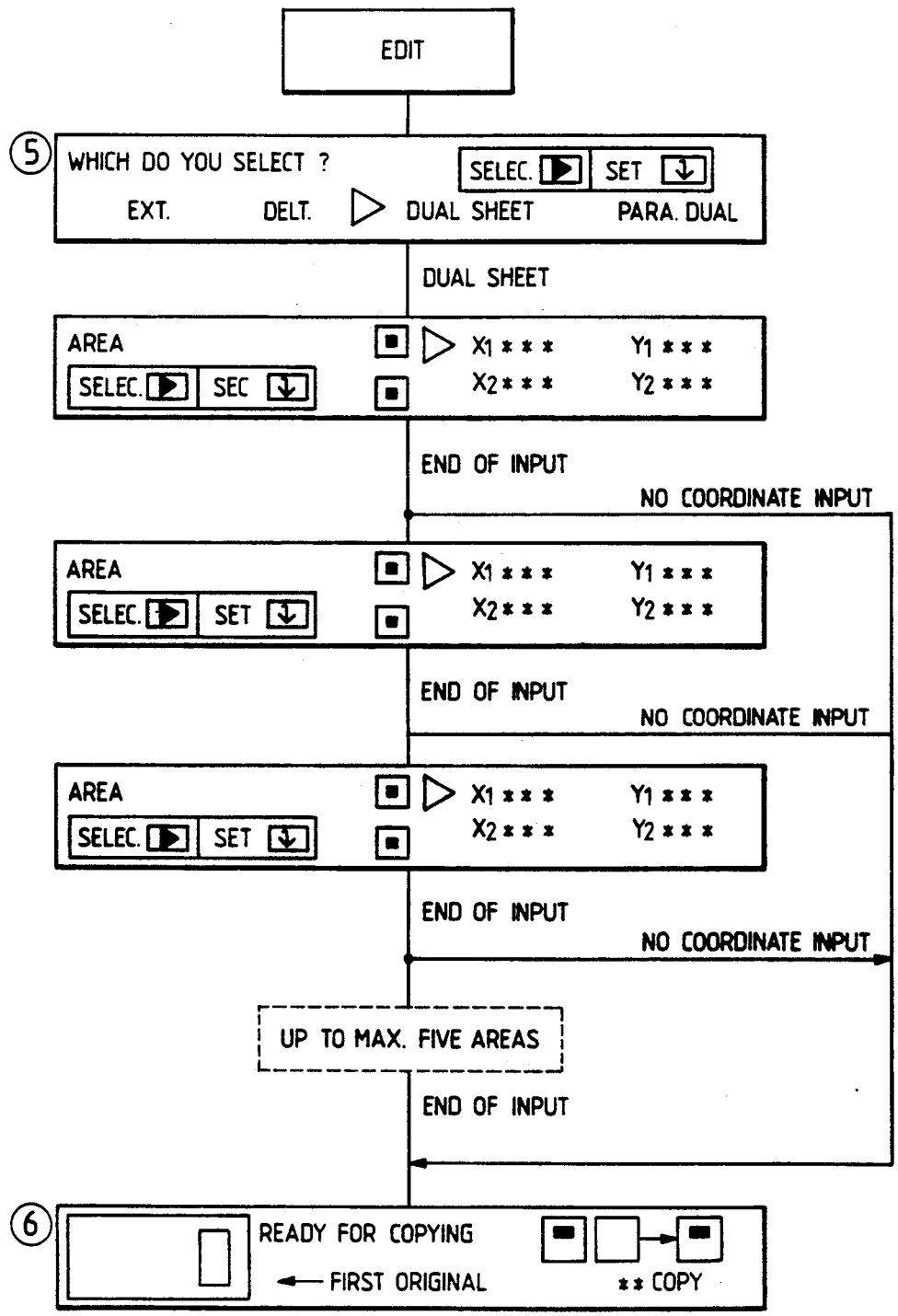
Figure 37C:
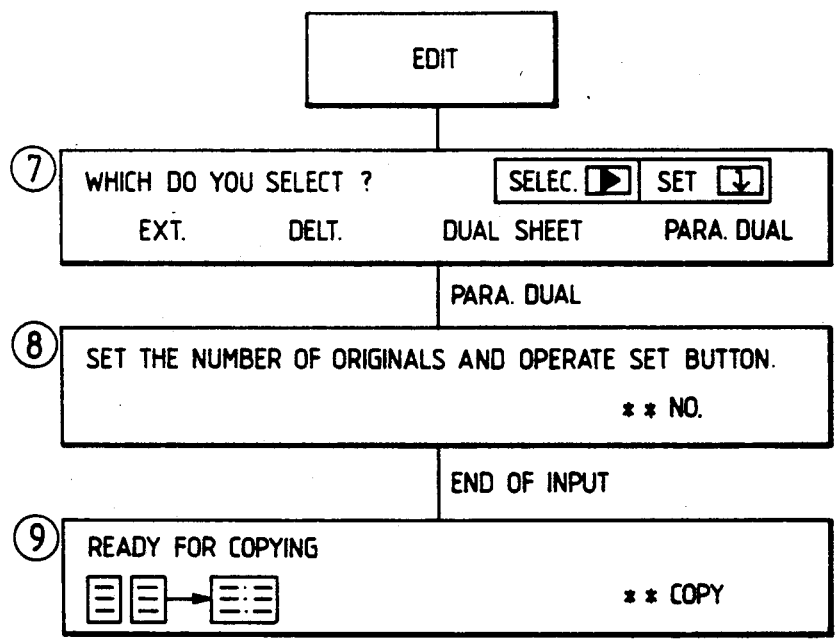

FIG. 37 shows an example of the sentence in the operation of selecting the editing function. When the editing switch 83 is operated, the sentence of step (1) at FIG. 37(a), where the cursor or triangle flashes at the head of the choice [extraction] is displayed. When the selection key is operated, the cursor moves from [deletion]-[dual sheet]-[parallel dual]-[extraction]-at each operation. When the set key is operated at the time the cursor is positioned at [extraction] or [deletion], the sentence of (2) is displayed and the coordinates of the designated area can be inputted. Upon completion of the inputting of the coordinates of maximum five areas, the sentence of steps (3) or (4), with the icons corresponding to the selected function being displayed, is displayed so that copy making becomes possible. Even if the set key is operated when the cursor position is situated at [dual sheet], as shown in FIG. 37(b)(5), the coordinate input mode is established. The sentence of step (6) is displayed after the coordinates are inputted, so that copying making becomes possible. If the set key is operated when the cursor position is situated at [parallel dual] as shown in FIG. 37(c) step (7), the sentence of step (8) where the mode of setting the number of originals is displayed and, when the input of the number of originals is set, the sentence of step (9) is displayed, so that copy making becomes possible.

Figure 38A:
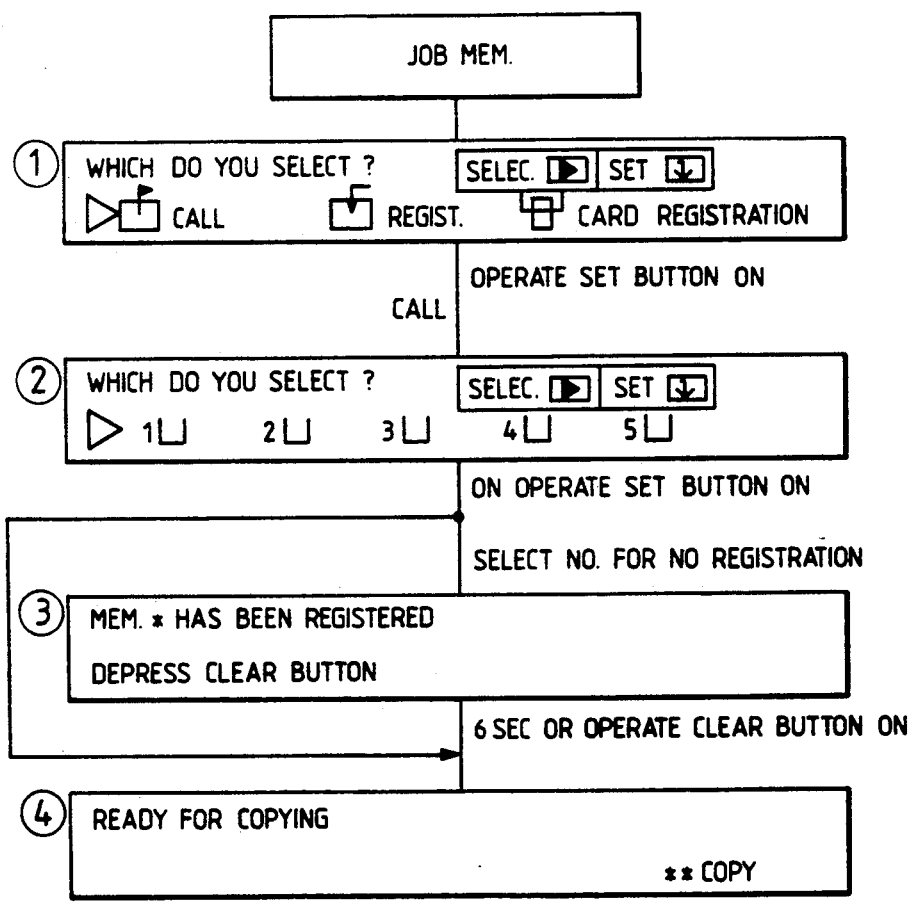
FIGS. 38(a) 38(b), and 38(c) show sentences displayed in the course of selecting a job memory.
Figure 38B:
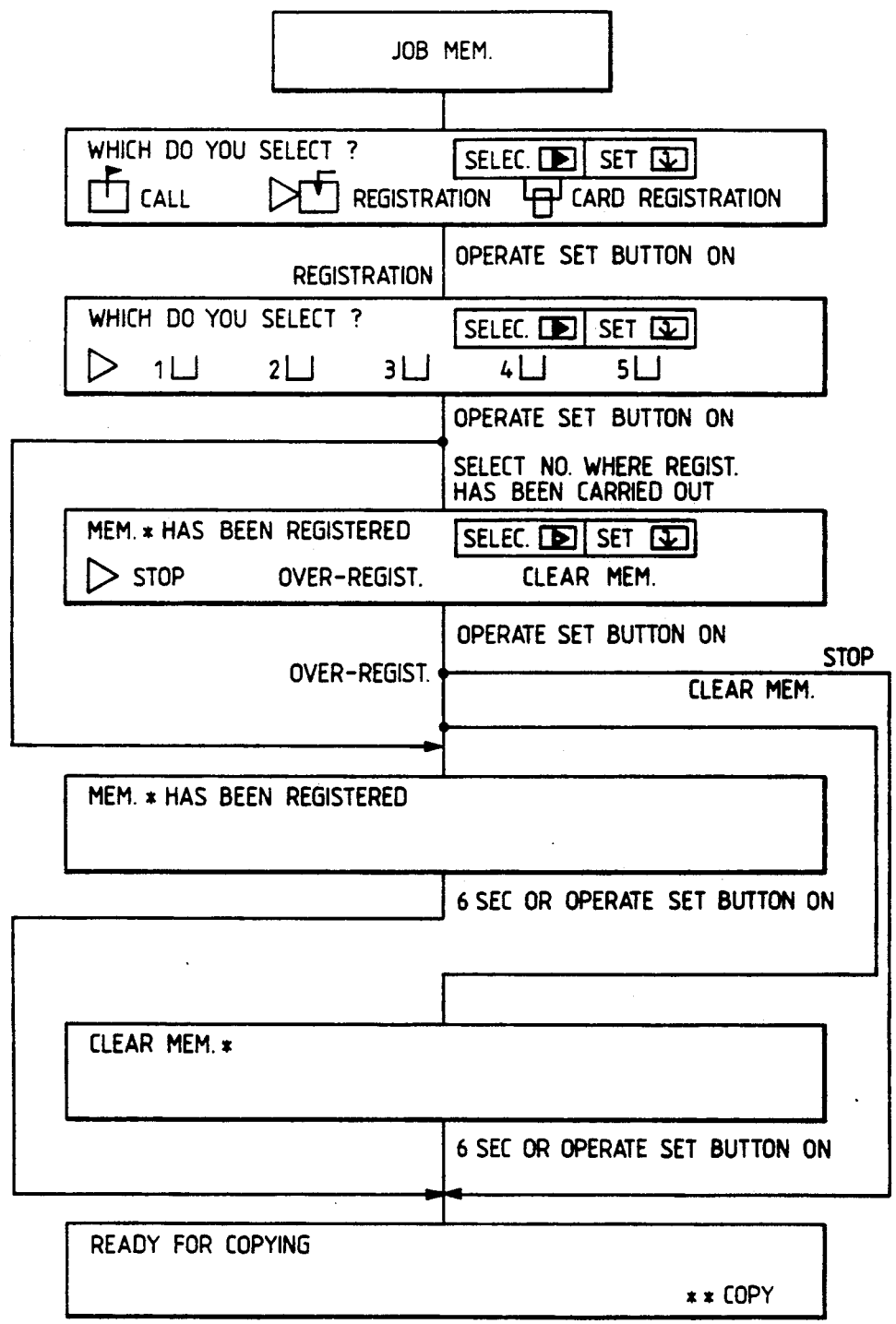
Figure 38C:
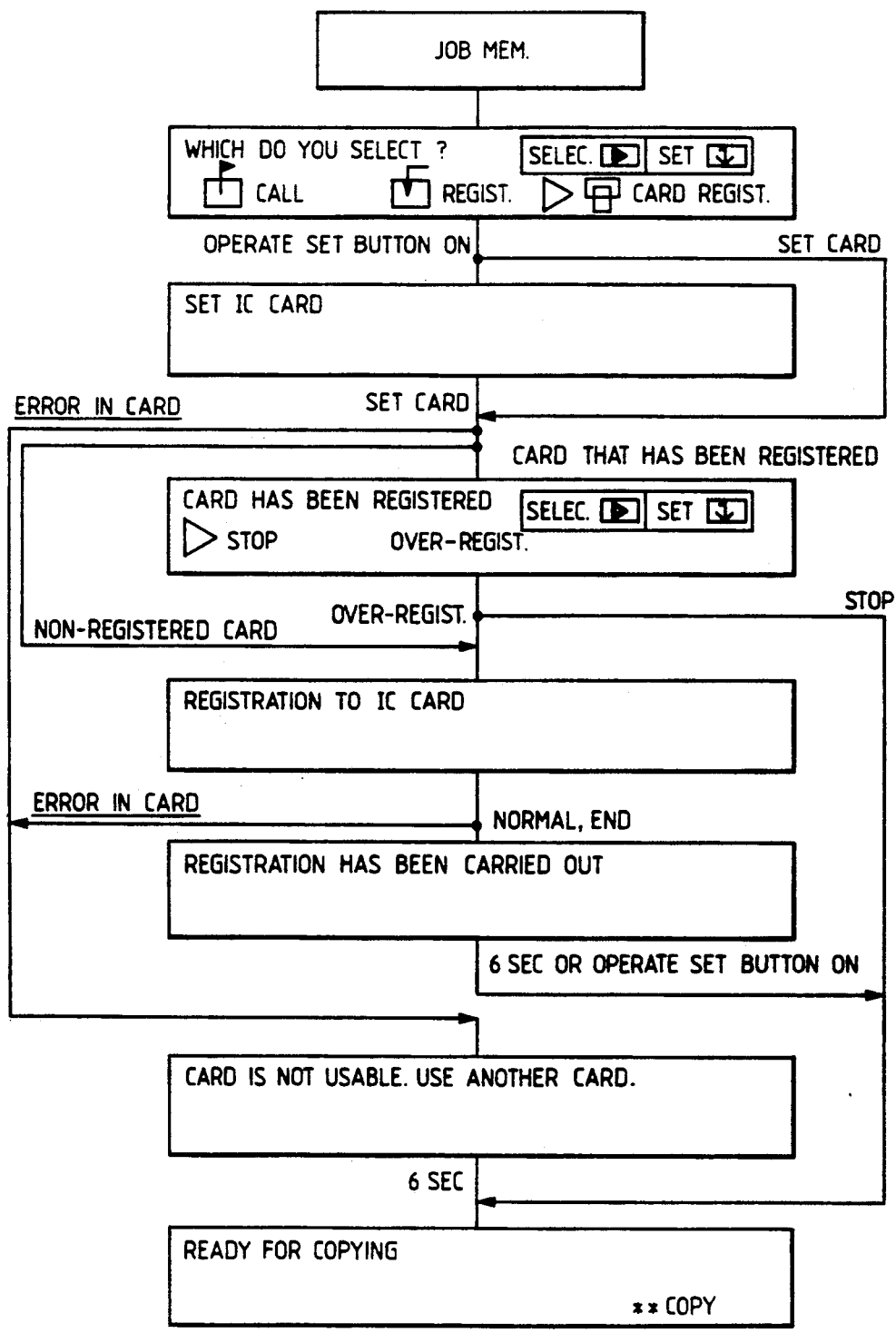

FIG. 38 shows an example of the sentence in the operation of selecting the job memory function. When the job memory with 84 is operated, the sentence of step (1) shown in FIG. 38(a) is displayed. At this time, the cursor flashes at the head of the choice [call]. Accordingly, when the set key is directly operated without operating the selection key, the sentence of step (2) is displayed and, if the set key is operated with the selection of the memory, the sentence of steps (3) or (4) is displayed, depending on whether the memory has been registered or not. If [registration] is selected by operating the selection key to operate the set key, the sentences are respectively displayed in the order shown in FIG. 38(b), depending on whether the memory has been registered after the selection mode of the memory. When the selection key is operated to select [card registration] together with the operation of the set key, the sentences are respectively displayed in the order shown in FIG. 38(c), depending on whether the card is set or whether the card has been registered, or whether the card has been out of order.

Figure 39A:
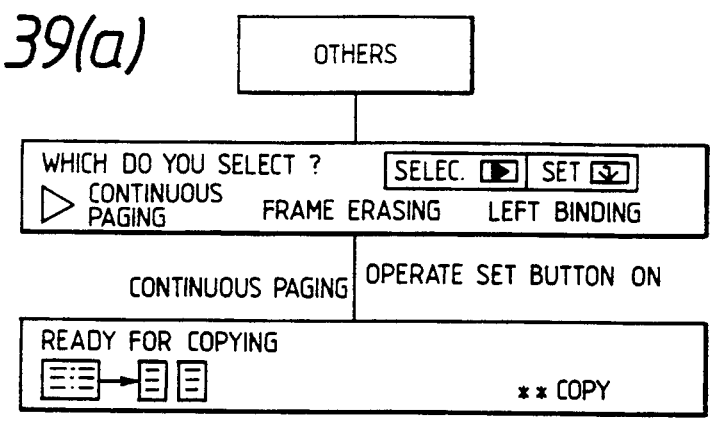
FIGS. 39(a), 39(b), and 39(c) show sentences displayed in the course of selecting other functions.
Figure 39B:
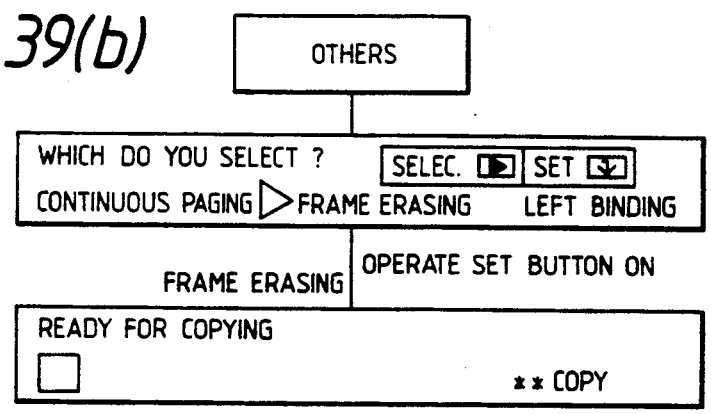
Figure 39C:
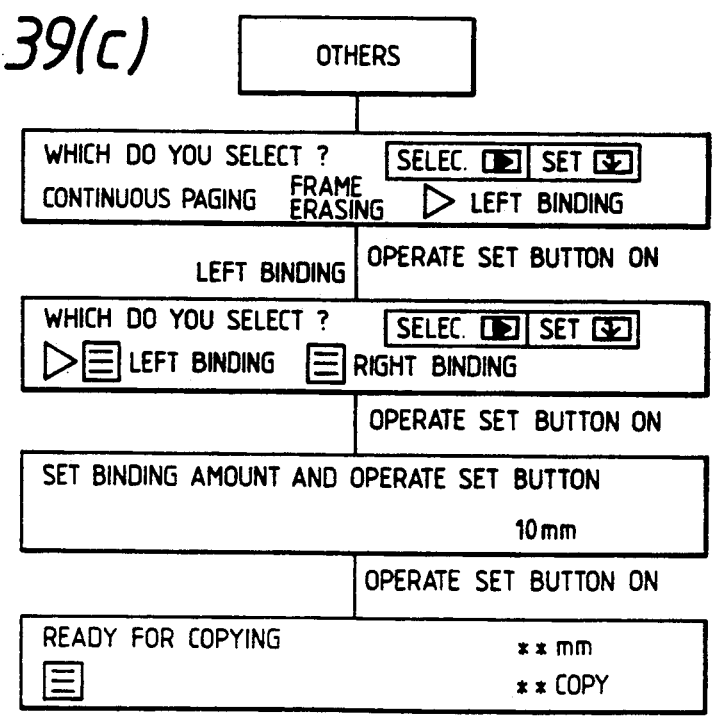

FIGS. 39(a)-39(b) are examples of the sentence in the operation of selecting the other operation. When the other switch 85 is operated, the sentence having choices of [continuous paging], [frame erasing], [binding margin] and the sentences are respectively displayed in the order shown in FIGS. 39(a)-(c) in accordance with each selection. When [continuous paging] and [frame erasing] are selected, the icons displaying the functions are written to under the train of characters [Start Copy] and the input of the number of copies instantly makes possible the copy-making mode. With the selection of [binding margin], whether the [left binding] or [right binding] mode is selected as shown in FIG. 39(c) and subsequently the copy making mode can be established via the binding amount setting mode.

Figure 40A:
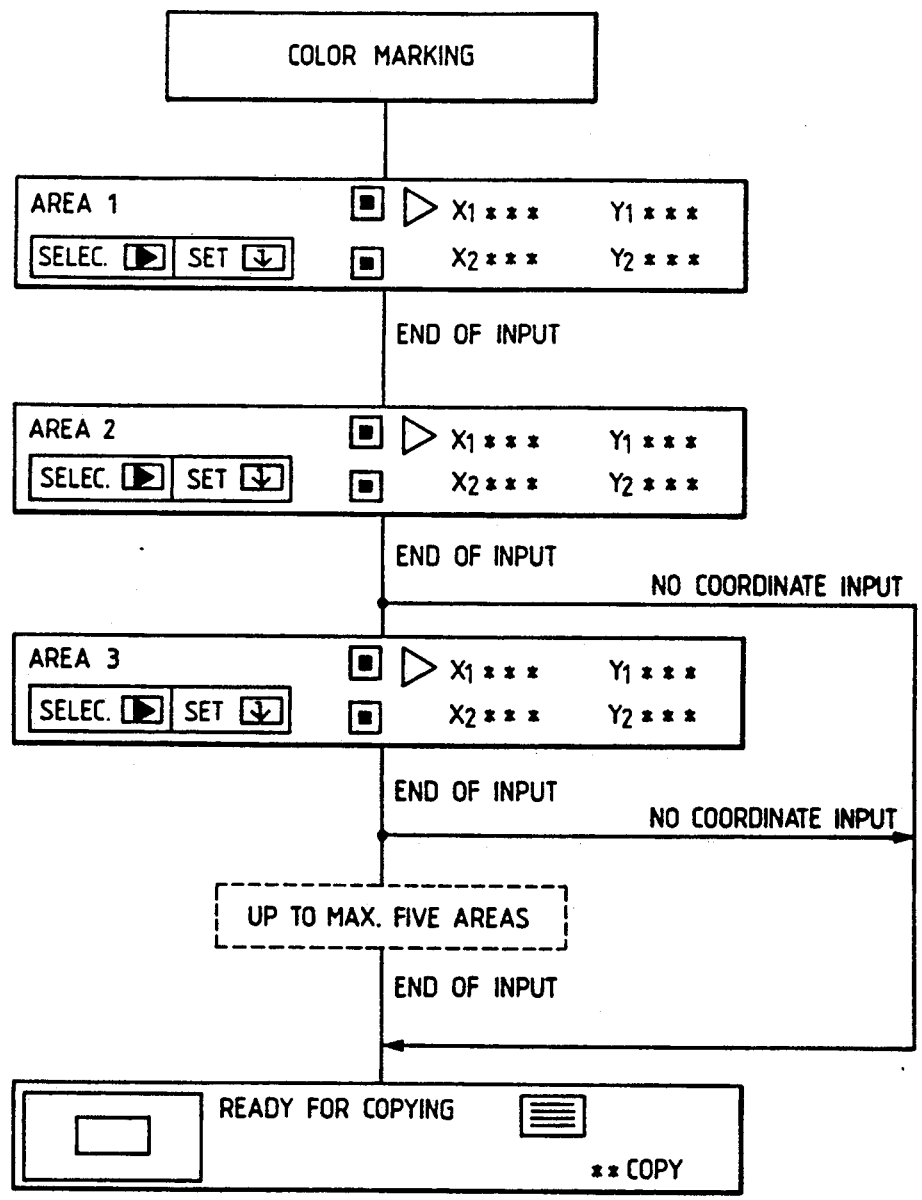
FIGS. 40(a), 40(b), and 40(c) show sentences displayed in the course of selecting the monochromatic emphasizing panel switch.
Figure 40B:
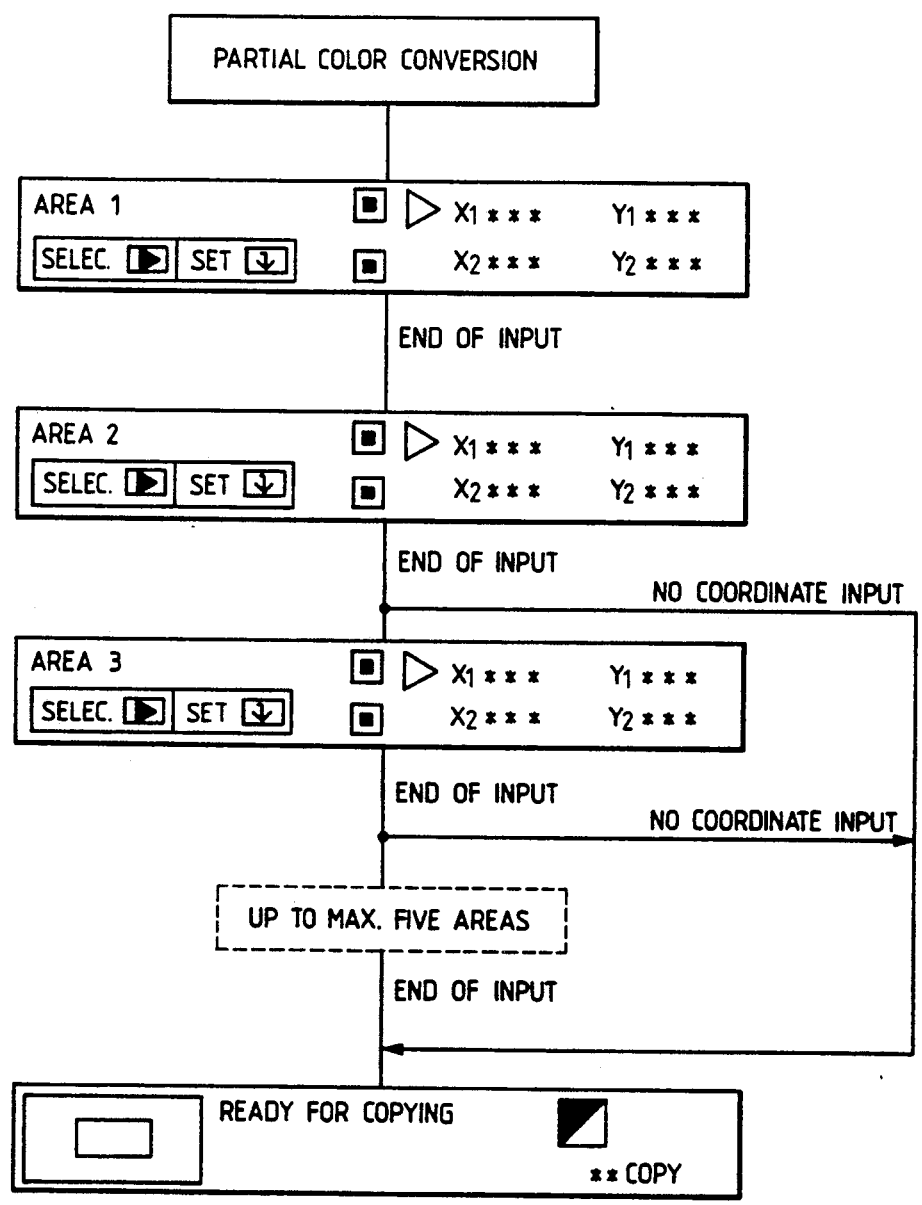
Figure 40C:
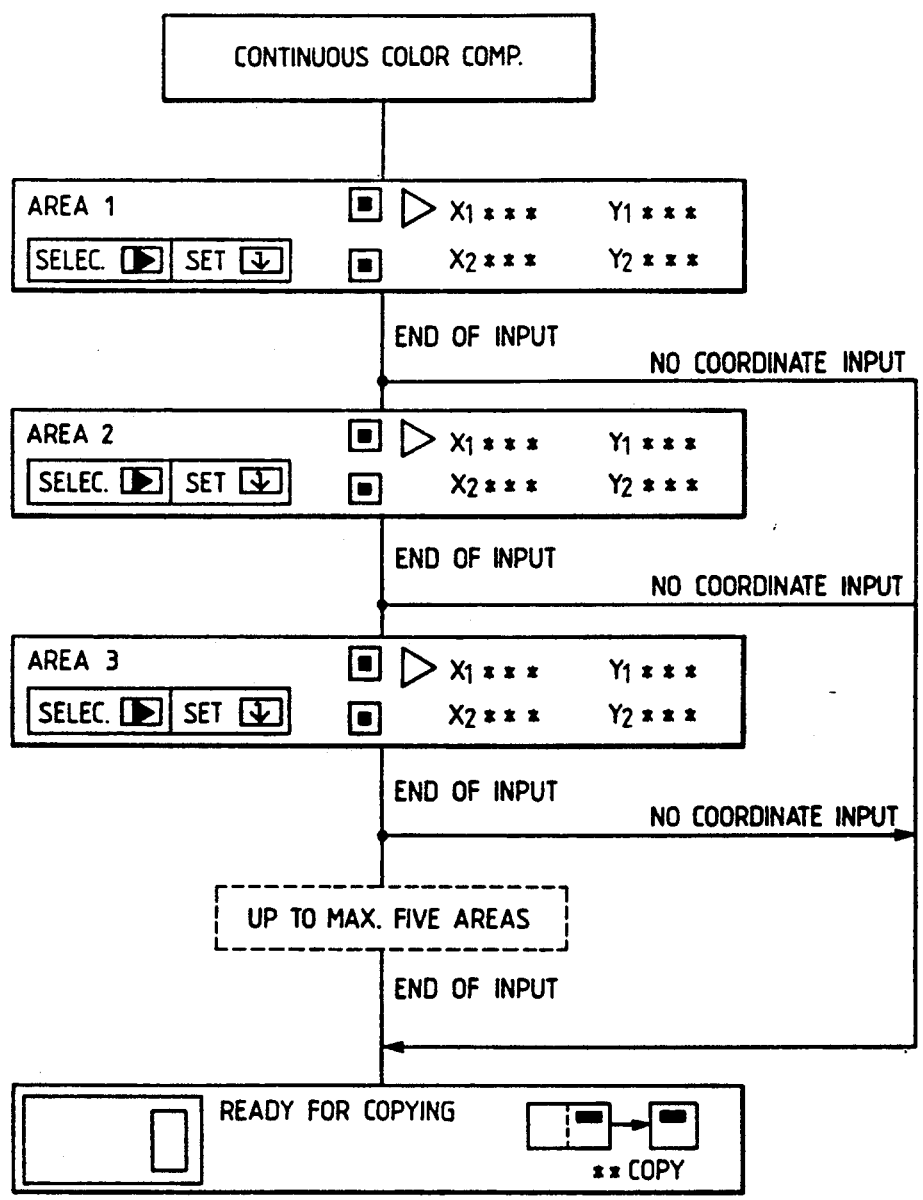

FIG. 40 shows an example of the sentence in the operation of the monochromatic color stressing panel switch. When the color marking switch 88, the partial coloring conversion switch 89 and the continuous dual color switch 90 are operated, the sentence in the coordinate input mode having the train of characters of [area] is displayed as shown in FIGS. 40(a-(c). When the coordinates of the maximum area are inputted, the sentence comprising the train of characters "Start copy," the icons of the functions selected and the number of copies are displayed.

The present invention is not limited to the aforesaid embodiments and various modifications may be possible. CRTs and other display units may be used, though the liquid crystal display is used to display choices of functions with the train of message characters by means of the trains of characters and icons. Moreover, the font data need not always be expressed in the hexadecimal mode. Although the present invention has been described as being applied to copying machines, it may be applicable to any other systems in which any additional devices are optically attachable in compliance with user requirements.

As is obvious from the description above, not only messages including a train of characters mixed with kanas and kanjis but also the functions selected and choices from the functions intended for being selected by means of the train of characters and icons are displayed when any functions are selected to control the operation of the recording apparatus. As a result, messages that are easy to read with minimum simple data can be displayed with far improved operability. With only one operation of selecting and displaying choices on the displaying picture plane, moreover, the number of mechanisms for selecting the functions on the console panel is minimized, so that the console panel can be made compact. Any functions unusable are not displayed as choices and unnecessary data is not displayed, so that the operator is prevented from being mistaken or confused. Further, necessary data is displayed with the train of characters and icons to make every operation easy to understand, so that misoperation is prevented. The use of icons as display characters further makes nay operations instantly recognizable and, with display contents being flashed, any noticeable point among others may attract attention of the operator, who can perform the function selection operation quickly then.

Other embodiments of the present invention will be apparent to those skilled in the art from consideration of the specification and practice of the disclosed invention. It is intended that the specification and examples be considered as exemplary only, with the true scope and spirit of the invention being represented by the following claims.

What is claimed is:

1. An icon aided display system, adaptable to an image forming equipment having a plurality of run functions, comprising:
    means for storing instruction message sentences each comprising one or more characters and associated with selection of a run function, and icons each associated with an optional run function associated with a selected run function;
    display means for displaying characters and icons;
    function selection means including means for selecting one of the plurality of run functions, and first means coupled to said storing means for reading said instruction message sentence associated with such selection; and
    display control means, coupled to said storing means and the function selection means, including second means for reading one or more said icons, each representing an optional run function associated with a selected run function, means for adding the icons read by the second reading means to the instruction message sentence read by the first reading, means for controlling said display means to display said message sentence and said icons simultaneously in the display means whenever such selection of a run function is made, and means for terminating the operation of said function selection means after such selection is made.

2. The icon aided display system according to claim 1, wherein said storing means includes means for separately storing therein icon image data associated with an image of said icon and icon image position data being associated with the position of said icon with respect to the position of said message sentence when displayed in the display means.

3. The icon aided display system according to claim 2, wherein said icon includes icon codes, and wherein said display control means includes means for replacing said icon codes with icon image data prior to the display of said instruction message.

4. The icon aided display system according to claim 1, further comprising:
    one or more optional devices attachable to said image forming equipment each for performing an image forming operation;
    means, coupled to said function selection means, for detecting whether or not the optional device associated with a selected run function is attached to said image forming equipment;
    means for storing a message representing whether or not said associated optional device is attached and menus representing one or more usable functions associated with the associated optional device;
    a plurality of settable operational switching means for controlling said icon aided display system;
    setting means, coupled to the detecting means, the message and menu storing means and the switching means, including means for reading out a stored message and menus associated with the associated optional device to provide display data, and means for setting said operational switching means in accordance with the result of the detection;

message and menu display means, coupled to the setting means, for displaying the message and menus; and control means, coupled to the message and menu display means, for controlling the message and menu display means to display simultaneously the message and the menus associated with the associated optional device in accordance with the display data.

5. The icon aided display system according to claim 4, wherein said message and menu storing means includes a first memory for storing a message associated with said one or more optional devices attachable to the image forming equipment, and a second memory for storing a message associated with only the optional device which is detected to be attached to the equipment, and wherein said setting means includes means for erasing from said first memory the message associated with the optional device detected not to be attached to the equipment.

6. The icon aided display system according to claim 4, wherein the image forming equipment includes a photocopier.

7. The icon aided display system according to claim 4, wherein said messages displayed in said message and menu display means include an icon.

8. The icon aided display system according to claim 4, wherein said optional devices include an intermediate tray.

9. The icon aided display system according to claim 4, wherein said optional devices include an automatic original feeder for duplex copying.

10. The icon aided display system according to claim 4, wherein said stored message in said message and menu storing means includes a message associated with copying of a one-sided or duplex original onto a one-sided or duplex copy.

11. The icon aided display system according to claim 9, wherein said stored message in said message and menu storing means includes a message associated with the copying of a one-sided or duplex original onto a one-sided or duplex copy.

12. The icon aided display system according to claim 6, wherein the optional devices include an IC card devices.

* * * * *

UNITED STATES PATENT AND TRADEMARK OFFICE
CERTIFICATE OF CORRECTION

PATENT NO. : 5,159,324

DATED : October 27, 1992

INVENTOR(S) : Satoshi Ohtani, et al

It is certified that error appears in the above-indentified patent and that said Letters Patent is hereby corrected as shown below:

On the title page, Item [57]: Abstract, line 12 change "display" to --displayed--.

Column 40, line 24-25, claim 12, change "devices" to --device--.

Signed and Sealed this

Eighth Day of February, 1994

Attest:

BRUCE LEHMAN

Attesting Officer

Commissioner of Patents and Trademarks